(12) United States Patent
Terakawa

(10) Patent No.: US 7,889,892 B2
(45) Date of Patent: Feb. 15, 2011

(54) FACE DETECTING METHOD, AND SYSTEM AND PROGRAM FOR THE METHODS

(75) Inventor: Kensuke Terakawa, Kanagawa-ken (JP)

(73) Assignee: Fujifilm Corporation (JP)

( * ) Notice: Subject to any disclaimer, the term of this patent is extended or adjusted under 35 U.S.C. 154(b) by 1133 days.

(21) Appl. No.: 11/580,018

(22) Filed: Oct. 13, 2006

(65) Prior Publication Data

US 2007/0104374 A1 May 10, 2007

(30) Foreign Application Priority Data

Oct. 13, 2005 (JP) .............................. 2005-298831
Jan. 17, 2006 (JP) .............................. 2006-008417

(51) Int. Cl.
*G06K 9/00* (2006.01)

(52) U.S. Cl. ....................... 382/118; 382/115; 382/155; 382/181; 382/190; 382/195

(58) Field of Classification Search ................. 382/115, 382/118, 224–228, 155, 159, 181, 190, 195, 382/209

See application file for complete search history.

(56) References Cited

U.S. PATENT DOCUMENTS

| | | | |
|---|---|---|---|
| 2002/0135618 A1* | 9/2002 | Maes et al. ................. | 345/767 |
| 2005/0100195 A1 | 5/2005 | Li | |
| 2005/0207649 A1* | 9/2005 | Enomoto et al. ............ | 382/190 |
| 2007/0053585 A1* | 3/2007 | Xiao et al. .................. | 382/159 |

OTHER PUBLICATIONS

Shihong Lao et al., "Fast Omni-Directional Face Detection", MIRU 2004, pp. II271-II276.

\* cited by examiner

*Primary Examiner*—Vikkram Bali
*Assistant Examiner*—Daniel Zeilberger
(74) *Attorney, Agent, or Firm*—Studebaker & Brackett PC; Donald R. Studebaker

(57) ABSTRACT

An index representing the probability that a fraction image is a face image including a face in an input image is calculated for each of the positions of the face to be detected on the basis of a feature value. When the sum of the indexes of the fraction images is not smaller than the first threshold value, the image formed by the fraction images is determined to be a face image.

21 Claims, 31 Drawing Sheets

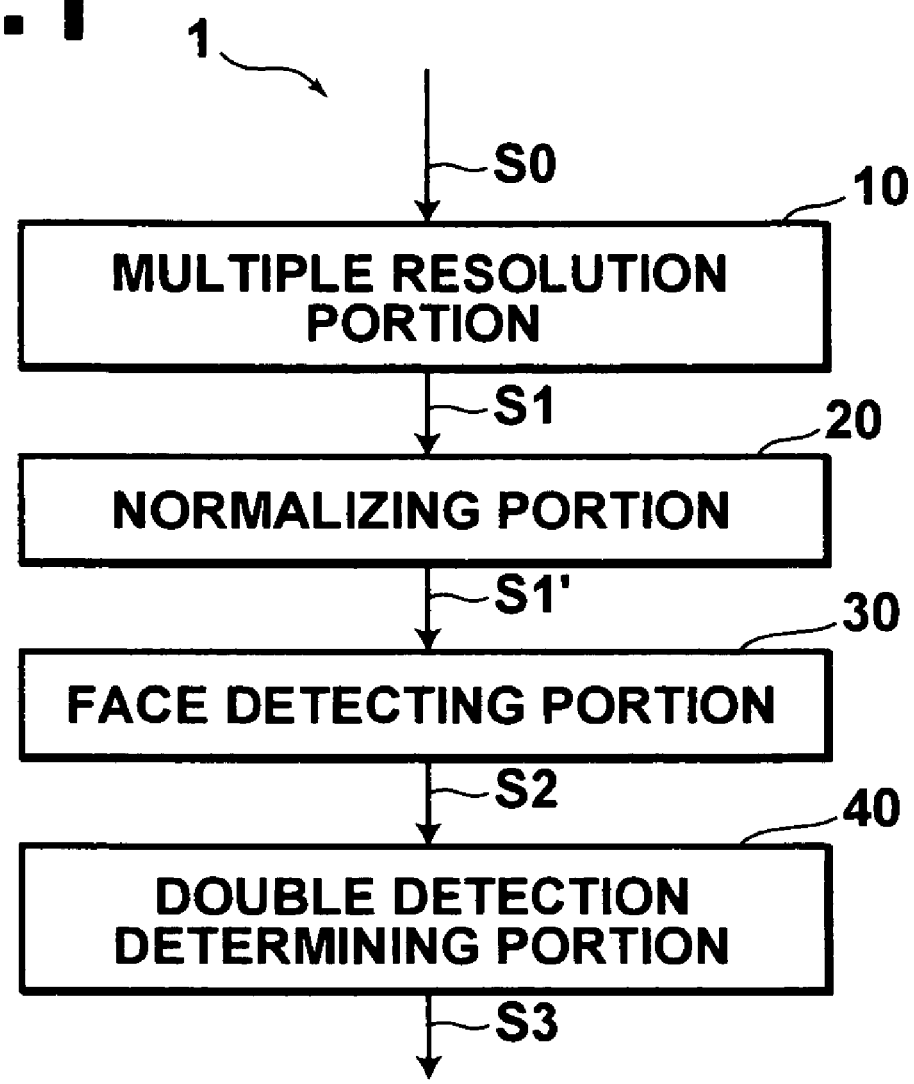

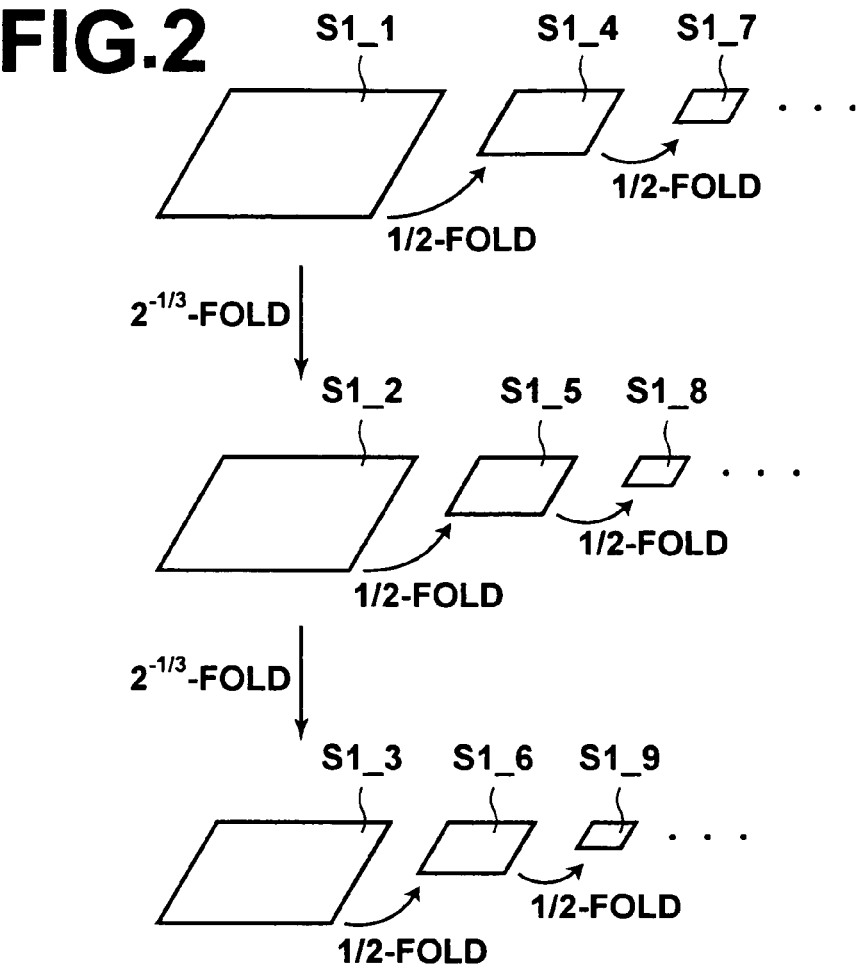
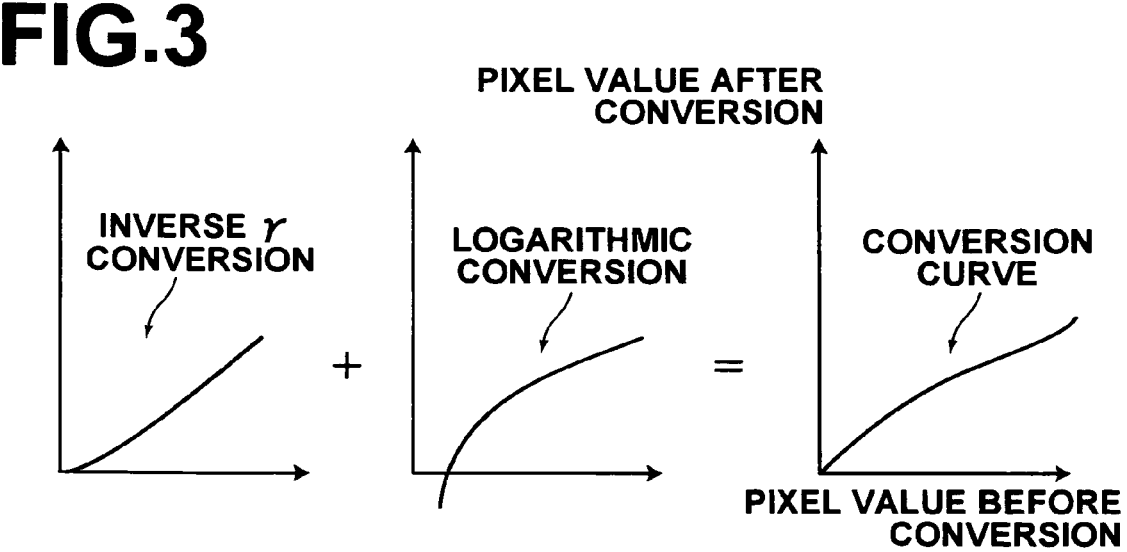

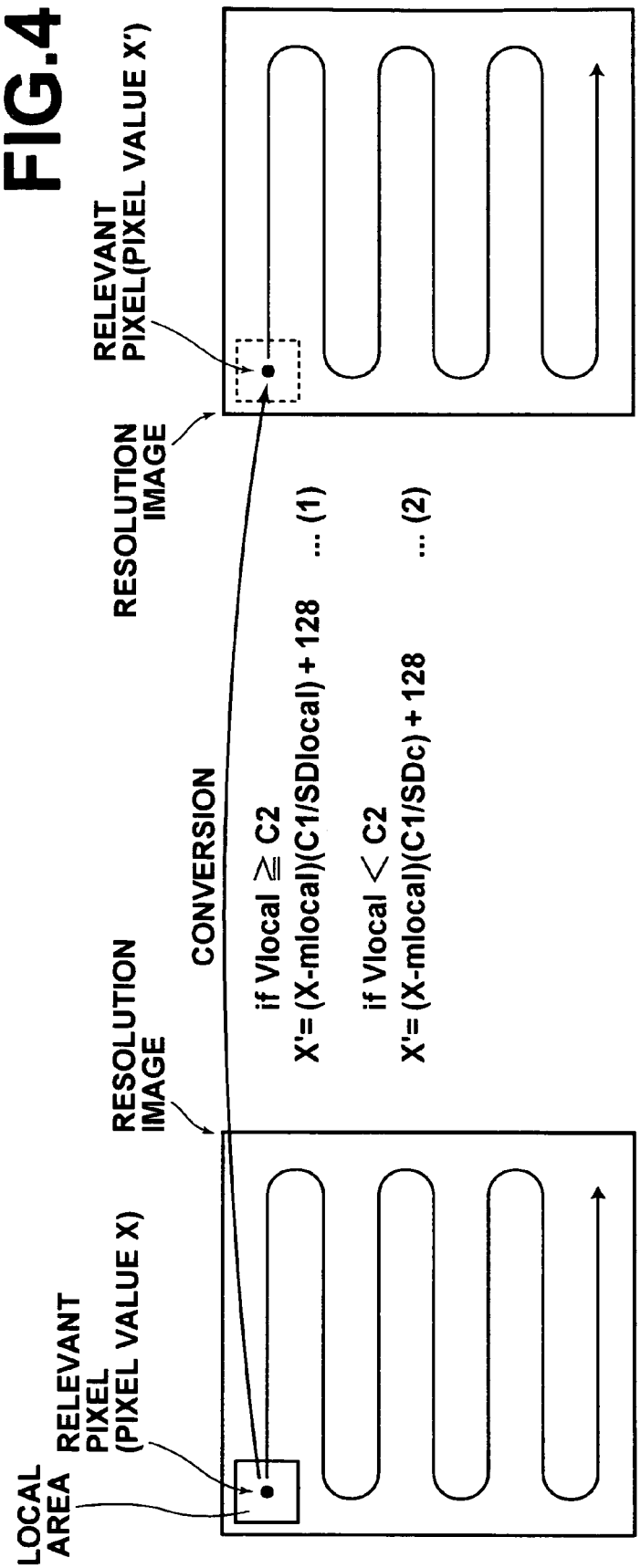

FIG.9
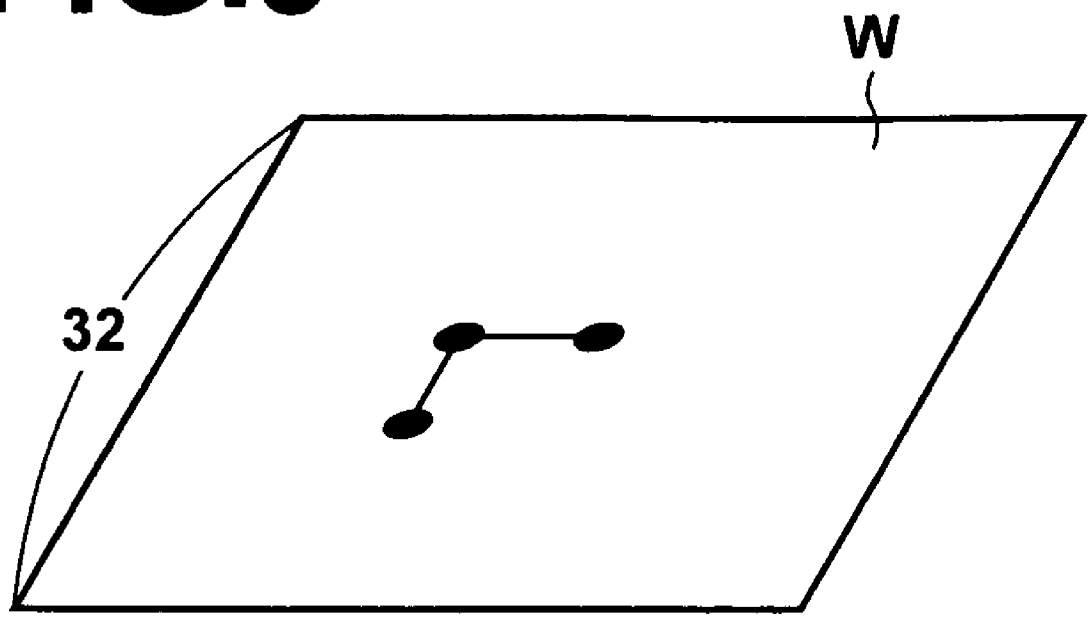
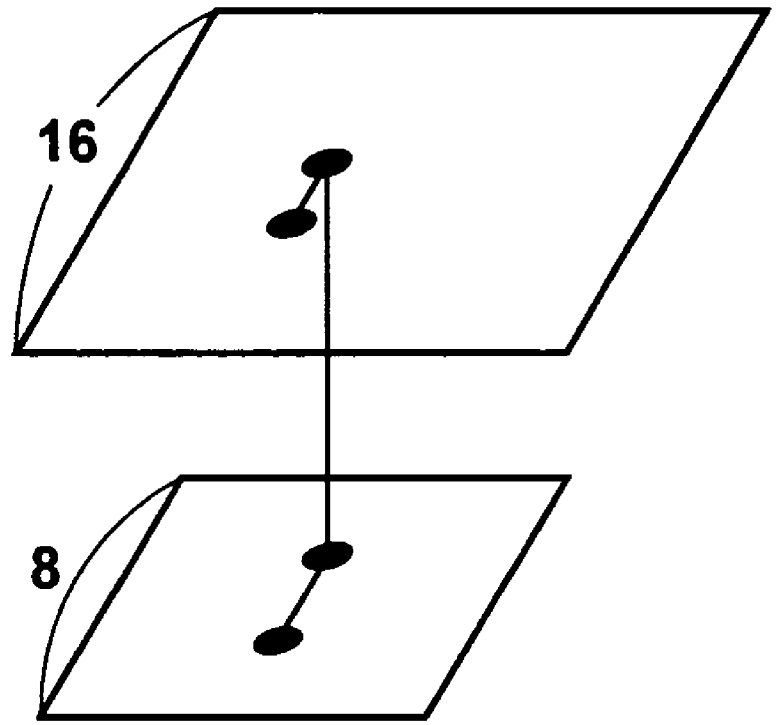

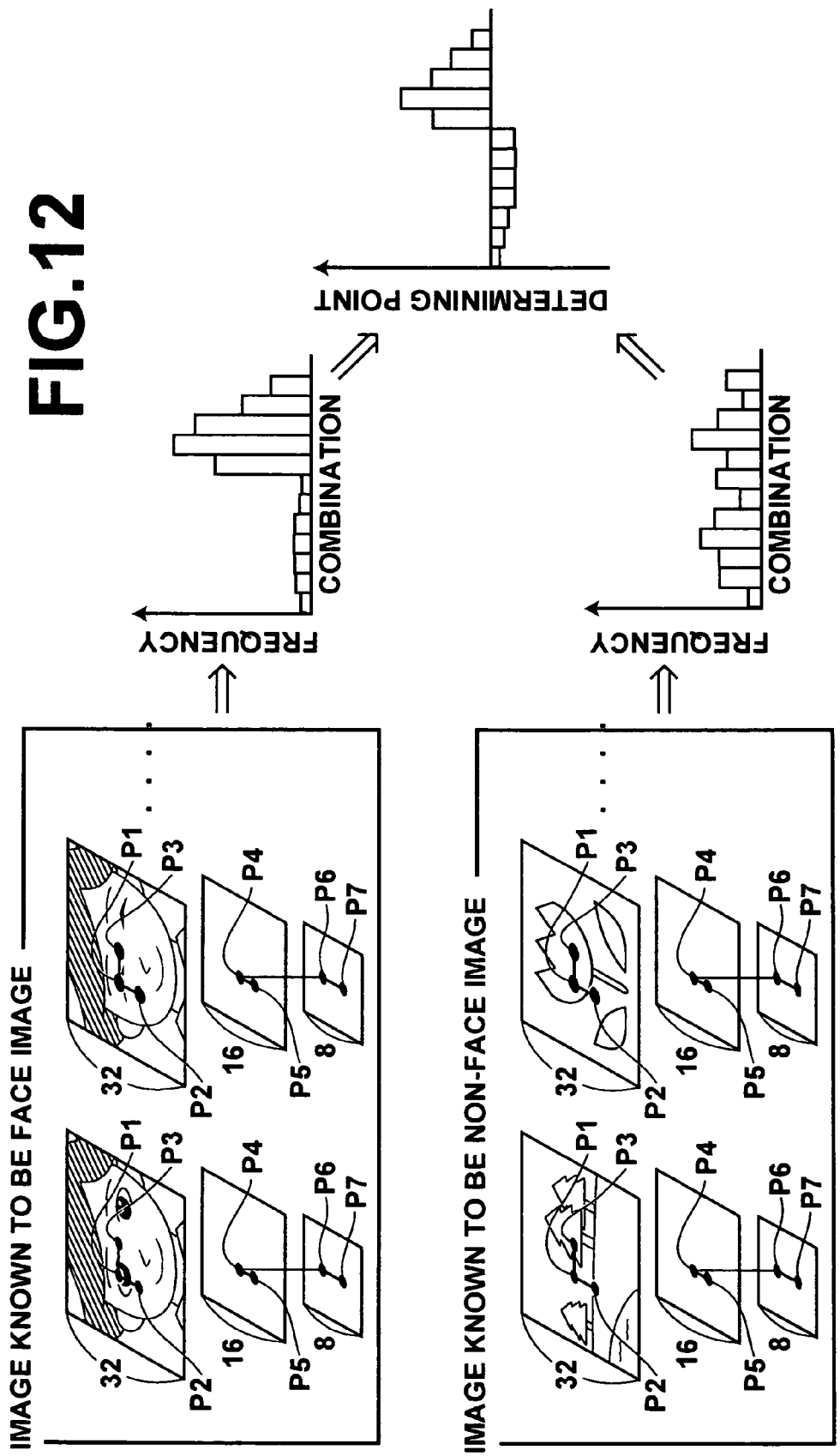

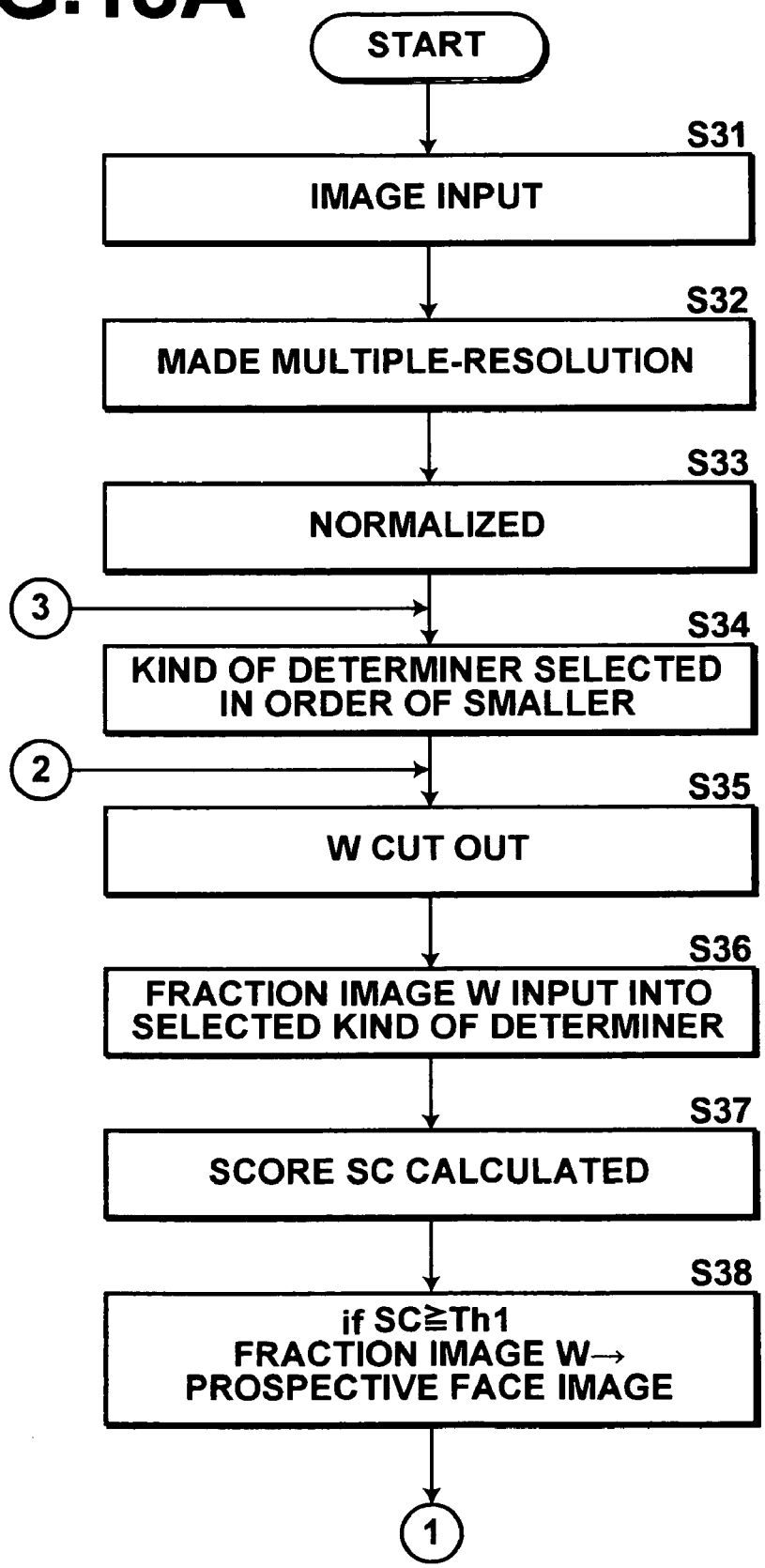

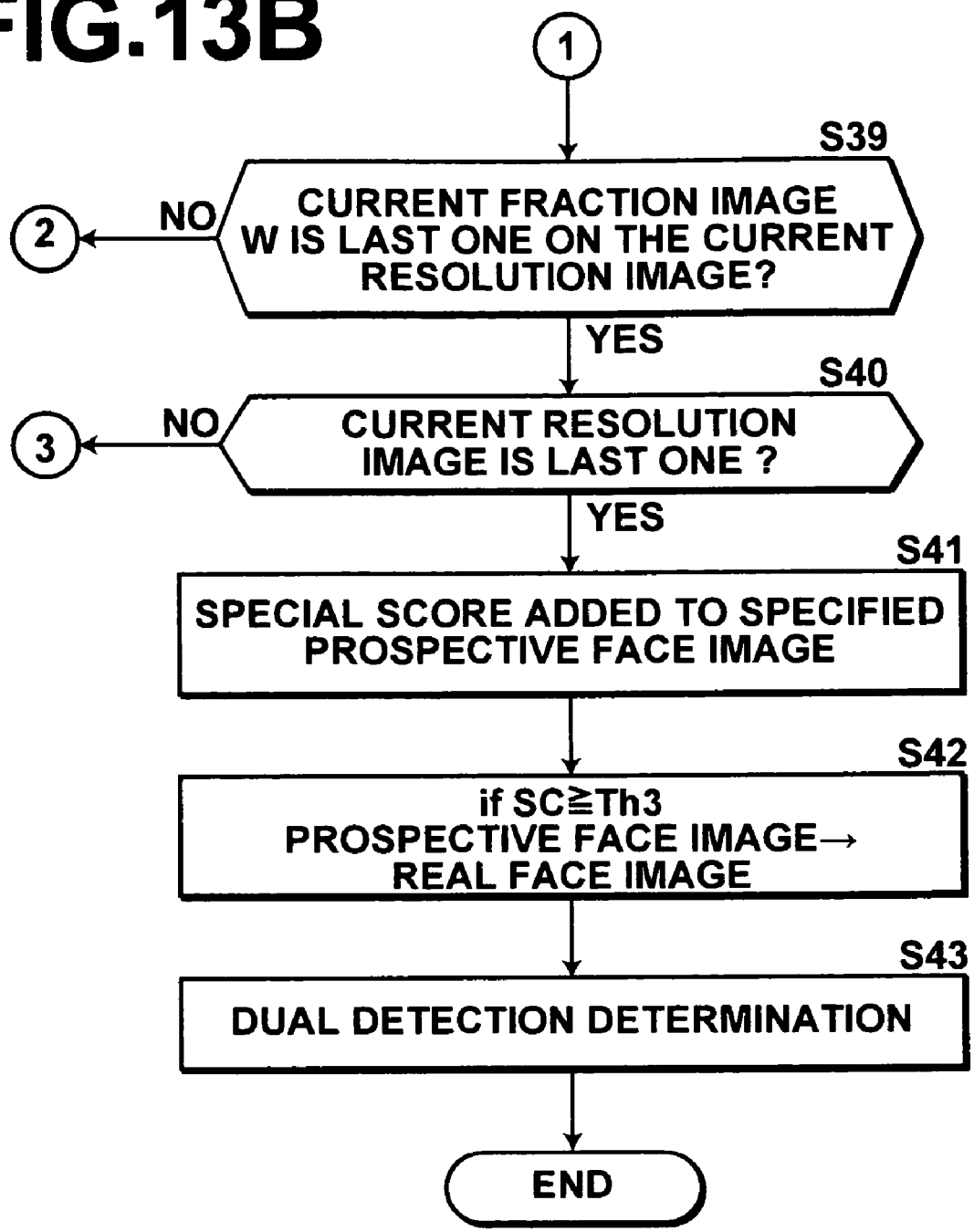

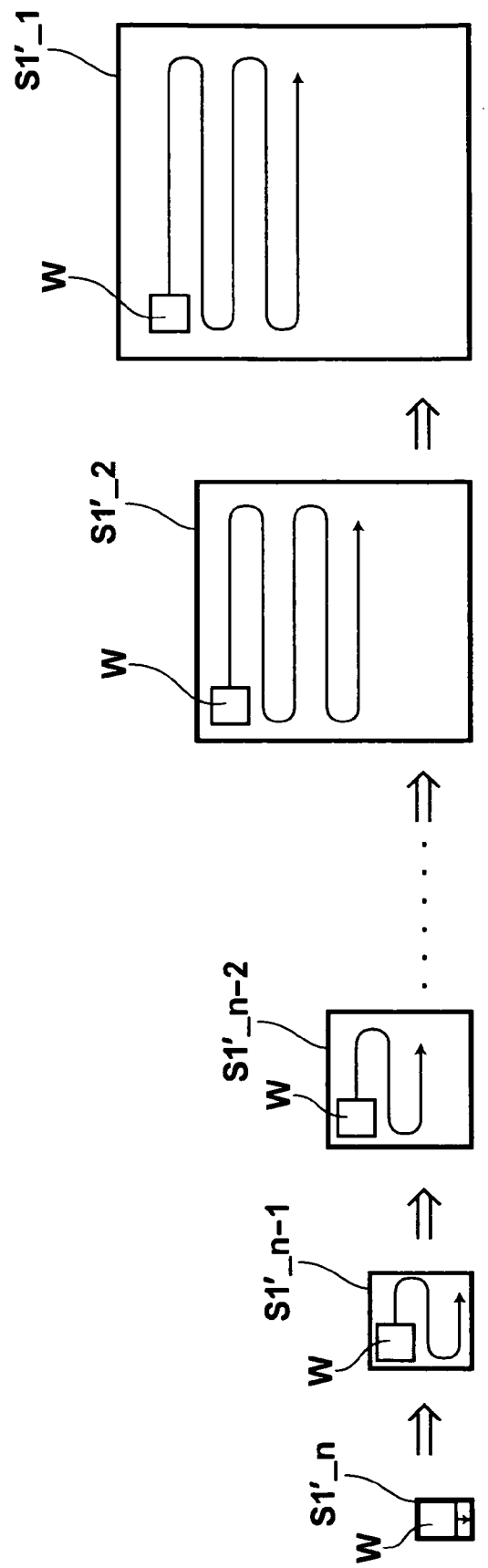

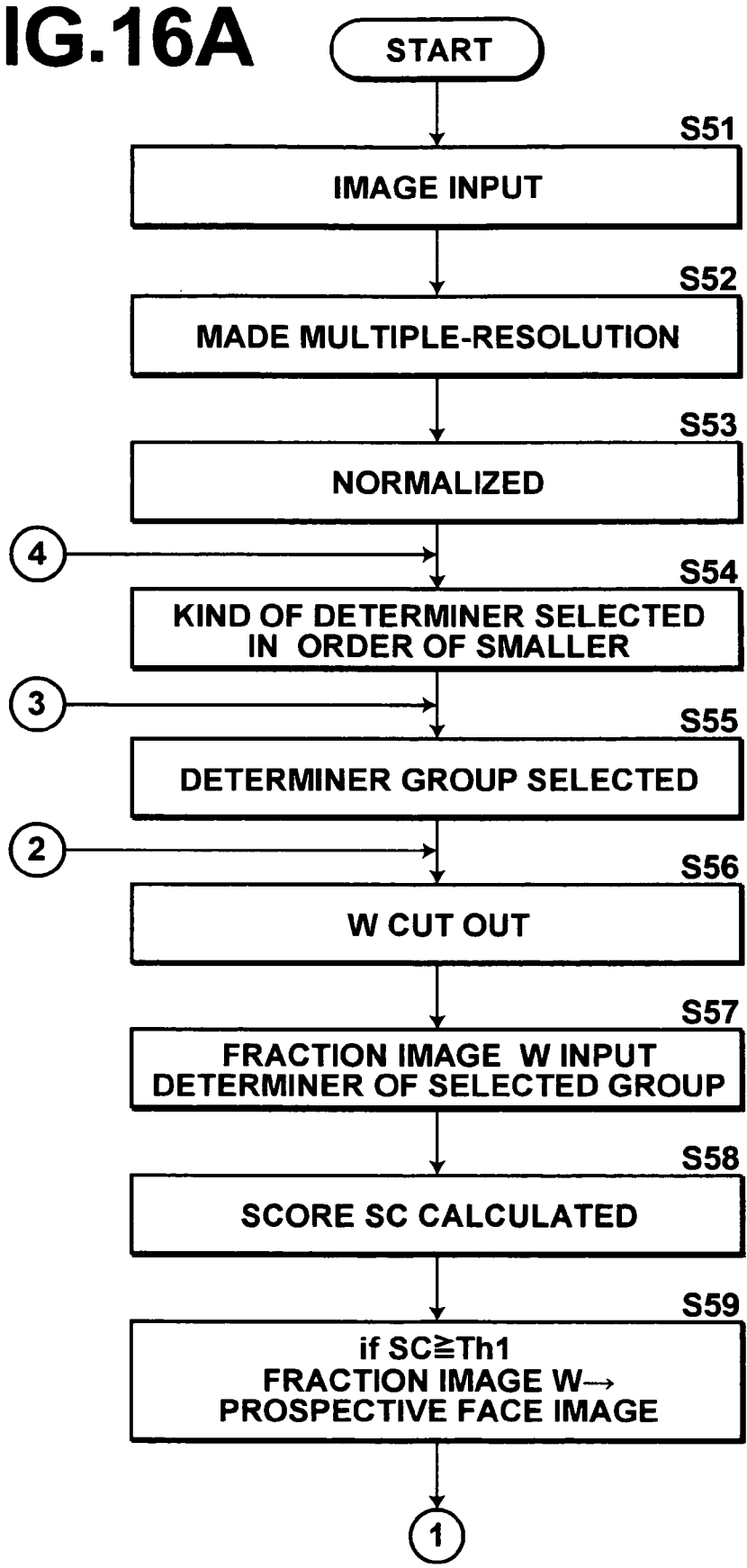

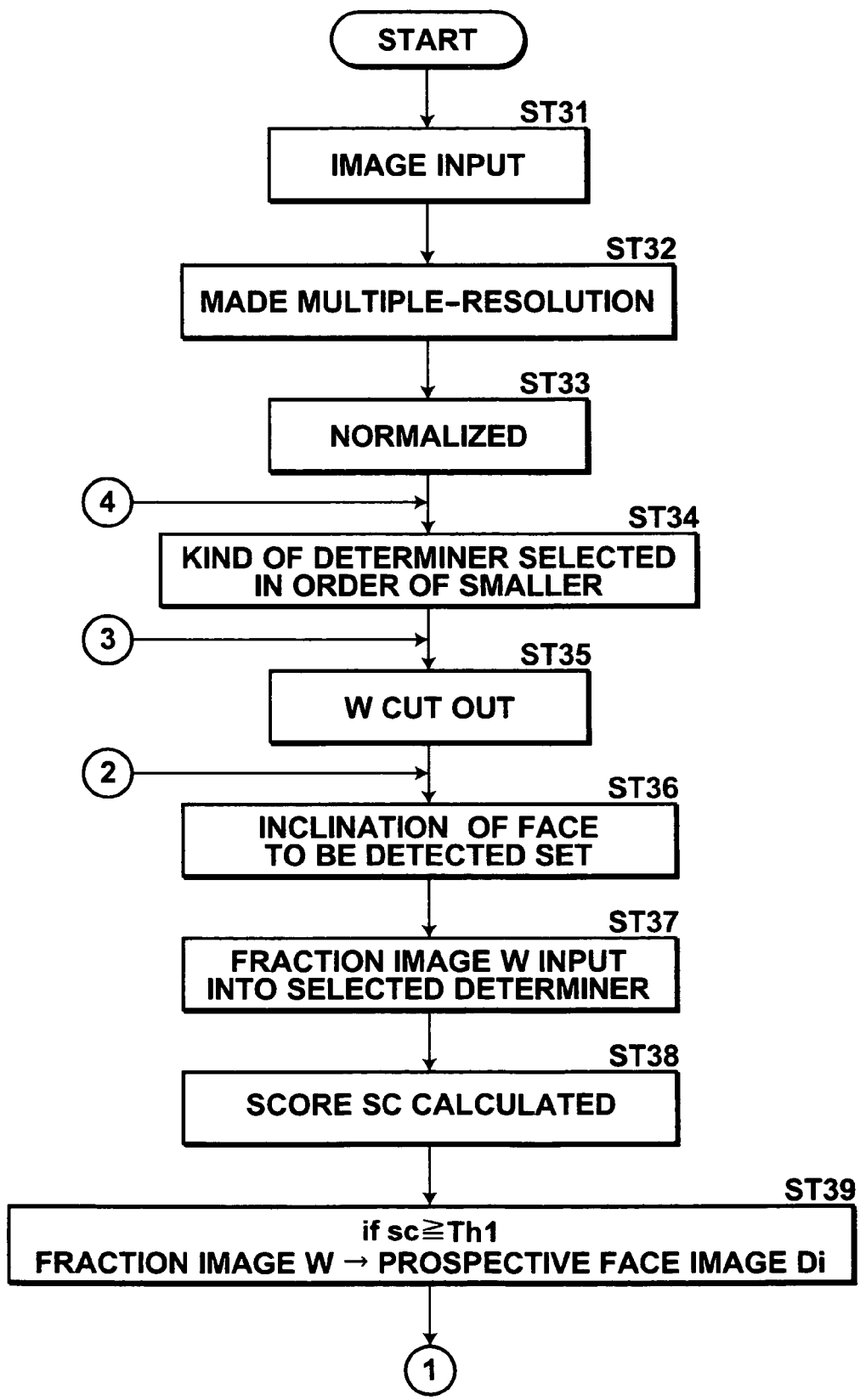

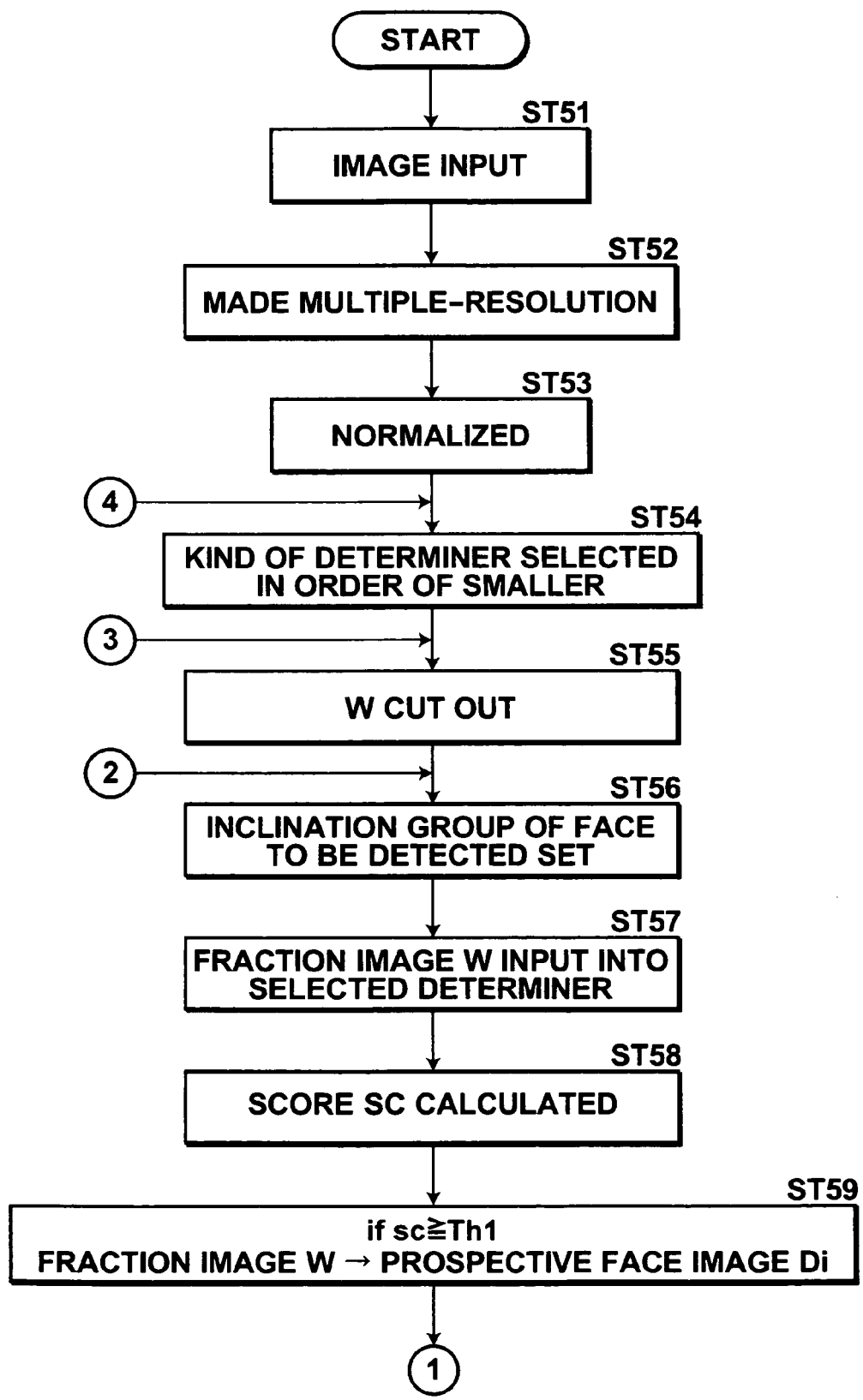

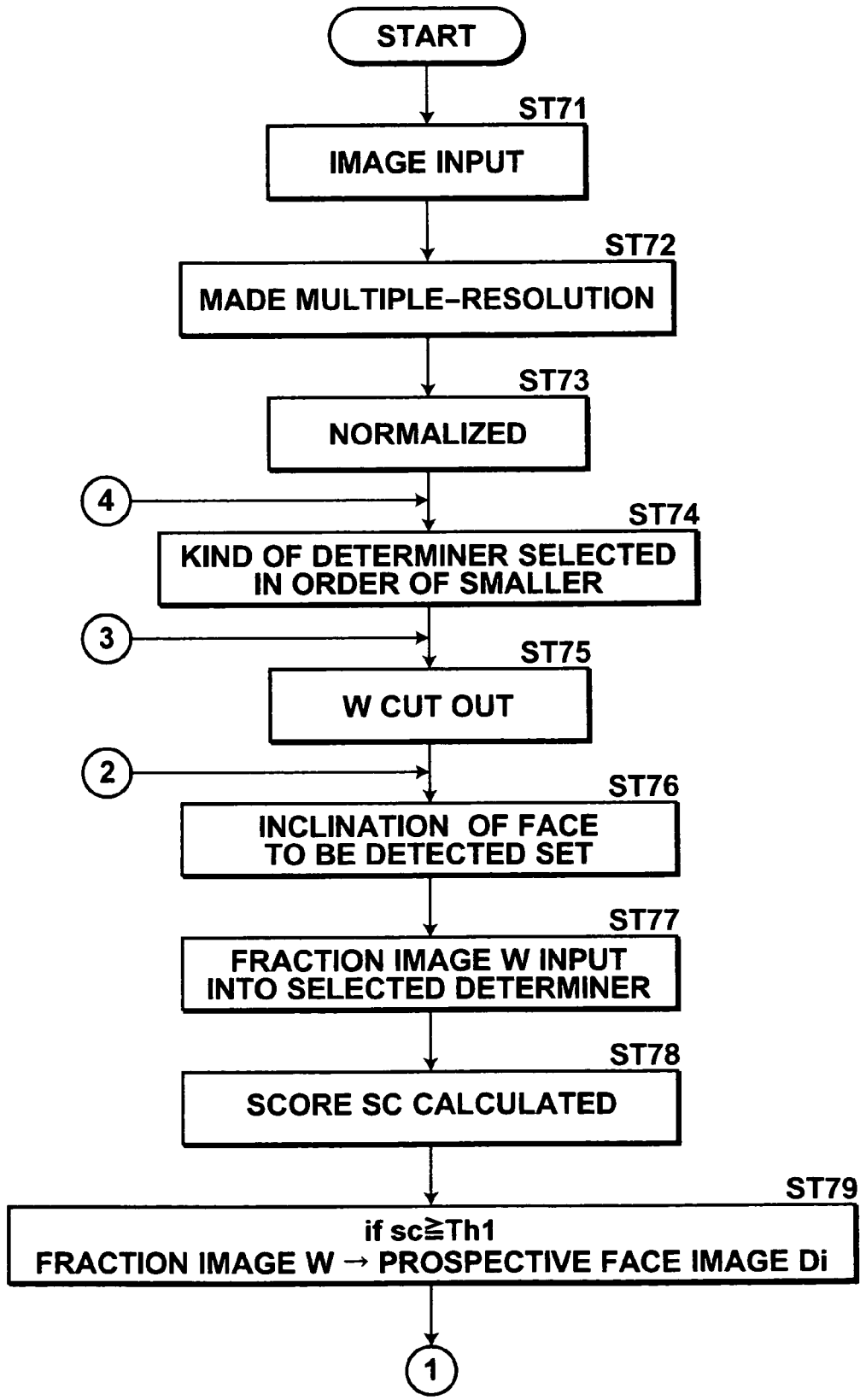

FACE DETECTING METHOD, AND SYSTEM AND PROGRAM FOR THE METHODS

BACKGROUND OF THE INVENTION

1. Field of the Invention

This invention relates to a method of detecting a face image in digital images, and a system and a computer program for carrying out the methods.

2. Description of the Related Art

There has been carried out to investigate a color distribution of the face of a human image in a snapshot picture taken by a digital still camera and to correct a color of the skin and/or to recognize a human in a digital image taken by a digital video camera of a watching system. In such a case, since it is necessary to detect face areas corresponding to the human face in the digital image, there have been proposed various methods of detecting a face image including a face in a digital image.

For example, a method in which a plurality of fraction images are cut out from an object image in a plurality of different positions thereof and whether the fraction images are an image including a face is determined, whereby a face image on an object digital images is detected can be listed.

Further, when a face image whose inclination cannot be identified is to be detected, it is necessary to determine while changing the position and the inclination of the face to be detected on the object image in sequence whether the fraction image in the position is a face image including a face of the inclination by the inclination of the face to be detected.

In order to determine whether the fraction image is a face image, for instance, use of technic of template matching or a technic employing a determiner module which has learned the feature of face by machine learning (a technic disclosed, for instance, in "Fast Omni-Directional Face Detection", Shihong Lao et al., MIRU 2004, pp. II271-II276 or U.S. Patent Application publication No. 20050100195) is conceivable. But in anyone of the above methods, for the determination, it is general to calculate an index representing the probability that the fraction image is a face image on the basis of the image pattern of the fraction image and to determine that the fraction image is a face image when the index exceeds a predetermined threshold value.

However, in the above face detecting methods employing a technic which determines that the image is a face image by comparison of the index based on the image pattern with a threshold value, there has been a problem that escape of a face image is apt to occur when there is an evenness in brightness or the contrast in the object image and the object image is low in image quality, or when a face in the object image is partly blocked by another object and features of the face cannot be sufficiently grasped, and that a non-face image is mistaken for the face image when a non-face image which resembles to the face image in the image pattern accidentally exists near the face image on the object image.

Further, in a face detecting method where while changing the position and the inclination of the face to be detected on the object image, whether the fraction image in the position is a face image including a face of the inclination is determined by the inclination of the face to be detected in sequence, the amount of processing required to the determination becomes huge since the determination must be carried out the number of times corresponding to the number of combinations of the positions and inclinations of the face to be detected, and this fact is a factor of preventing the face detection from being carried out at high speed.

SUMMARY OF THE INVENTION

In view of the foregoing observations and description, the primary object of the present invention is to provide a method of and a system for detecting a face which can suppress escape of face images or mistakes in detection of the face image and a computer program for the method.

Another object of the present invention is to provide a method of and a system for detecting a face which can, in a method having processing in which a face is detected while changing the position and the inclination of the face to be detected on the object image, carry out the processing at high speed.

The primary object of the present invention is accomplished by the following first and second face detecting methods, systems and the computer programs, whereas the another object of the present invention is accomplished by the following third to fifth face detecting methods, systems and the computer programs.

In accordance with the present invention, there is provided a first face detecting method for detecting a face image in an input image comprising the steps of cutting out a fraction image in different positions on the input image, calculating an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, extracting all the fraction images the calculated index of which is not smaller than a first threshold value from the plurality of fraction images as a prospective face image including a face inclined by a predetermined inclination when the index is calculated, determining as a highly reliable face image a prospective image the calculated index of which is not smaller than a second threshold value which is larger than the first threshold value from the prospective face images, increasing the index of the prospective face image which is substantially the same in the inclination of the face as the highly reliable face image, and detecting as a face image the prospective face image the index after the increase of which is not larger than a third threshold value which is between the first and second threshold value.

In accordance with the present invention, there is further provided a second face detecting method for detecting a face image in an input image comprising the steps of cutting out a fraction image in different positions on the input image, calculating an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, extracting all the fraction images which is not smaller than a first threshold value in the calculated index from the plurality of fraction images as a prospective face image including a face inclined by a predetermined inclination when the index is calculated, determining a prospective image the calculated index of which is not smaller than a second threshold value which is larger than the first threshold value in the prospective face images as a highly reliable face image, and detecting as a face image only the prospective face image which is substantially the same in the inclination of the face as the highly reliable face image.

In accordance with the present invention, there is further provided a first face detecting system for detecting a face image in an input image comprising a fraction image cutting out means which cuts out a fraction image in different positions on the input image, an index calculating means which calculates an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, a prospective face image extracting means which extracts all the fraction images the calculated index of which is not smaller than a first threshold value from the plurality of fraction images as a prospective face image including a face inclined by a predetermined inclination when the index is calculated, a highly reliable face image determining means which determines as a highly reliable face image a prospective image the calculated index of which is not smaller than a second threshold value which is larger than the first threshold value from the prospective face images, an index increasing means which increases the index of the prospective face image which is substantially the same in the inclination of the face as the highly reliable face image, and a face image detecting means which detects as a face image the prospective face image the index after the increase of which is not larger than a third threshold value which is between the first and second threshold value.

In accordance with the present invention, there is further provided a second face detecting system for detecting a face image in an input image comprising a fraction image cutting out means which cuts out a fraction image in different positions on the input image, an index calculating means which calculates an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, a prospective face image extracting means which extracts all the fraction images the calculated index of which is not smaller than a first threshold value from the plurality of fraction images as a prospective face image including a face inclined by a predetermined inclination when the index is calculated, a highly reliable face image determining means which determines as a highly reliable face image a prospective image the calculated index of which is not smaller than a second threshold value which is larger than the first threshold value from the prospective face images, and a face image detecting means which detects as a face image only the prospective face image which is substantially the same in the inclination of the face as the highly reliable face image.

In accordance with the present invention, there is further provided a first computer program which causes a computer to function as a first face detecting system for detecting a face image in an input image by causing the computer to function as a fraction image cutting out means which cuts out a fraction image in different positions on the input image, an index calculating means which calculates an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, a prospective face image extracting means which extracts all the fraction images the calculated index of which is not smaller than a first threshold value from the plurality of fraction images as a prospective face image including a face inclined by a predetermined inclination when the index is calculated, a highly reliable face image determining means which determines as a highly reliable face image a prospective image the calculated index of which is not smaller than a second threshold value which is larger than the first threshold value from the prospective face images, an index increasing means which increases the index of the prospective face image which is substantially the same in the inclination of the face as the highly reliable face image, and a face image detecting means which detects as a face image the prospective face image the index after the increase of which is not larger than a third threshold value which is between the first and second threshold value.

In accordance with the present invention, there is further provided a second computer program which causes a computer to function as a second face detecting system for detecting a face image in an input image by causing the computer to function as a fraction image cutting out means which cuts out a fraction image in different positions on the input image, an index calculating means which calculates an index representing the probability that the fraction image is a face image including a face inclined by a predetermined inclination on the basis of a feature value on an image of the fraction image with the predetermined inclination changed to a plurality of inclinations for each of a plurality of fraction images cut out in different positions, a prospective face image extracting means which extracts all the fraction images the calculated index of which is not smaller than a first threshold value from the plurality of fraction images as a prospective face image including a face inclined by a predetermined inclination when the index is calculated, a highly reliable face image determining means which determines as a highly reliable face image a prospective image the calculated index of which is not smaller than a second threshold value which is larger than the first threshold value from the prospective face images, and a face image detecting means which detects as a face image only the prospective face image which is substantially the same in the inclination of the face as the highly reliable face image.

In accordance with the present invention, there is further provided a third face detecting method in which, while changing an inclination and a position of a face to be detected, an index representing the probability that the fraction image in the position is a face image including a face inclined by the inclination is calculated for each of the positions and inclinations of the face to be detected, and a face image included in an input image is detected by extracting as a face image the fraction image whose index is not smaller than a first threshold value, wherein the improvement comprises the step of when the calculated index is not smaller than a second threshold value larger than the first threshold value, carrying out the subsequent calculation of the index limiting inclination of the face to be detected to the inclination upon calculation of the index.

In the third face detecting method of the present invention, inclinations of all the faces to be detected may be divided into a plurality of groups each comprising a plurality of close different inclinations, and the calculation of the index may be carried out by the groups.

In accordance with the present invention, there is further provided a fourth face detecting method in which, while changing an inclination and a position of a face to be detected, an index representing the probability that the fraction image in the position is a face image including a face inclined by the inclination is calculated for each of the positions and inclinations of the face to be detected, and a face image included in an input image is detected by extracting as a face image the fraction image whose index is not smaller than a first threshold value, wherein the improvement comprises the step of dividing inclinations of all the faces to be detected into a plurality of groups each comprising a plurality of close different inclinations, carrying out the calculation of the index by groups, and when the calculated index is not smaller than a second threshold value larger than the first threshold value, carrying out the subsequent calculation of the index limiting inclination of the face to be detected to the inclination of the group to which the inclination belongs upon calculation of the index.

In the third and fourth face detecting method of the present invention, in the face images detected before limiting inclination of the face to be detected, the face image including a face inclined by an inclination different from the limited inclination may be deleted as a non-face image.

In the third and fourth face detecting methods of the present invention, the plurality of groups may comprise four groups respectively containing four inclinations of 0°, 90°, 180°, 270° when the vertical direction of the input image is taken as a reference.

In this case, it is preferred that, before limiting inclination of the face to be detected, the inclination of the face to be detected be changed in a predetermined order with the group including the inclination of 180° positioned last.

In accordance with the present invention, there is further provided a fifth face detecting method in which, while changing a position and a size of a face to be detected, an index representing the probability that the fraction image in the position is a face image including a face of the size is calculated for each of the positions and sizes of the face to be detected, and a face image included in an input image is detected by extracting as a face image the fraction image whose index is not smaller than a first threshold value, wherein the improvement comprises the step of when the calculated index is not smaller than a second threshold value larger than the first threshold value, carrying out the subsequent calculation of the index limiting size of the face to be detected to the size upon calculation of the index.

In accordance with the present invention, there is further provided a third face detecting system for detecting a face image included in an input image comprising an index calculating means which calculates, while changing an inclination and a position of a face to be detected, an index representing the probability that the fraction image in the position is a face image including a face inclined by the inclination for each of the positions and inclinations of the face to be detected, and a face image extracting means which extracts as a face image the fraction image whose index is not smaller than a first threshold value, wherein the improvement comprises that when the calculated index is not smaller than a second threshold value larger than the first threshold value, the index calculating means carries out the subsequent calculation of the index limiting inclination of the face to be detected to the inclination upon calculation of the index.

In the third face detecting system of the present invention, the index calculating means may divide inclinations of all the faces to be detected into a plurality of groups each comprising a plurality of close different inclinations, and may carry out the calculation of the index by the groups.

In accordance with the present invention, there is further provided a fourth face detecting system for detecting a face image included in an input image comprising an index calculating means which calculates, while changing an inclination and a position of a face to be detected, an index representing the probability that the fraction image in the position is a face image including a face inclined by the inclination for each of the positions and inclinations of the face to be detected, and a face image extracting means which extracts as a face image the fraction image whose index is not smaller than a first threshold value, wherein the improvement comprises that the index calculating means divides inclinations of all the faces to be detected into a plurality of groups each comprising a plurality of close different inclinations, carries out the calculation of the index by groups, and when the calculated index is not smaller than a second threshold value larger than the first threshold value, carries out the subsequent calculation of the index limiting inclination of the face to be detected to the inclination upon calculation of the index.

The third and fourth face detecting system of the present invention may be further provided with a face image delete means which deletes as a non-face image the face image including a face inclined by an inclination different from the limited inclination in the face image detected before limiting inclination of the face to be detected.

Further in the third and fourth face detecting systems of the present invention, the plurality of groups may comprise four groups respectively containing four inclinations of 0°, 90°, 180°, 270° when the vertical direction of the input image is taken as a reference.

In this case, it is preferred that, the index calculating means changes, before limiting inclination of the face to be detected, the inclination of the face to be detected in a predetermined order with the group including the inclination of 180° positioned last.

In accordance with the present invention, there is further provided a fifth face detecting system for detecting a face image included in an input image comprising an index calculating means which calculates, while changing a position and a size of a face to be detected, an index representing the probability that the fraction image in the position is a face image including a face of the size for each of the positions and sizes of the face to be detected, and a face image extracting means which extracts as a face image the fraction image whose index is not smaller than a first threshold value, wherein the improvement comprises that the index calculating means, when the calculated index is not smaller than a second threshold value larger than the first threshold value, carries out the subsequent calculation of the index limiting size of the face to be detected to the size upon calculation of the index.

In accordance with the present invention, there is further provided a third computer program which causes a computer to function as a third face detecting system for detecting a face image in an input image by causing the computer to function as an index calculating means which calculates, while changing an inclination and a position of a face to be detected, an index representing the probability that the fraction image in the position is a face image including a face inclined by the inclination for each of the positions and inclinations of the face to be detected, and a face image extracting means which extracts as a face image the fraction image whose index is not smaller than a first threshold value, wherein the improvement comprises that when the calculated index is not smaller than a second threshold value larger than the first threshold value, the index calculating means carries out the subsequent calculation of the index limiting inclination of the face to be detected to the inclination upon calculation of the index.

In the third computer program of the present invention, the index calculating means may divide inclinations of all the faces to be detected into a plurality of groups each comprising a plurality of close different inclinations, and may carry out the calculation of the index by the groups.

In accordance with the present invention, there is further provided a fourth computer program which causes a computer to function as a fourth face detecting system for detecting a face image in an input image by causing the computer to function as an index calculating means which calculates, while changing an inclination and a position of a face to be detected, an index representing the probability that the fraction image in the position is a face image including a face inclined by the inclination for each of the positions and inclinations of the face to be detected, and a face image extracting means which extracts as a face image the fraction image whose index is not smaller than a first threshold value, wherein the improvement comprises that the index calculating means divides inclinations of all the faces to be detected into a plurality of groups each comprising a plurality of close different inclinations, carries out the calculation of the index by groups, and when the calculated index is not smaller than a second threshold value larger than the first threshold value, carries out the subsequent calculation of the index limiting inclination of the face to be detected to the inclination upon calculation of the index.

The third and fourth computer program of the present invention may further cause the computer to function as a face image delete means which deletes as a non-face image the face image including a face inclined by an inclination different from the limited inclination in the face image detected before limiting inclination of the face to be detected.

Further in the third and fourth computer program of the present invention, the plurality of groups may comprise four groups respectively containing four inclinations of 0°, 90°, 180°, 270° when the vertical direction of the input image is taken as a reference.

In this case, it is preferred that, the index calculating means changes, before limiting inclination of the face to be detected, the inclination of the face to be detected in a predetermined order with the group including the inclination of 180° positioned last.

In accordance with the present invention, there is further provided a fifth computer program which causes a computer to function as a fifth face detecting system for detecting a face image in an input image by causing the computer to function as an index calculating means which calculates, while changing a position and a size of a face to be detected, an index representing the probability that the fraction image in the position is a face image including a face of the size for each of the positions and sizes of the face to be detected, and a face image extracting means which extracts as a face image the fraction image whose index is not smaller than a first threshold value, wherein the improvement comprises that the index calculating means, when the calculated index is not smaller than a second threshold value larger than the first threshold value, carries out the subsequent calculation of the index limiting size of the face to be detected to the size upon calculation of the index.

Each of such computer programs of the present invention may be recorded on computer readable medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In this specification, the term "face image" means an image including an image forming a face.

The term "inclination of a face" means an inclination in the direction of in-plane (in the plane of the drawing) or in other words, the position of rotation on the image of the face.

Further, the expression "substantially the same in the inclination of the face as the highly reliable face image" means, for instance, that the difference in the inclination of the face between the prospective face image and the highly reliable face image is in a predetermined range, for instance, the angular difference therebetween is within ±45°.

In accordance with the first face detecting method, first face detecting system and the first computer program of the present invention, since a fraction image which is not smaller than a first threshold value in an index representing a probability that the fraction image is a face image is extracted from object images as prospective face image, a prospective face image whose index is larger than a second threshold value further larger than the first threshold value is determined to be a highly reliable face image and the index of the prospective face image which is substantially the same in the inclination of the face as the highly reliable face image is increased, and the prospective face image the index after the increase of which is not larger than a third threshold value which is between the first and second threshold value is detected as a face image, the reliability as a prospective face image can be more suitably reflected on the index of the prospective face image and escape of the face image or mistakes in detection of the face image can be suppressed on the basis of the rule of experience that it often happens that, when a highly reliable face image which can be considered not to be detected by mistake and to be a real face image is detected, a plurality of faces in an image are substantially the same in the orientation thereof.

Further, in accordance with the second face detecting method, second face detecting system and the second computer program of the present invention, since a fraction image which is not smaller than a first threshold value in an index representing a probability that the fraction image is a face image is extracted from object images as prospective face image, a prospective face image whose index is larger than a second threshold value further larger than the first threshold value is determined to be a highly reliable face image and only a prospective face image which is substantially the same in the inclination of the face as the highly reliable face image is detected as a face image, the prospective face image which is conceivable to be low in reliability can be rejected on the basis of the rule of experience that it often happens that a plurality of faces in an image are substantially the same in the orientation thereof, whereby wrong detection of the face image can be suppressed.

Further, in accordance with the third face detecting method, third face detecting system and the third computer program of the present invention, since, in the face detecting method for detecting a face image included in an input image where while changing an inclination and a position of a face to be detected, an index representing the probability that the fraction image in the position is a face image including a face inclined by the inclination for each of the positions and inclinations of the face to be detected is calculated, and the fraction image whose index is not smaller than a first threshold value is extracted as a face image, when the calculated index is not smaller than a second threshold value larger than the first threshold value, the subsequent calculation of the index is carried out limiting inclination of the face to be detected to the inclination upon calculation of the index, detection of inclinations of the face image which are different from that of the highly reliable image and are conceivable to be weak in probability that a face image is found and to be poor in necessity of detection can be abbreviated on the basis of the rule of experience that it often happens that, when a highly reliable face image which can be considered not to be detected by mistake and to be a real face image is detected, faces in an image are substantially the same in the orientation thereof, whereby the face detection can be carried out at high speed.

In accordance with the fourth face detecting method, fourth face detecting system and the fourth computer program of the present invention, since, in the face detecting method for detecting a face image included in an input image where while changing an inclination and a position of a face to be detected, an index representing the probability that the fraction image in the position is a face image including a face inclined by the inclination for each of the positions and inclinations of the face to be detected is calculated, and the fraction image whose index is not smaller than a first threshold value is extracted as a face image, when the calculated index is not smaller than a second threshold value larger than the first threshold value, inclinations of all the faces to be detected are divided into a plurality of groups each comprising a plurality of close different inclinations, the calculation of the index is carried out by groups, and when the calculated index is not smaller than a second threshold value larger than the first threshold value, the subsequent calculation of the index is carried out limiting inclination of the face to be detected to the inclination of the group to which the inclination belongs upon calculation of the index, detection of inclinations of the face image which are different from that of the highly reliable image and are conceivable to be weak in probability that a face image is found and to be poor in necessity of detection can be abbreviated on the basis of the rule of experience that it often happens that, when a highly reliable face image which can be considered not to be detected by mistake and to be a real face image is detected, faces in an image are substantially the same in the orientation thereof, whereby the face detection can be carried out at high speed.

In this case, since the inclination of face to be detected which is limited after the highly reliable face image is detected is not only the inclination of the highly reliable face image but is broadened to inclinations approximating the inclination of the face, even if a plurality of faces which slightly differ in the inclination from each other due to difference in posture of the object exist on the input image, the probability that the plurality of faces are detected is increased.

When, in the third and fourth detecting method, third and fourth face detecting system and the third and fourth computer program of the present invention, the face image including a face inclined by an inclination different from the limited inclination in the face images detected before limiting inclination of the face to be detected is deleted as a non-face image, the images which are weak in the probability that they are real face images can be rejected and wrong detection of the face image can be suppressed.

In accordance with the fifth face detecting method, fifth face detecting system and the fifth computer program of the present invention, since, in the face detecting method for detecting a face image included in an input image where while changing a position and a size of a face to be detected, an index representing the probability that the fraction image in the position is a face image including a face of the size is calculated for each of the positions and sizes of the face to be detected, and a face image included in an input image is detected by extracting as a face image the fraction image whose index is not smaller than a first threshold value, when the calculated index is not smaller than a second threshold value larger than the first threshold value, the subsequent calculation of the index is carried out limiting size of the face to be detected to the size upon calculation of the index, detection of sizes of the face image which are different from that of the highly reliable image and are conceivable to be weak in probability that a face image is found and to be poor in necessity of detection can be abbreviated on the basis of the rule of experience that it often happens that, when a highly reliable face image which can be considered not to be detected by mistake and to be a real face image is detected, faces in an image are substantially the same in the size thereof, whereby the face detection can be carried out at high speed.

BRIEF DESCRIPTION OF THE DRAWINGS

FIG. 1 is a block diagram showing the arrangement of the face detecting system of the first embodiment of the present invention, FIG. 2 is a view showing steps of making the object image have a multiple resolution, FIG. 3 is a view showing an example of the conversion curve employed in normalizing the whole, FIG. 4 is a view showing a concept of the local normalization, FIG. 9 is a view for illustrating calculation of the feature value in the weak determiner, FIG. 12 is a view showing the method of deriving a histogram of the weak determiner, FIG. 13A is a part of the flowchart showing the processing to be carried out by the face detecting system of the first embodiment, FIG. 13B is the other part of the flowchart showing the processing to be carried out by the face detecting system of the first embodiment, FIG. 14 is a view for illustrating switching of resolution images which are to be an object image and movement of the sub-window thereon, FIG. 16A is a part of the flowchart showing the processing to be carried out by the face detecting system of the second embodiment, FIG. 23A is a part of the flowchart showing the processing to be carried out by the face detecting system of the third embodiment, FIG. 25A is a part of the flowchart showing the processing to be carried out by the face detecting system of the fourth embodiment, FIG. 27A is a part of the flowchart showing the processing to be carried out by the face detecting system of the sixth embodiment.

DESCRIPTION OF THE PREFERRED EMBODIMENT

Figure 5:
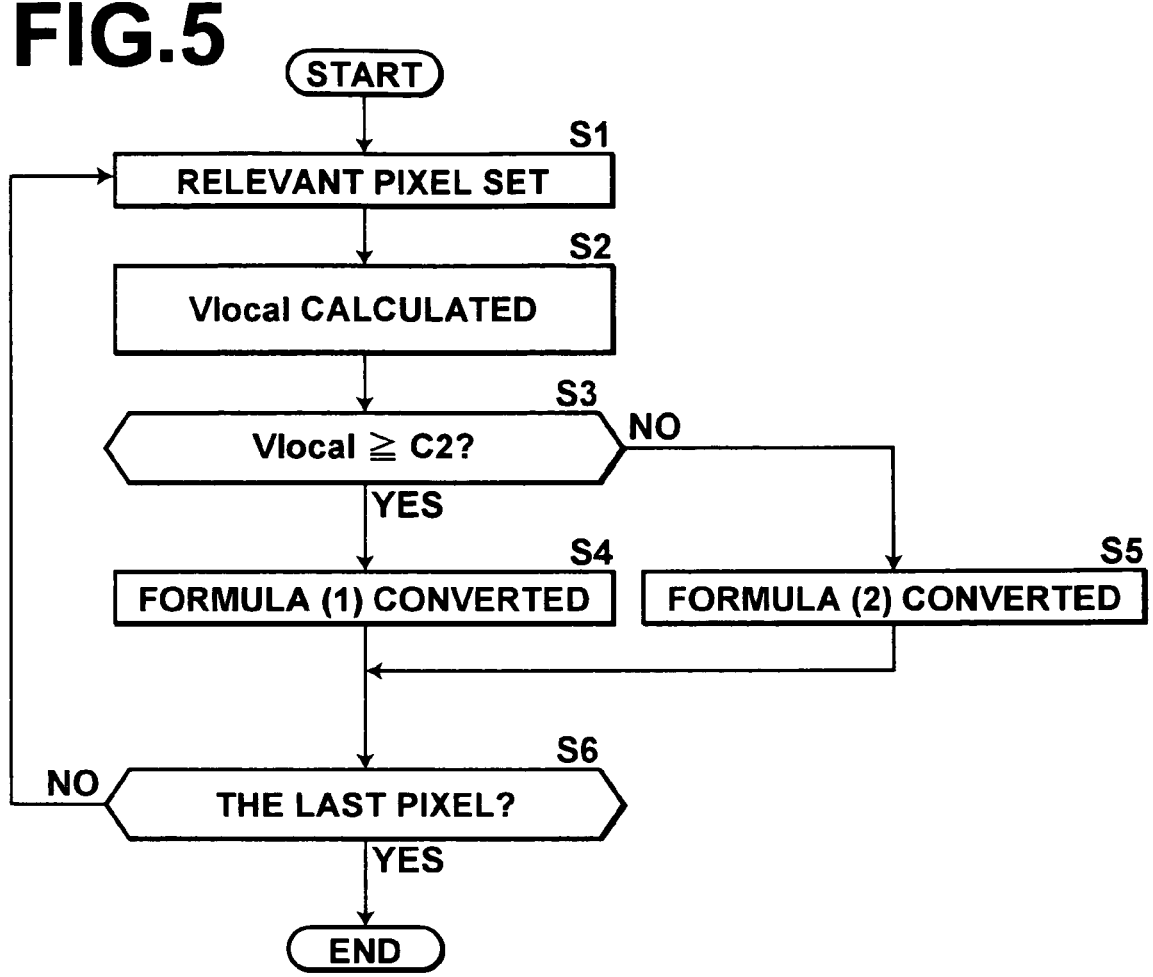
FIG. 5 is a view showing a flow of the local normalization.

FIG. 1 is a block diagram showing in brief the arrangement of the face detecting system 1 in accordance with a first embodiment of the present invention. The face detecting system 1 detects a face image including therein a face in the input digital image irrespective of the position, size, inclination (rotational position in the plane of the image) or the orientation (an orientation in the direction in which the neck is swung) of the face. The face detecting system 1 employs a technic using a determiner module (will be referred to simply as "determiner" hereinbelow) generated by the machine learning with a sample image, which is said to be excellent especially in the detecting accuracy and the robust. In this technic, a determiner is caused to learn the feature of the face by the use of a plurality of different face image samples which have substantially the same orientations and inclination of the faces and a plurality of different non-face image samples, to prepare a determiner which is capable of determining whether an image is a face image which has predetermined orientation and inclination, and fraction images are cut in sequence from the image to be detected for a face (to be referred to as "the object image", hereinbelow) to determine with the determiner whether each of the fraction images is a face image, whereby the face image on the object image is detected. As shown in FIG. 1, the face detecting system 1 comprises a multiple resolution portion 10, a normalizing portion 20, a face detecting portion 30 and a double detection determining portion 40.

The multiple resolution portion 10 makes the input object image So have a multiple resolutions to obtain a resolution image group S1 comprising a plurality of images S1_1, S1_2, ... S1_n (referred to as "the resolution images", hereinbelow).

The multiple resolution portion 10 converts the image size that is, the resolution (the image size) of the object image S to a predetermined resolution, thereby normalizing the object image S to a predetermined resolution, an image having a size of a rectangle, for instance, of 416 pixels in the shorter side and obtaining a normalized input image So', and obtains the resolution image group S1 by generating the plurality of the resolution images different in the resolution by carrying out a resolution conversion on the basis of the normalized input image So'.

The reason why such a resolution image group is generated is that since though the size of the face included in the object is generally unknown, the size of the face (image size) to be detected is fixed to a predetermined size in conjunction with the method of generating a determiner to be described later, it is necessary to cut out the fraction images of a predetermined size while shifting the position on the images different in resolution and to determine whether each of the fraction images is a face image.

FIG. 2 is a view showing steps of making the object image have a multiple resolution. In making the object image have a multiple resolution, that is, generation of the resolution image group, specifically, as shown in FIG. 2, the processing of making the normalized object image be a resolution image S1_1 which makes a reference resolution image, previously generating a resolution image S1_2 ($2^{-1/3}$-fold of the resolution image S1_1 in size) and a resolution image S1_3 ($2^{-1/3}$-fold of the resolution image S1_2 in size, $2^{-2/3}$-fold of the reference resolution image S1_1 in size), subsequently reducing in size the resolution images S1_1, S1_2 and S1_3 to ½ of the original size, and further reducing them to ½ in size is repeated to generate resolution images in a predetermined number. By this, ½ reduction where it is not necessary an interpolation of the pixel value representing brightness is employed as a main processing, and a plurality of images which are reduced in size by $2^{-1/3}$-fold of the reference resolution image by $2^{-1/3}$-fold of the reference resolution are generated at a high speed. For example, when it is assumed that the resolution image S1_1 has a size of rectangle of 416 pixels in the shorter side, the resolution images S1_2 and S_3, ... have sizes of a rectangle of 330 pixels, 262 pixels, 208 pixels, 165 pixels, 131 pixels, 104 pixels, 82 pixels, 65 pixels, ... in the shorter side and a plurality of images which are reduced in size by $2^{-1/3}$-fold of the reference resolution image by $2^{-1/3}$-fold of the reference resolution are generated.

Since having a strong tendency to hold the feature of the original image pattern, the images generated without the interpolations of the pixel values are preferred in that an improvement of accuracy in the face detection processing can be expected.

The normalizing portion 20 carries out a whole normalization and a local normalization on each of the resolution images so that the resolution images come to be suitable for the face detection to be executed later and obtains a resolution image group S1' comprising a plurality of normalized resolution images $S1'\_1, S1'\_2, \ldots S1'\_n$.

The whole normalization will be described first. The whole normalization is a process to convert the pixel values of the whole resolution image according to a conversion curve which causes the pixel values of the whole resolution image to approach the logarithmic value thereof in order to cause the contrast of the resolution image to approach a level suitable for the face detection, that is, for deriving performance of the determiner to be described later.

FIG. 3 is a view showing an example of the conversion curve employed in the whole normalization. As the whole normalization, a processing of converting the pixel values of the whole resolution image according to a conversion curve (lookup table) such as shown in FIG. 3 where a so-called inverse γ-conversion (raising to 2.2-th power) in the sRGB space is carried out on the pixel values and then the logarithmic values of the converted pixel values are further taken is conceivable. This is on the basis of the following reasons.

The light intensity I observed as an image is generally represented as a product of the reflectance R of the object and the intensity L of the light source (I=R×L). Accordingly, when the intensity L of the light source changes, the light intensity I observed as an image also changes but if the reflectance of the object can only be evaluated, the face detection can be carried out at high accuracy without depending on the intensity L of the light source, that is, being affected by lightness of the image.

When it is assumed that the intensity of the light source is L, the intensity observed from a part of the object where the reflectance is R1 is I1 and the intensity observed from a part of the object where the reflectance is R2 is I2, the following formula holds in the space where the logarithmic values are taken.

$$\log(I1)-\log(I2)=\log(R1\times L)-\log(R2\times L)=\log(R1)+\log(L)-(\log(R2)+\log(L))=\log(R1)-\log(R2)=\log(R1/R2)$$

That is, conversion of pixel values in an image to the logarithmic values means conversion to a space where ratios in the reflectance are expressed as differences between the same. In such a space, it is possible to evaluate only the reflectance of an object which does not depend upon the intensity L of the light source. In other words, contrasts (difference between pixel values itself, here) which differ depending upon the lightness in the image can be uniformed.

On the other hand, the color space of an image obtained by an instrument such as a general digital still camera is sRGB. The sRGB is a color space of the international standard where color and chroma are defined and integrated in order to integrate the difference in color reproduction among instruments, and in this color space, the pixel values of images are values obtained by raising input brightness by 1/γout (=0.45)-th power in order to make feasible to suitably reproduce color in image output instruments where γ value (γ out) is 2.2.

Accordingly, by carrying out on the pixel values of the whole image a so-called inverse γ conversion, that is, according to a conversion curve for raising the pixel values by 2.2-th power and then taking logarithmic values thereof, an object which does not depend upon the intensity of the power source can be suitably evaluated only by the reflectance.

Such whole normalization is in other words to convert the pixel values of the whole image according to a conversion curve for converting a specific color space to a color space having other characteristics.

When such processing is carried out on the object image to be detected, the contrast of the object image which differs from the image to image according to the lightness of the image can be uniformed and face detecting accuracy is improved. The whole normalization is characterized in that the processing time is short though the result is apt to be affected by oblique rays, background or input modality.

The local normalization will be described next. The local normalization is a process to suppress unevenness in contrast of the local areas in the resolution image. That is, first and second brightness gradation conversion processes are carried out on the resolution image. The first brightness gradation conversion process is carried out on the local area where the degree of dispersion of the pixel values representing the brightness is not lower than a predetermined level and causes the degree of dispersion to approach a certain level higher than the predetermined level. The second brightness gradation conversion process is carried out on the local area where the degree of dispersion of the pixel values representing the brightness is lower than said predetermined level and suppresses the degree of dispersion to a level lower than said certain level. The local normalization is characterized in that the processing time is long though the result is less apt to be affected by oblique rays, background or input modality.

FIG. 4 is a view showing a concept of the local normalization, and FIG. 5 is a view showing a flow of the local normalization. The following formulae (1) and (2) are formulae of brightness gradation conversion to be carried out on the pixel values for the local normalization.

if Vlocal≧C2

$$X'=(X-m\text{local})(C1/SD\text{local})+128 \quad (1)$$

if Vlocal<C2

$$X'=(X-m\text{local})(C1/SDc)+128 \quad (2)$$

wherein X, X', mlocal, Vlocal, SDlocal, (C1×C1), C2 and SDc respectively represent the pixel value of the relevant pixel, the pixel value of the relevant pixel after conversion, the mean of the pixel values in the local area about the relevant pixel, the dispersion of the pixel values in the local area, the standard deviation of the pixel values in the local area, the reference value corresponding to said certain level, a threshold value corresponding to said predetermined level and a predetermined constant. In this embodiment, the number of gradation of the brightness is in 8 bits and the value which the pixel value can take is from 0 to 255.

As shown in FIG. 5, one pixel in a resolution image is set as a relevant pixel (step S1), the dispersion Vlocal of the pixel values in the local areas of a predetermined size, e.g., 11×11 pixel size, about the relevant pixel is calculated (step S2), and whether the dispersion Vlocal is not lower than a threshold value C2 corresponding to said predetermined level is determined (step S3). When it is determined in step S3 that the dispersion Vlocal is not lower than the threshold value C2, the gradation conversion where the difference between the pixel value X of the relevant pixel and the mean value mlocal is reduced as the dispersion Vlocal is larger than the reference value C1×C1 corresponding to said certain level and increased as the dispersion Vlocal is smaller than the reference value C1×C1 is carried out according to formula (1) as the first brightness gradation conversion process (step S4). When it is determined in step S3 that the dispersion Vlocal is lower than the threshold value C2, the gradation conversion is carried out according to formula (2) which does not depend upon the dispersion Vlocal as the second brightness gradation conversion process (step S5). Then whether the relevant pixel which has been set in Step S1 is the last one is determined (step S6). When it is determined in step S6 that the relevant pixel is not the last one, the processing returns to step S1 and the next pixel in the same resolution image is set as a relevant pixel. When it is determined in step S6 that the relevant pixel is the last one, the local normalization on the resolution image is ended. By repeating the processing shown in steps S1 to S6, the local normalization can be wholly carried out on the resolution image.

The predetermined level maybe changed according to the brightness of the whole area or a part of the local area. For example, in the normalization described above, where gradation conversion is carried out on a relevant pixel, the threshold value C2 may be changed according to the pixel value of the relevant pixel. That is, the threshold value C2 corresponding to the predetermined value may be higher when the brightness of the relevant pixel is relatively high while may be lower when the brightness of the relevant pixel is relatively low. By this, even a face which exists at a low contrast (with the dispersion of the pixel values being low) in a so-called dark area where the brightness is low can be correctly normalized.

Here assuming that the inclination of the face to be detected is included in a twelve inclinations set by rotating a face by 30° about the vertical direction of the input image S0 in a plane of the input image S0, the switching order of inclination of the face to be detected has been set in advance as an initialization. For example, when expressed in the clockwise direction about the vertical direction of the input image S0, the order is 0°, 330°, 30° (0° group: three directions directed upward), 90°, 60°, 120° (90° group: three directions directed rightward), 270°, 240°, 300° (270° group: three directions directed leftward), 180°, 150°, 210° (180° group: three directions directed downward).

The face detecting portion 30 detects face images S2 included in each of the resolution images by carrying out the face detection on each resolution image of the resolution image group S1' normalized by the normalizing portion 20 while changing the inclination of the face to be detected in the preset order and comprises a plurality of elements.

Figure 6:
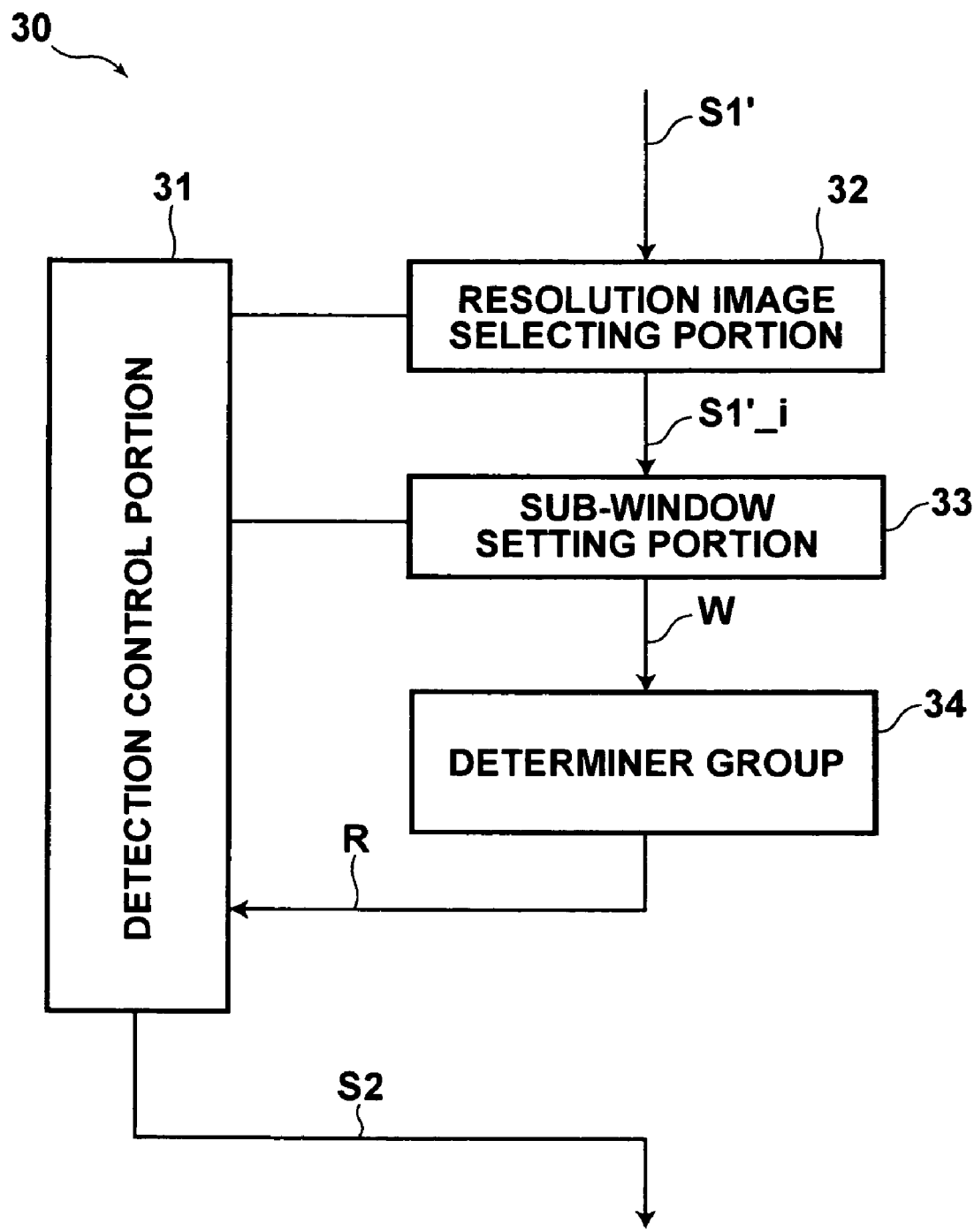
FIG. 6 is a block diagram showing the arrangement of the face detecting portion.

As shown in FIG. 6, the face detecting portion 30 comprises a detection controlling portion (highly reliable image determining means, face detecting means) 31, a resolution image selecting portion 32, a sub-window setting portion (fraction image cut-out means) 33, and a determiner group 34 (index calculating means, prospective face image extracting means).

The detection controlling portion 31 controls the other parts forming the face detecting portion 30 to carry out a sequence control in the face detection. That is, the detection controlling portion 31 controls the resolution image selecting portion 32, the sub-window setting portion 33, and the determiner group 34 and detects a real face image S2 for each resolution image by cutting out the fraction images in sequence from each resolution image forming the resolution image group S1', applying all the determiners in a plurality of kinds of determiners the inclination of face to be detected by which is different from each other to the fraction image cut out, extracting a prospective face image irrespective of the inclination of the face and determining whether the prospective images are real face images. For example, the detection controlling portion 31 instructs a selection of the resolution image at a proper timing to the resolution selecting portion 32 or instructs sub-window setting conditions under which the sub-windows are set to the sub-window setting portion 33, or switches the kind of determiners to be employed in the determiners forming the determiner group 34. The sub-window setting conditions include the range of the image in which the sub-window is to be set, and the intervals at which the sub-window is moved (roughness of the detection).

The resolution image selecting portion 32 selects a resolution image to be employed in the face detection in the resolution image group S1' in sequence in the order in which the size becomes smaller (or the resolution becomes rougher) under the control of the detection controlling portion 31. Since the technic of this embodiment is a technic of detecting a face in the input image S0 by determining whether the fraction images W cut out from each resolution images in the same size are face images, the resolution selecting portion 32 may be conceived to set the size of the face to be detected in the object image S0 while changing the same from the large to the small every time.

The sub-window setting portion 33 sets the sub-window for cutting out the fraction image W which is to be determined whether it is a face image in the resolution image selected by the resolution image selecting portion 32 while shifting the position thereof under the sub-window setting conditions set by the detection controlling portion 31.

For example, when a sub-window for cutting out fraction images W of a predetermined size, e.g., a 32×32 pixel size are set in sequence while moving the sub-window by a predetermined number of pixels, for instance, by two pixels, and the cut out fraction images W are input into the determiner group 34. Since each of the determiners forming the determiner group 34 determines a face image including a face having a predetermined inclination and a predetermined orientation of the face as described later, face images including a face in all the orientations and all the inclinations can be determined by doing so.

The determiner group 34 calculate a score SC representing the probability that the fraction image W is a face image including a face inclined in the predetermined inclination and oriented in the predetermined orientation while changing the predetermined inclination and orientation on the basis of the image pattern of the fraction image W and extracts the fraction image W the calculated score SC of which is not smaller than a first threshold value Th1 as the prospective face images S2 including a face inclined in the predetermined inclination and oriented in the predetermined orientation when the score is calculated.

Figure 7:
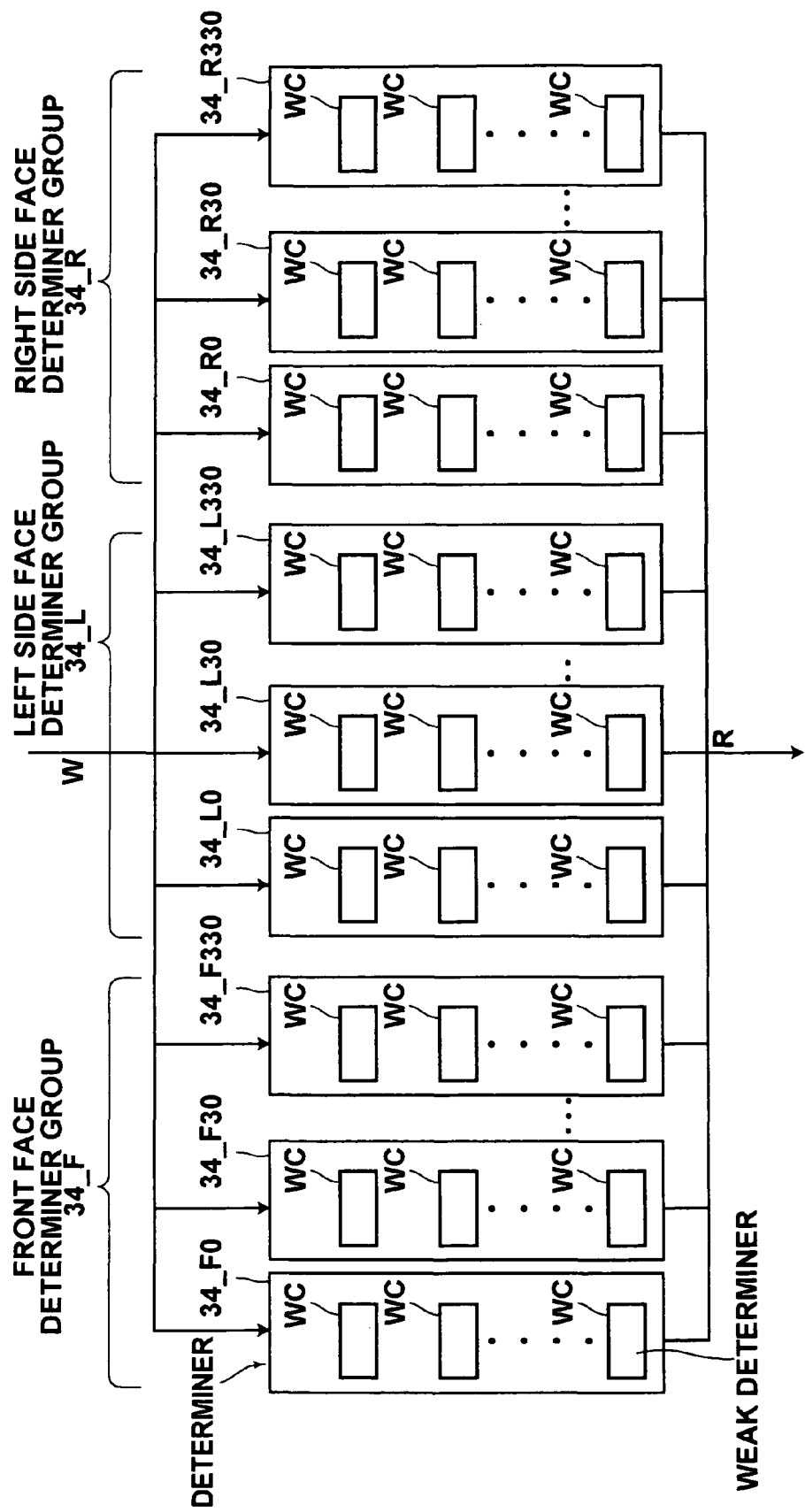
FIG. 7 is a block diagram showing the arrangement of the determiner.

FIG. 7 is a view showing the arrangement of the determiner groups 34. As shown in FIG. 7, in the determiner group 34, a plurality of determiner groups which are different in faces to determine, that is, a first full face determiner group 34_F for mainly detecting full face images, a first left side face determiner group 34_L for mainly detecting left side face images, and a first right side face determiner group 34_R for mainly detecting right side face images, are connected in parallel. Further, these three kinds of determiner groups 34_F, 34_L and 34_R respectively comprise determiners which correspond to a total twelve orientations which are different from each other in faces to determine by 30° about the vertical direction of the fraction image. That is, the first full face determiner group 34_F comprises a determiner 34_F0, 34_F30, . . . 34_F330, the first left side face determiner group 34_L comprises a determiner 34_L0, 34_L30, . . . 34_L330 and the first right side face determiner group 34_R comprises a determiner 34_R0, 34_R30, . . . 34_R330.

As shown in FIG. 7, each of the above described determiners has a plurality of weak determiners WC, and the weak determiners Wc calculate at least one feature value concerning to the pixel value distribution of the fraction image W, and the determiner calculates the score SC representing a probability that the fraction image W is a face image including a face inclined in the predetermined inclination and oriented in the predetermined orientation by the use of the feature value.

In the determiner groups 34, the determinable orientation of the face is of the three kinds, the full face, the left side face and the right side face. However, determiners which determine an oblique right face or an oblique left face may be further provided in order to increase the accuracy of detecting a face directed obliquely.

The arrangement of each of the determiners forming the determiner group 34, the flow of processing in the determiner and the method of learning of the determiner will be described, hereinbelow.

The determiner comprises a plurality of weak determiners WC which have been selected to be effective to the determination from a number of weak determiners WC by a learning to be described later. Each weak determiner WC calculates the feature value from the fraction image W according to the algorithm natural to the weak determiner WC and calculates a score sc representing the probability that the fraction image W is a face image including a face oriented in a predetermined orientation and inclined at a predetermined inclination on the basis of the feature value and its histogram (to be described later) as the predetermined score table. The determiner sums up all the scores sc obtained by these weak determiners WC and calculates a final score SC representing the probability that the fraction image W is a face image including a face oriented in a predetermined orientation and inclined at a predetermined inclination. The fraction image W which is not smaller than a first threshold value Th1 in the final score SC is extracted as a prospective face image S2 including a face oriented in the predetermined orientation and inclined at the predetermined inclination.

Figure 8:
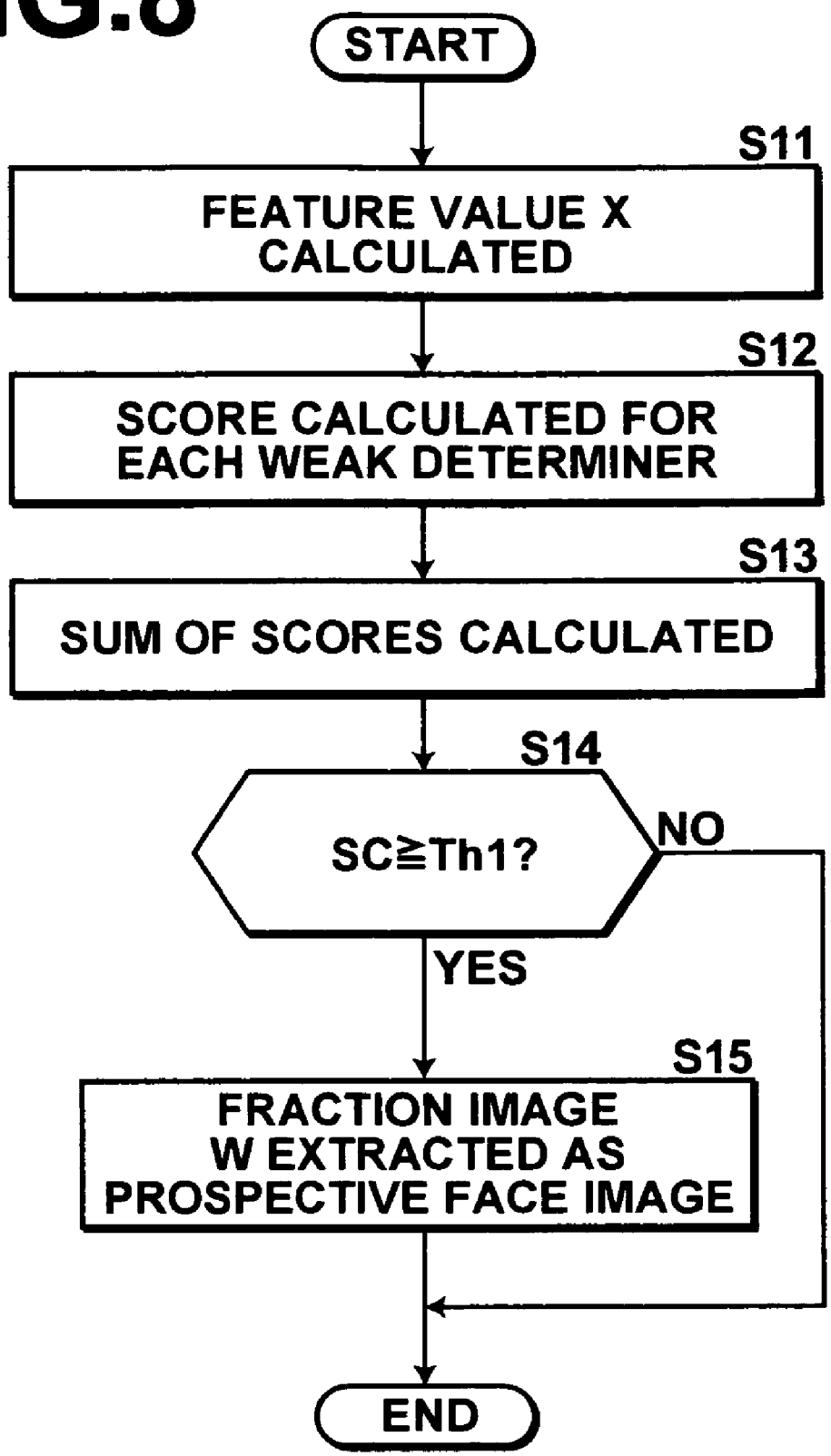
FIG. 8 is a view showing a flow of the processing in the determiner.

FIG. 8 is a flowchart showing the flow of the processing in one determiner. When the fraction image W is input into the determiner, the feature values x different in kind are calculated in a plurality of weak determiners WC. (step S11) For example, by carrying out a four vicinity pixel averaging (the image is divided into a plurality of blocks by every pixel size of 2×2, and the average of the pixel values of the four pixels in each block is taken as the pixel value of the pixel corresponding to the bock) on the fraction image of the predetermined size, e.g., 32×32 in pixel size, as shown in FIG. 9, an image 16×16 in pixel size and an image 8×8 in pixel size which are reduced in pixel size are obtained and predetermined two points set in the plane of three images, the two images plus the original image, are taken as one pair, and the difference in the pixel value (brightness) between the two points of each pair forming one pair group comprising a plurality of pairs is calculated and a combination of the differences is taken as the feature value. The predetermined two points of each pair are, for instance, vertically arranged two points or horizontally arranged two points so that a density feature of the face in the image is reflected. Then a value corresponding to the combination of the differences which is the feature value is calculated as x. Then a score sc of a probability that the fraction image W is a face image representing a face which is to detect (For example, in the case of the determiner 34_F30, an image of a face whose orientation is front and whose inclination is rotation at 30°) is obtained for each of the weak determiner from the predetermined score table (own histogram) according to the value of x. (step S12) By summing up all the scores sc calculated by the individual weak determiners, the final score SC is obtained. (step S13) Whether the final score SC is not larger than the first threshold value Th1 is determined (step S14), and when it is determined in step S14 that the final score SC is not larger than the first threshold value Th1, the fraction image W is extracted as a prospective face images S2 including a face inclined in the predetermined inclination and oriented in the predetermined orientation which the determiner is to determine (step The method of learning (generation) of the determiner will be described, hereinbelow.

Figure 10:
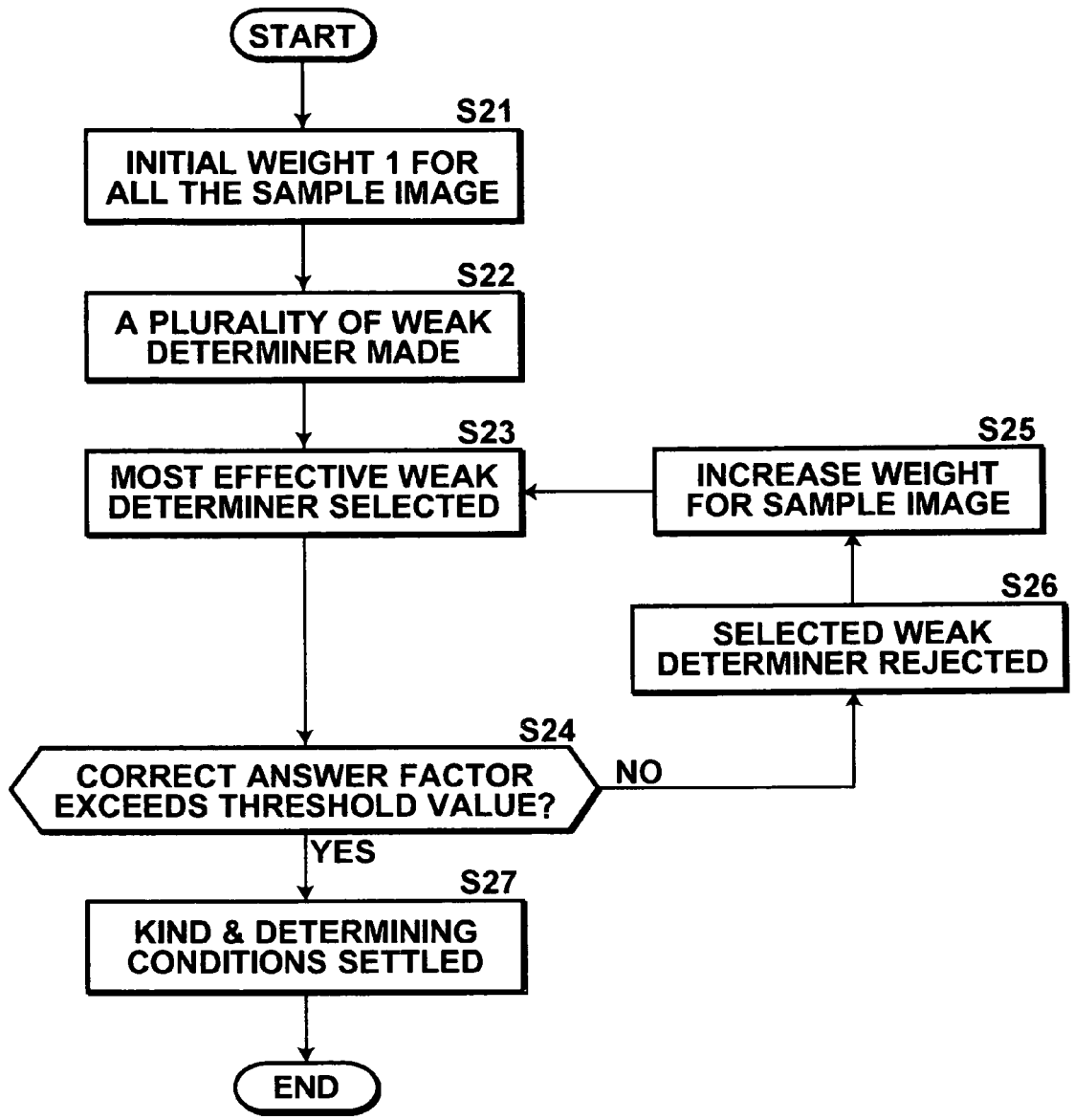
FIG. 10 is a flowchart showing the learning method of the determiner.

FIG. 10 is a flowchart showing the learning method of the determiner. For learning of the determiner, a plurality of sample images which has been normalized to a predetermined size, for instance, 32×32 pixel size, and which has been processed in the same manner as the normalization by the normalizing portion 20 described above. As the sample images, a face sample image group comprising a plurality of different images which have been known to include a face, and a non-face sample image group comprising a plurality of different images which have been known not to include a face are prepared.

Figure 11:
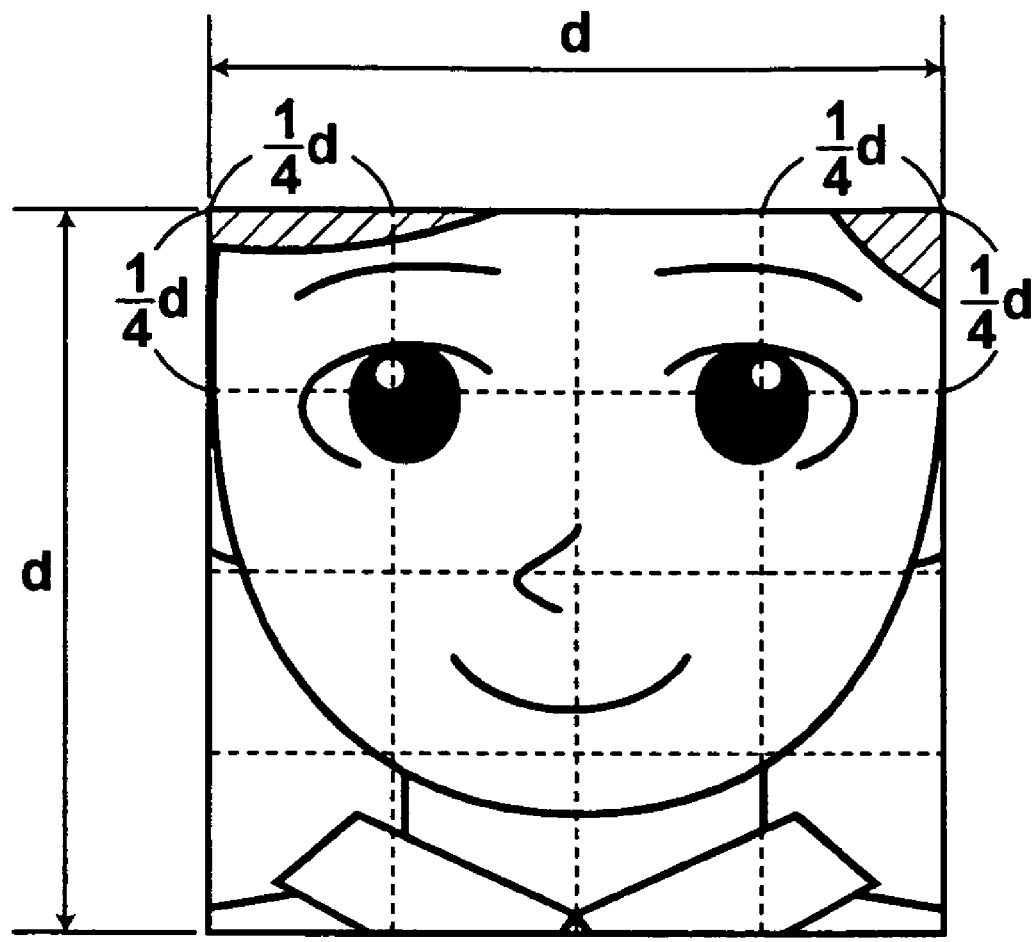
FIG. 11 is a sample face image normalized so that the eye position is brought to a predetermined position.

The face sample image group employs a plurality of variations obtained by rotating 3° by 3° in the range of ±15° in a plane sample images which are obtained by stepwise reducing the size of one face sample image 0.1-fold by 0.1-fold vertically and/or horizontally in the range of 0.7- to 1.2-fold. At this time, the face sample image is normalized so that the eyes are brought to a predetermined position and the above rotation and reduction in size are effected on the basis of the position of the eyes. For example, in the case of the sample image of d×d size, as shown in FIG. 11, the size and position of the face are normalized so that the left and right eyes are respectively brought to d/4 inward from the left uppermost edge of the sample image and from the right uppermost edge of the sample image and the above rotation and reduction and enlargement in size are effected about the intermediate point of the eyes.

The sample images are allotted with weights or the degree of importance. First the initial weights on all the sample images are equally set to 1 (step S21)

Then with predetermined two points set in the planes of the sample image and the reduced image thereof taken as one pair, a plurality of pair groups each comprising a plurality of pairs are set. For each of the plurality of pair groups, the weak determiner is made (step S22). Each of the weak determiners provides a reference on the basis of which a face image and an on-face image is determined by the use of a combination of the difference values in pixel values (brightness) between two points of each pair forming one pair group when a plurality of pair groups are set with predetermined two points set in the planes of the fraction image cut out by the sub-window W and the reduced image thereof taken as one pair. In this embodiment, a histogram on a combination of difference values between the two points of each of the pairs forming one pair group is employed as a base of the score table of the weak determiner.

FIG. 12 shows generation of the histogram from the sample image. As shown by a sample image in the left side of FIG. 12, two points of each pair forming pair groups for making the determiner are P1-P2, P1-P3, P4-P5, P4-P6 and P6-P7 wherein, in a plurality of sample images which have been known to be a face image, a point on the center of the right eye in the sample image is represented by P1, a point on the right cheek in the sample image is represented by P2, a point on the middle of the forehead in the sample image is represented by P3, a point on the center of the right eye in the 16×16 reduced image reduced by four vicinity pixel averaging is represented by P4, a point on the right cheek in the image is represented by P5, a point on the forehead in the 8×8 reduced image reduced by four vicinity pixel averaging is represented by P6 and a point on the mouth in the image is represented by P7. The two points of each pair forming one pair group for making a determiner are the same in the coordinate positions in all the sample images. A combination of the difference values between two points of each pair for the above described five pairs are obtained for all the sample images which have been known to be a face image, and the histogram thereof is made. The values of a combination of the difference values can take 65536 ways per one difference value of the pixel values assuming that the number of gradation of the brightness of the image is of 16 bit gradation, though depending upon the number of gradation of the brightness of the image. And it is in the whole, 65536 to the number of gradation (the number of pairs)-th power, that is, fifth power of 65536, which requires a vast number of samples and memories and a long time for learning and detection. Accordingly, in this embodiment, the difference values in the pixel values are divided in a suitable width, and quantized into n-valued (e.g., n=100) values. With this arrangement, the number of combinations of the difference values in the pixel values becomes fifth power of n, and the number of pieces of data representing the number of combinations of the difference values in the pixel values can be reduced.

Similarly, also for non-face sample images which have been known not to be a face image, a histogram is made. For the non-face sample images, positions corresponding to the positions of the points employed in the face sample images are employed (indicated at the same reference numerals P1 to P7). The rightmost histogram in FIG. 12 is a histogram on the basis of which the score table of the weak determiner is made and which is made on the basis of the logarithmic values of the ratio of the frequencies shown by said two histograms. Each value of the ordinate shown by the histogram of the weak determiner will be referred to as "the determining point", hereinbelow. According to the determiner, there is a strong probability that an image which exhibits a distribution of the combination of the difference values of the pixel values corresponding to a positive determining point is a face image, and the probability becomes stronger as the absolute value of the determining point increases. Conversely, there is a strong probability that an image which exhibits a distribution of the combination of the difference values of the pixel values corresponding to a negative determining point is not a face image, and the probability becomes stronger as the absolute value of the determining point increases. In step S22, there is made a plurality of weak determiners which are in the form of the above histogram on combinations of difference in pixel values between predetermined two points on each pair of the plurality of kinds of the pair groups which can be employed in determination.

Subsequently, the weak determiner the most effective in determining whether an image is a face image is selected from the weak determiners made in step S22. Selection of the most effective weak determiner is effected taking into account the weight of each sample images. In this example, the weighted correct answer factors of the weak determiners are compared and the determiner which exhibits the highest weighted correct answer factor is selected (step S23). That is, since the weights of the sample image is equally 1 in the first step S23, the weak determiner by which whether the sample image is a face image is correctly determined in the largest number is simply selected as the most effective weak determiner. On the other hand, in the second step S23 where the weights of the sample images have been updated in step S25 to be described later, sample images having a weight of 1, having a weight heavier than 1, and having a weight lighter than 1 mingle with each other, and the sample images having a weight heavier than 1 is counted more than the sample images having a weight of 1 by an amount heavier than 1 in the evaluation of the correct answer factor. With this arrangement, in the second and the following step S23, that the sample images having a heavier weight is correctly determined is emphasized more than that the sample images having a lighter weight is correctly determined.

Then whether the correct answer factor of a combination of the weak determiners selected up to the time, that is, the ratio at which the result of determining whether the sample images are a face image by the use of a combination of the weak determiners selected up to the time conforms to the real answer (the weak determiners need not be linearly connected in the learning stage), exceeds a predetermined threshold value is checked (step S24). Either the currently weighted sample image group or the equally weighted sample image group may be employed here when the correct answer factor of a combination of the weak determiner is evaluated. When the correct answer factor exceeds the predetermined threshold value, the learning is ended since the weak determiners selected up to the time can determine whether the image is a face image at a sufficiently high probability. When the correct answer factor is not larger than the predetermined threshold value, the processing proceeds to step S26 in order to select an additional weak determiner to be employed in combination of the weak determiners selected up to the time.

In step S26, in order not to be selected again the weak determiner selected in the immediate step S23, the weak determiner is rejected.

Then the weight of the sample image which has not been correctly determined whether it is a face image by the weak determiner in the immediate step S23 is increased while the weight of the sample image which has been correctly determined whether it is a face image by the weak determiner in the immediate step S23 is reduced (step S25). The reason why the weight is increased or reduced is that the images which have not been correctly determined whether they are a face image by the already selected weak determiner is emphasized so that the weak determiner which can determine whether the images are a face image is selected, whereby the effect of combination of the weak determiners is increased.

The processing is subsequently returned to step S23 and the weak determiner which is second most effective is selected on the basis of the weighted correct answer factor as described above. The kind of determiners and the determining conditions for determining whether the sample image is a face image are established (step S27) and the learning is ended when the correct answer factor to be checked exceeds the threshold value in step S24 at a time a weak determiner corresponding to a combination of the difference in the pixel value between predetermined two points on pairs forming a specific pair group is selected as a weak determiner suitable for determining whether the sample image is a face image while steps S23 to S26 are repeated. The weak determiners selected are linearly connected in the order in which the correct answer factor is higher and one determiner is formed. As for each of the weak determiners, a score table for calculating a score according to the combination of the differences in the pixel value is generated on the basis of a histogram obtained for each of the weak determiners. Histogram itself may be used as the score table and in this case, the determining points on the histogram is the score as it is.

The determiners are thus generated by learning using face sample images and non-face sample images. In order to generate a plurality of determiners which are different in inclination and orientation of the face to be determined, face sample image groups corresponding to the inclination and orientation are prepared and learning by the use of the face sample image groups and non-face sample image groups are effected by the kind of the face sample image group.

That is, in this embodiment, three kinds, the full face, the left side face and the right side face as for the orientation of the face and twelve kinds by 30° from the rotational angle 0° to 330° to the grand total of thirty-six kinds sample images are prepared.

When the plurality of face sample image groups are obtained, the learning described above is effected by the use of the face sample image groups and the non-face sample image groups, whereby a plurality of determiners forming the determiner group 34 can be generated.

When a plurality of determiners which have learned by the orientations and the inclinations of the face, face images including faces variously inclined and oriented can be determined.

When the learning method described above is employed, the weak determiner may be any without limited to those in the form of a histogram so long as it provides a reference on the basis of which whether the sample image is a face image or a non-face image is determined by the use of a combination of the differences in pixel value between predetermined two points on the pairs forming a specific pair group, and may be, for instance, two-valued data, a threshold value or a function. Further, even the histogram representing the distribution of the difference between the two histograms shown at the center of FIG. 12 may be used.

Further, the learning method need not be limited to the above technic but other technics of machine learning such as a neural network may be employed.

When prospective face images are extracted by a plurality of kinds of determiners, the detection controlling portion 31 determines whether the prospective face images are real face images S2 as previously mentioned. At this time, the detection controlling portion 31 determines a prospective face image whose score is not smaller than a second threshold value Th2 which is larger than the first threshold value Th1 as a highly reliable prospective face image in the prospective face image and processes a prospective face image the inclination of the face of which is substantially the same as that of the highly reliable prospective face image in the prospective face image so that the score SC of the prospective face image is increased, for instance, to adds a special score to the score SC. Then the prospective face image whose score SC after the processing is larger than a third threshold value Th3 which is between the first threshold value Th1 and the second threshold value Th2 is detected as a real face image S2. The prospective face image which is substantially the same in the inclination of the face as the highly reliable face image means, for instance, a prospective face image whose difference in the inclination of the face from that of the highly reliable face image is, for instance, is within ±30° in the angular difference.

The double detection determining portion 40 carries out processing to determine on the basis of the relative positions of the face images whether each of the face image S2 detected on each of the resolution images represents the same face on the object image SO and has been detected double on a plurality of the resolution images which are adjacent to each other in resolution, integrates into one a plurality of face images to be recognized as doubled and outputs real face images S3 without the images to be detected double. When the object image S0 is made to have a multiple resolutions to obtain a plurality of resolution images, the gap in resolution between adjacent resolutions cannot be so large in order to prevent escape of faces in detection. Whereas the determiner generally has a margin in the size of the detectable face. In such a case, the same face on the object image S0 can be sometimes detected double on a plurality of adjacent resolution images. The processing by the double detection determining portion 40 described above is carried out to remove such double detection and obtain the accurate result.

The flow of processing in the face detecting system 1 will be described, hereinbelow.

FIGS. 13A and 13B show a flow of processing in the face detecting system 1. When an object image SO to be detected for a face is input into the face detecting system 1 (step S31), the object image S0 is supplied to the multiple resolution portion 10. An image S0' obtained by converting the image size of the object image S0 to a predetermined image size is generated and a resolution image group S1 comprising a plurality of resolution images which are reduced in size (resolution) by $2^{-1/3}$-fold of the image S0' is generated (step S32). Then in the normalizing portion 20, the whole normalization and the local normalization described above are carried out on the resolution images of the resolution image group S1 to obtain normalized resolution images S1' (step S33).

In the face detecting portion 30, a predetermined resolution image S1'_i is selected from the resolution image group S1' in the order in which the size becomes smaller, that is, in the order of S1'_n, S1'_n-1, ... S1'_1, by the resolution image selecting portion 32 under the control of the detection controlling portion 31 (step S34).

Then the sub-window setting portion 33 sets the sub-window on the resolution image S1'_i while moving at the predetermined pitches, e.g., the pitches of two pixels, and cuts out a predetermined size of a fraction image W in sequence (step S35) and inputs the predetermined size of the fraction image W to the determiner group 34 (step S36). Each of the determiners forming the determiner group 34 calculates by the use of a plurality of weak determiners a score SC representing the probability that the input fraction image W is a face image including a face inclined at a predetermined inclination and oriented in a predetermined orientation (step S37) and extracts the fraction image W whose calculated score SC is not smaller than the first threshold value Th1 while the detection controlling portion 31 obtains the result R (step S38).

Then whether the current fraction image W is the last one on the current resolution image (step S39). When it is determined in step S39 that the current fraction image W is not the last one on the current resolution image, the processing returns to step S35 to cut out a new fraction image W on the current resolution image and continues the detection. When it is determined in step S39 that the current fraction image W is the last one, the following processing is carried out. That is, whether the current resolution image is the last one is determined (step S40). When it is determined that the current resolution image is not the last one, the processing returns to step S34 to select a new resolution image and continues the extraction. Whereas, when it is determined that the current resolution image is the last one, the detection controlling portion 31 determines whether the prospective face image is a real face image S2. That is, the detection controlling portion 31 determines as a highly reliable face image the prospective face images whose score is not smaller than a second threshold value Th2 which is larger than the first threshold value Th1 (step S41), and carries out processing to add a special score to the score of the prospective face images which are the same as the highly reliable face image in the inclination of the face, that is, the prospective face image which is within ±30° in the inclination of the face from the inclination of the face of the highly reliable face image to calculate a new score SC (step S42). Then the prospective face images whose score after the addition is not smaller than a third threshold value Th3 between the first threshold value Th1 and the second threshold value Th2 are detected as a real face image S2 (step S43).

The double detection determining portion 40 carries out processing to determine on the basis of the relative positions of the face images whether each of the face image detected on each of the resolution images represents the same face on the object image S0 and has been detected double on a plurality of the resolution images which are adjacent to each other in resolution, and to integrate into one a plurality of face images to be recognized as doubled. (step S43)

As shown in FIG. 14, by repeating step S34 to step S40, the resolution images are selected in the order in which the size becomes smaller and the fraction images W are cut out in sequence, whereby the face detection is performed.

Figure 15:
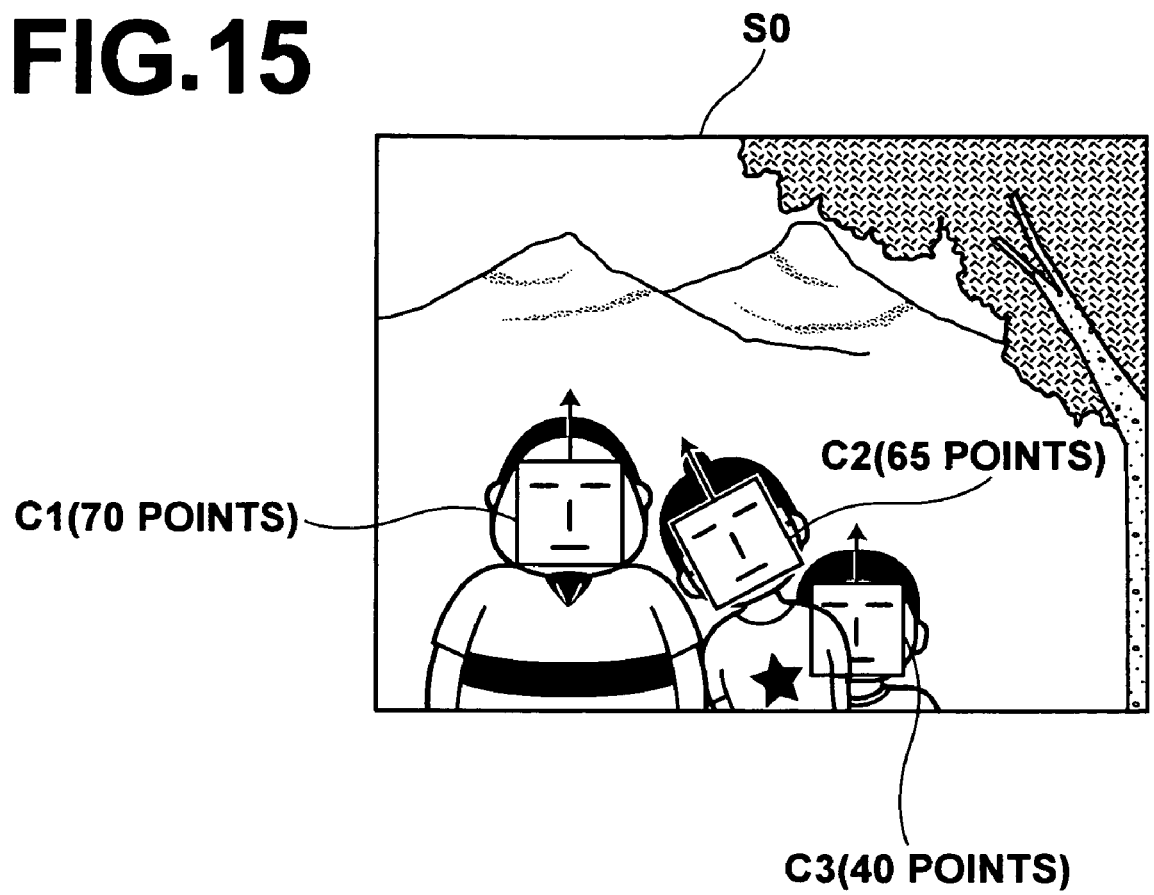
FIG. 15 is a view showing a snapshot picture as an example of the input image.

FIG. 15 is a view showing a snapshot picture as an example of the object image S0. In the snapshot picture, images of the faces C1 to C3 of three persons are shot. The face C3 of one of the three persons are blocked with other objects. When the face detection is carried out on such a snapshot picture, the features of the faces C1 and C2 of the two persons which are not blocked can be grasped and the face images for the faces C1 and C2 can have relatively large sores, e.g., 70 points and 65 points, which is not smaller than the first threshold value (e.g., 30 points), whereby the face images for the faces C1 and C2 can be extracted as prospective face images. Further, since the scores of the face images for the faces C1 and C2, e.g., 70 points and 65 points, is not smaller than the third threshold value Th3 (e.g., 50 points), they are detected as face images. Whereas, the feature of the face image of the face C3 which is blocked and cannot be sufficiently grasped and accordingly can normally have a relatively small score (e.g., 40 points), whereby the face image for the face C3 can be extracted as prospective face images. However, since the score is smaller than the third threshold value Th3, there is a fear that the face image for the face C3 cannot be detected as face images. Since it is often the case that the inclinations of the faces included in the same image are substantially the same, by determining the prospective face image (C1) whose score is not smaller than a second threshold value Th2 (e.g., 70 points) as the highly reliable face image and adding a special score (e.g., 20 points) to the prospective face image (C2, C3) including a face which is substantially the same as that of the highly reliable face image as in this embodiment, even a face image for the face C3 whose feature of the face image cannot be sufficiently grasped due to blocking or the like can be given a score exceeding the third threshold value Th3 (60 points in this example).

In accordance with the face detecting system of this embodiment, the fraction image whose score representing the probability that the object image is a face image is not smaller than the first threshold value is extracted as prospective face images from the object image, a prospective image the calculated index of which is not smaller than a second threshold value which is larger than the first threshold value from the prospective face images is determined as a highly reliable face image, the index of the prospective face image which is substantially the same in the inclination of the face as the highly reliable face image is increased, and the prospective face images whose scores are not smaller than a third threshold value which is between the first threshold value and the second threshold value are detected as the face image. Accordingly, the reliability as a prospective face image can be more suitably reflected on the index of the prospective face image and escape of the face image or wrong detection of the face image can be suppressed on the basis of the rule of experience that it often happens that a plurality of faces in an image are substantially the same in the inclination thereof.

Though, in the first embodiment described above, an extracted prospective face image whose calculated score is not smaller than the second threshold value Th2 is determined as the highly reliable face image, for instance, a prospective face image whose calculated score is the largest in the extracted prospective face image may be determined as the highly reliable face image as another technic.

Further, though, in the first embodiment described above, after the highly reliable face image which has obtained a certain high reliability is determined, the index of the prospective face image which is substantially the same in the inclination of the face as the highly reliable face image is increased, for instance, only the prospective face image which is substantially the same in the inclination of the face as the highly reliable face image may be detected as a real face image as another technic. (corresponding to the second embodiment of the present invention)

With this arrangement, since the fraction image whose score representing the probability that the object image is a face image is not smaller than the first threshold value is extracted as prospective face images from the object image, a prospective image the calculated index of which is not smaller than a second threshold value which is larger than the first threshold value from the prospective face images is determined as a highly reliable face image, and only the prospective face image which is substantially the same in the inclination of the face as the highly reliable face image is detected as the face image, the prospective face image which is conceivable to be low in reliability can be rejected and wrong detection of the face image can be suppressed on the basis of the rule of experience that it often happens that a plurality of faces in an image are substantially the same in the inclination thereof.

The second embodiment of the present invention (an embodiment of the second face detecting system of the present invention) will be described, hereinbelow. As shown in FIG. 1, as the first embodiment, the face detecting system of this embodiment comprises a multiple resolution portion 10, a normalizing portion 20, a face detecting portion 30 and a double detection determining portion 40 and the face detecting 30 comprises a detection controlling portion (highly reliable image determining means, face detecting means) 31, a resolution image selecting portion 32, a sub-window setting portion (fraction image cut-out means) 33, and a determiner group 34 (index calculating means, prospective face image extracting means) but differs from the first embodiment in that the processing in the face detecting 30.

In this embodiment, the determiner group 34 is formed by three kinds each for the orientation of the face to the grand total of thirty-six kinds of determiners (the full face, the left side face and the right side face as for the orientation of the face and twelve kinds by 30° from the rotational angle 0° to 330°) and the determiners are divided into four groups according to the inclination of face which the determiner is to determine, one group is a first group (0° group) (330°, 0°, 30°) another is a second group (90° group) (60°, 90°, 120°), another group is a third group (270° group) (240°, 270°, 300°), and the other group is a fourth group (180° group) (150°, 180°, 210°).

The detection controlling portion 31 applies the determiners to all the fraction images W cut out by the sub-window setting portion 33 on a resolution image in the order from the first to fourth groups and detects the prospective face images.

When a determiner of one group calculates a score not smaller than a second threshold value Th2 which is a large score sufficient to put a reliability and detects a highly reliable face image, the detection controlling portion 31 does not apply determiners of the groups which are to be applied to the fraction image W thereafter. That is, the inclination of the face to be detected is fixed to be substantially the same as that of the highly reliable face image. This is because on the basis of the rule of experience that it often happens that when a plurality of faces are included in an image, the face images are substantially the same in the inclinations thereof, inclinations of the face corresponding to the groups which are to be applied to the fraction image W thereafter can be abbreviated to detect, whereby the face detection can be carried out at high speed. However, in order to deal with, for instance, a face in which the neck is inclined, a plurality of kinds of determiners whose faces to be detected are close to each other are integrated into a group and the determiners are used by a group to another so that fluctuation of about ±30° in the inclinations can be accommodated.

For instance, in the case where while the prospective face images are detected by the use of a determiner which belongs to the second group and is to determine the face inclined at 60°, the score having a value not smaller than the second threshold value Th2 is calculated and the highly reliable face image is detected, the determiners of the third and fourth groups which are to be subsequently used are not subsequently employed. Assuming that the average processing time is 1, it requires 1×4=4 times when the inclination of the face to be detected is not fixed, whereas when the inclination of the face to be detected is fixed, the calculation requires only 2.5(=1×¼+2×¼+3×¼+4×¼) assuming that the probabilities that a face is detected by the use of a determiner of the groups is uniform, that is, the probability that a face is detected by the use of a determiner of each groups is ¼. That is, when the inclination of the face to be detected is fixed, the processing time is shorter than when the inclination of the face to be detected is not fixed.

The reason why the 180° group is detected last is that the probability that a face upside down exists is the weakest as compared with the inclinations of a face corresponding to the other three groups according to the rule of experience.

Further, when the highly reliable face image is detected, the prospective face images detected by determiners in the previous groups are considered to be detected wrong, and deleted. When the inclination of the face to be detected is fixed as described above, for instance, in the case where a highly reliable face image is detected and the face to be detected is fixed, since the determiners in the third and fourth groups are not used and faces at a predetermined inclination are not detected, a wrong detection of these faces cannot occur. However, in the case of the first group, prospective face images which are relatively small in score can be detected. Since the probability that they are detected by a wrong detection is strong, suppression of wrong detection of the face image can be realized by considering the result of detection by the determiners in the first group to be due to wrong detection and deleting it.

The flow in the face detecting system of the second embodiment will be described, hereinbelow.

Figure 16B:
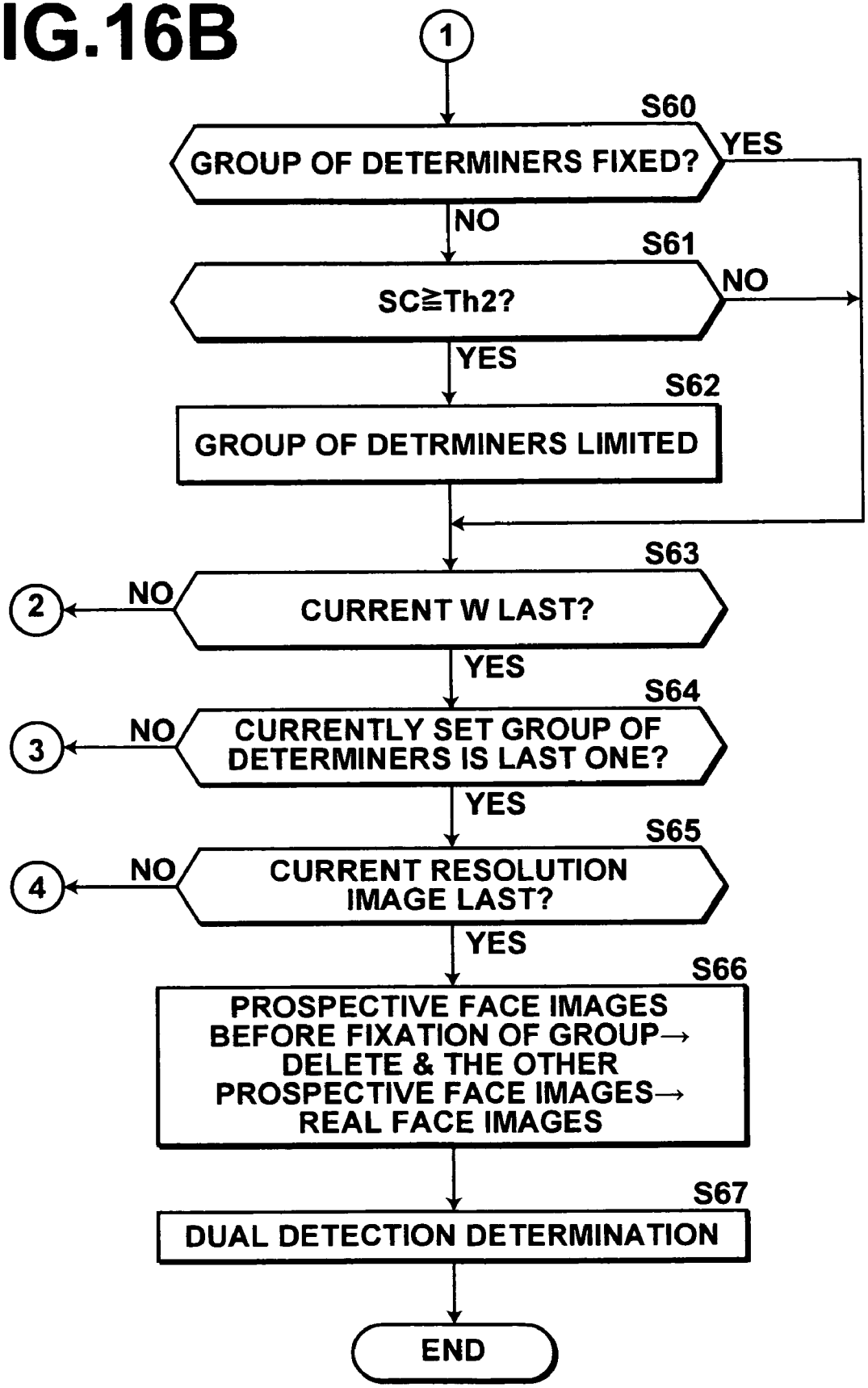
FIG. 16B is the other part of the flowchart showing the processing to be carried out by the face detecting system of the second embodiment.

FIGS. 16A and 16B show a flow of processing in the face detecting system of this embodiment. As shown in FIGS. 16A and 16B, when an object image S0 to be detected for a face is supplied to the multiple resolution portion 10 (step S51), an image S0' obtained by converting the image size of the object image S0 to a predetermined image size is generated and a resolution image group S1 comprising a plurality of resolution images which are reduced in size (resolution) by $2^{-1/3}$-fold of the image S0' is generated (step S52). Then in the normalizing portion 20, the whole normalization and the local normalization described above are carried out on the resolution images of the resolution image group S1 to obtain normalized resolution images S1' (step S53).

In the face detecting portion 30, a predetermined resolution image S1'_i is selected from the resolution image group S1' in the order in which the size becomes smaller, that is, in the order of S1'_n, S1'_n-1, . . . S1'_1, by the resolution image selecting portion 32 under the control of the detection controlling portion 31.

Then the detection controlling portion 31 selects the group of the determiners applied to the fraction image W (step S55). In step S55, though the determiner group is selected according to the predetermined order which is changed each time the step is performed, the order is reset when a resolution image is newly selected. Further, when group fixture to be described later is already carried out, only the group is selected.

Then the sub-window setting portion 33 sets the sub-window on the resolution image S1'_i while moving at the predetermined pitches, e.g., the pitches of two pixels, and cuts out a predetermined size of a fraction image W in sequence (step S56) and inputs the predetermined size of the fraction image W to the determiner group 34 (step S57). The determiner into which the fraction image W is input calculates by the use of a plurality of weak determiners a score SC representing the probability that the input fraction image W is a face image including a face inclined at a predetermined inclination and oriented in a predetermined orientation (step S58) and extracts the fraction image W whose calculated score SC is not smaller than the first threshold value Th1 as a prospective face image while the detection controlling portion 31 obtains the result R.

Then the detection controlling portion 31 determines, when the prospective face image is extracted, whether the determiner group applied to the fraction image W is already fixed (step S60), and when it is determined that the determiner group applied to the fraction image W is already fixed, the processing shifts to step S63. Whereas, when it is determined that the determiner group applied to the fraction image W is not fixed yet, the detection controlling portion 31 determines, whether the calculated score SC of the prospective face image is not smaller than a second threshold value Th2 (step S61). When it is determined that the calculated score SC is not smaller than the second threshold value Th2, the prospective face image is determined as a highly reliable face image and the determiner groups which are to be subsequently used are fixed to the currently selected group. (step S62)

Then whether the current fraction image W is the last one on the current resolution image is determined. (step S63) When it is determined in step S63 that the current fraction image W is not the last one on the current resolution image, the processing returns to step S56 to cut out a new fraction image W on the current resolution image and continues the detection. When it is determined in step S63 that the current fraction image W is the last one, the following processing is carried out. That is, whether the determiner group currently selected is the last one is determined (step S64). When it is determined that the current determiner group is the last one, the processing is shifted to step S65, whereas, when it is determined that the current determiner group is not the last one, the processing returns to step S55 since there remains a determiner group to be selected, and in step S55, the next determiner group is selected.

In step S65, whether the current resolution image is the last one is determined. When it is determined that the current resolution image is not the last one, the processing returns to step S54 to select a new resolution image and continues the extraction. Whereas, when it is determined that the current resolution image is the last one, the detection controlling portion 31 deletes the prospective face images detected by determiners in the groups previous to the determiner group is fixed, and at the same time, determines the other prospective face images as real face images. (step S66) That is, when the highly reliable face image is detected, only the prospective face images which are the same in inclination of the face as the highly reliable face image are detected as a face image.

Further, the double detection determining portion 40 carries out processing to determine on the basis of the relative positions of the face images whether each of the face images detected on each of the resolution images represents the same face on the object image S0 and has been detected double on a plurality of the resolution images which are adjacent to each other in resolution, and to integrate into one a plurality of face images to be recognized as doubled. (step S67)

Figure 18:
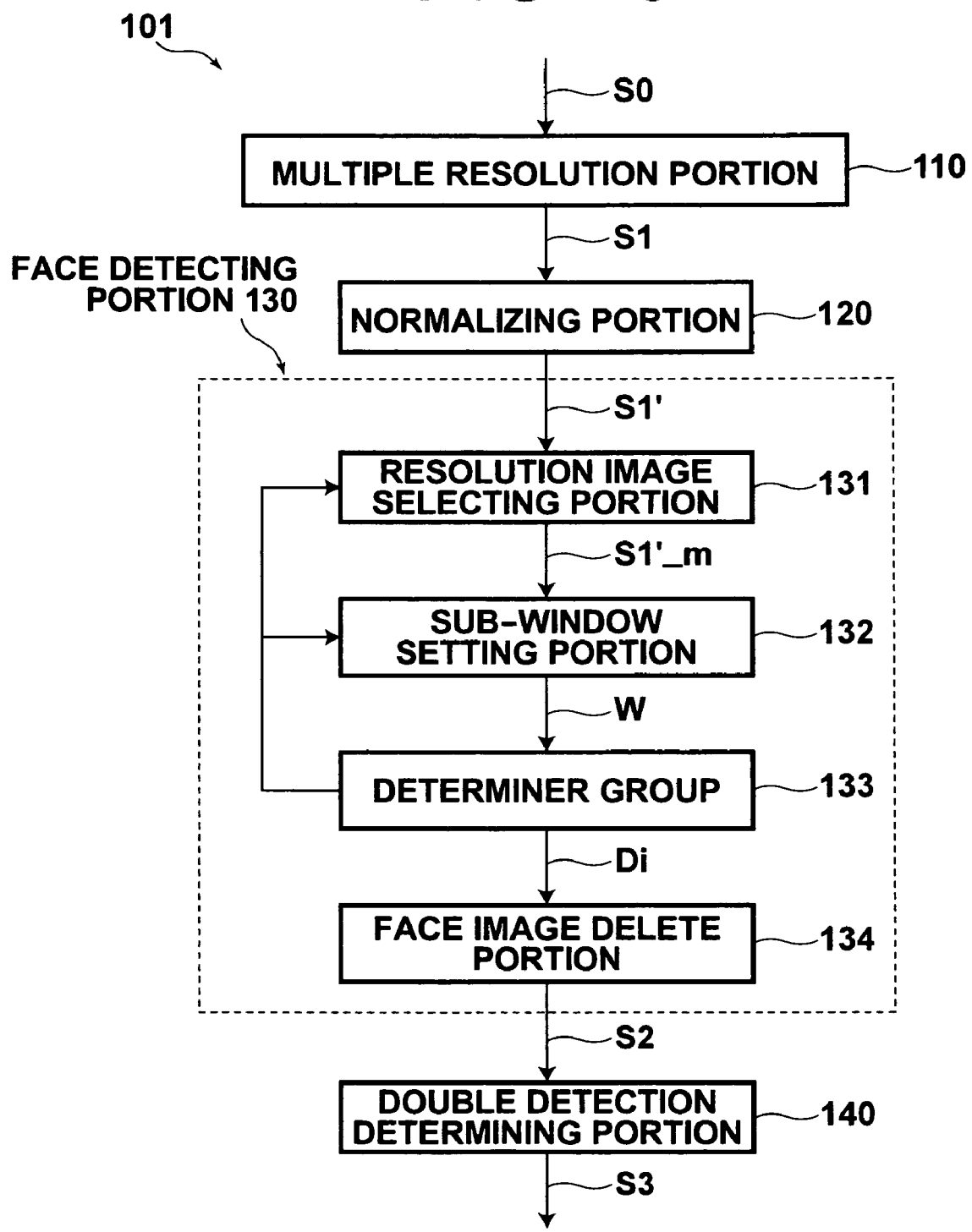
FIG. 18 is a block diagram showing the arrangement of the face detecting system of the third embodiment of the present invention.

FIG. 18 is a block diagram showing in brief the arrangement of the face detecting system 101 in accordance with a third embodiment of the present invention. The face detecting system 101 detects a face image including therein a face in the input digital image irrespective of the position, size, inclination (rotational position in the plane of the image) or the orientation (an orientation in the direction in which the neck is swung) of the face.

The face detecting system 101 employs a technic using a determiner module (will be referred to simply as "determiner" hereinbelow) generated by the machine learning with a sample image, which is said to be excellent especially in the detecting accuracy and the robust. In this technic, a determiner is caused to learn the feature of the face by the use of a plurality of different face image samples which have substantially the same orientations and inclination of the faces and a plurality of different non-face image samples, to prepare a determiner which is capable of determining whether an image is a face image which has predetermined orientation and inclination, and fraction images are cut in sequence from the image to be detected for a face (to be referred to as "the object image", hereinbelow) to determine with the determiner whether each of the fraction images is a face image, whereby the face image on the object image is detected.

As shown in FIG. 18, the face detecting system 101 comprises a multiple resolution portion 110, a normalizing portion 120, a face detecting portion 130 and a double detection determining portion 140.

Figure 19:
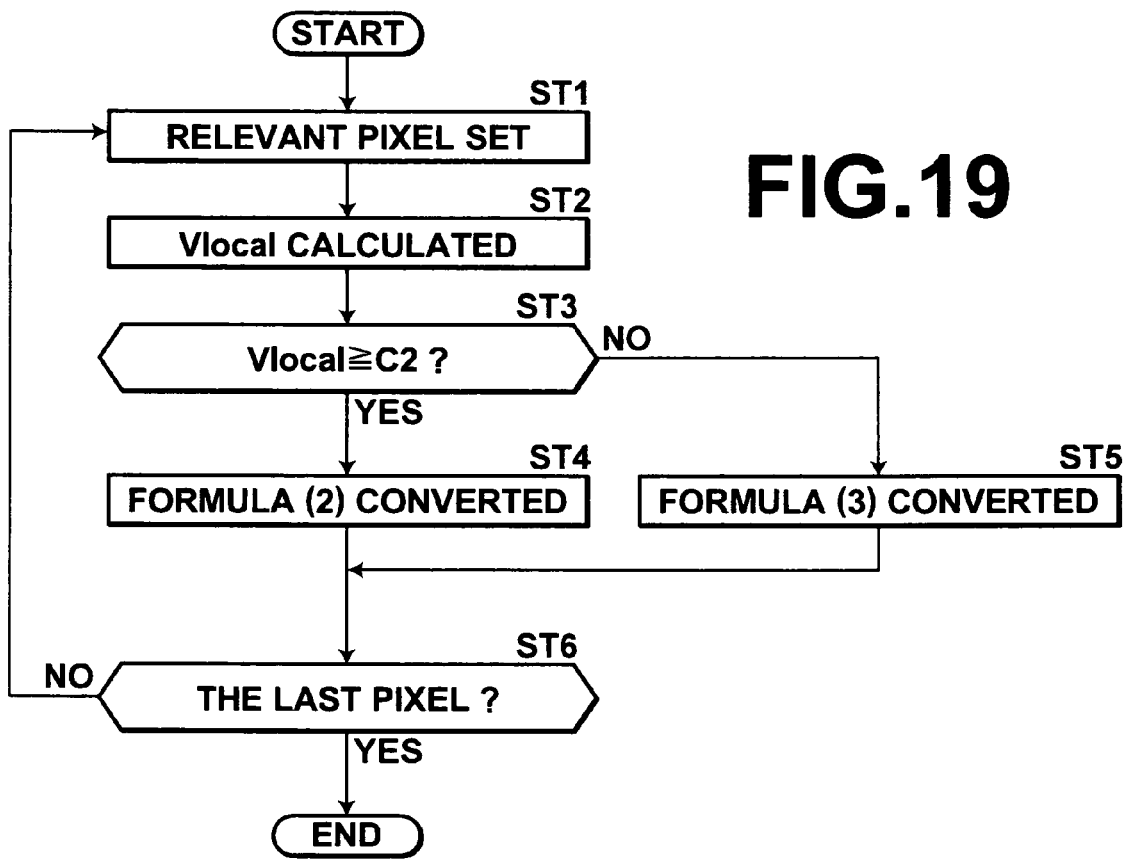
FIG. 19 is a view showing a flow of the local normalization.

FIG. 19 is a view showing a flow of the local normalization. The following formulae (2) and (3) are formulae of brightness gradation conversion to be carried out on the pixel values for the local normalization.

if Vlocal≧C2

$$X'=(X-m\text{local})(C1/SD\text{local})+128 \quad (2)$$

if Vlocal<C2

$$X'=(X-m\text{local})(C1/SDc)+128 \quad (3)$$

wherein X, X', mlocal, Vlocal, SDlocal, (C1×C1), C2 and SDc respectively represent the pixel value of the relevant pixel, the pixel value of the relevant pixel after conversion, the mean of the pixel values in the local area about the relevant pixel, the dispersion of the pixel values in the local area, the standard deviation of the pixel values in the local area, the reference value corresponding to said certain level, a threshold value corresponding to said predetermined level and a predetermined constant. In this embodiment, the number of gradation of the brightness is in 8 bits and the value which the pixel value can take is from 0 to 255.

As shown in FIG. 19, one pixel in a resolution image is set as a relevant pixel (step ST1), the dispersion Vlocal of the pixel values in the local areas of a predetermined size, e.g., 11×11 pixel size, about the relevant pixel is calculated (step ST2), and whether the dispersion Vlocal is not lower than a threshold value C2 corresponding to said predetermined level is determined (step ST3). When it is determined in step ST3 that the dispersion Vlocal is not lower than the threshold value C2, the gradation conversion where the difference between the pixel value X of the relevant pixel and the mean value mlocal is reduced as the dispersion Vlocal is larger than the reference value C1×C1 corresponding to said certain level and increased as the dispersion Vlocal is smaller than the reference value C1×C1 is carried out according to formula (2) as the first brightness gradation conversion process (step ST4). When it is determined in step ST3 that the dispersion Vlocal is lower than the threshold value C2, the gradation conversion is carried out according to formula (3) which does not depend upon the dispersion Vlocal as the second brightness gradation conversion process (step ST5). Then whether the relevant pixel which has been set in Step ST1 is the last one is determined (step ST6). When it is determined in step ST6 that the relevant pixel is not the last one, the processing returns to step ST1 and the next pixel in the same resolution image is set as a relevant pixel. When it is determined in step ST6 that the relevant pixel is the last one, the local normalization on the resolution image is ended. By repeating the processing shown in steps ST1 to ST6, the local normalization can be wholly carried out on the resolution image.

The predetermined level maybe changed according to the brightness of the whole area or a part of the local area. For example, in the normalization described above, where gradation conversion is carried out on a relevant pixel, the threshold value C2 may be changed according to the pixel value of the relevant pixel. That is, the threshold value C2 corresponding to the predetermined value may be higher when the brightness of the relevant pixel is relatively high while may be lower when the brightness of the relevant pixel is relatively low. By this, even a face which exists at a low contrast (with the dispersion of the pixel values being low) in a so-called dark area where the brightness is low can be correctly normalized.

The face detecting portion 130 carries out the face detection on each resolution image of the resolution image group S1'_m (m=1 to M) while changing the position and the inclination of the face to be detected in the predetermined order thereby, detecting the face image S2 included in all the resolution image.

Though, in this embodiment, the face image is detected while changing the inclination of the face to be detected for each position of the face to be detected, the face image may be detected while changing the position of the face to be detected for each inclination of the face to be detected.

Figure 17:
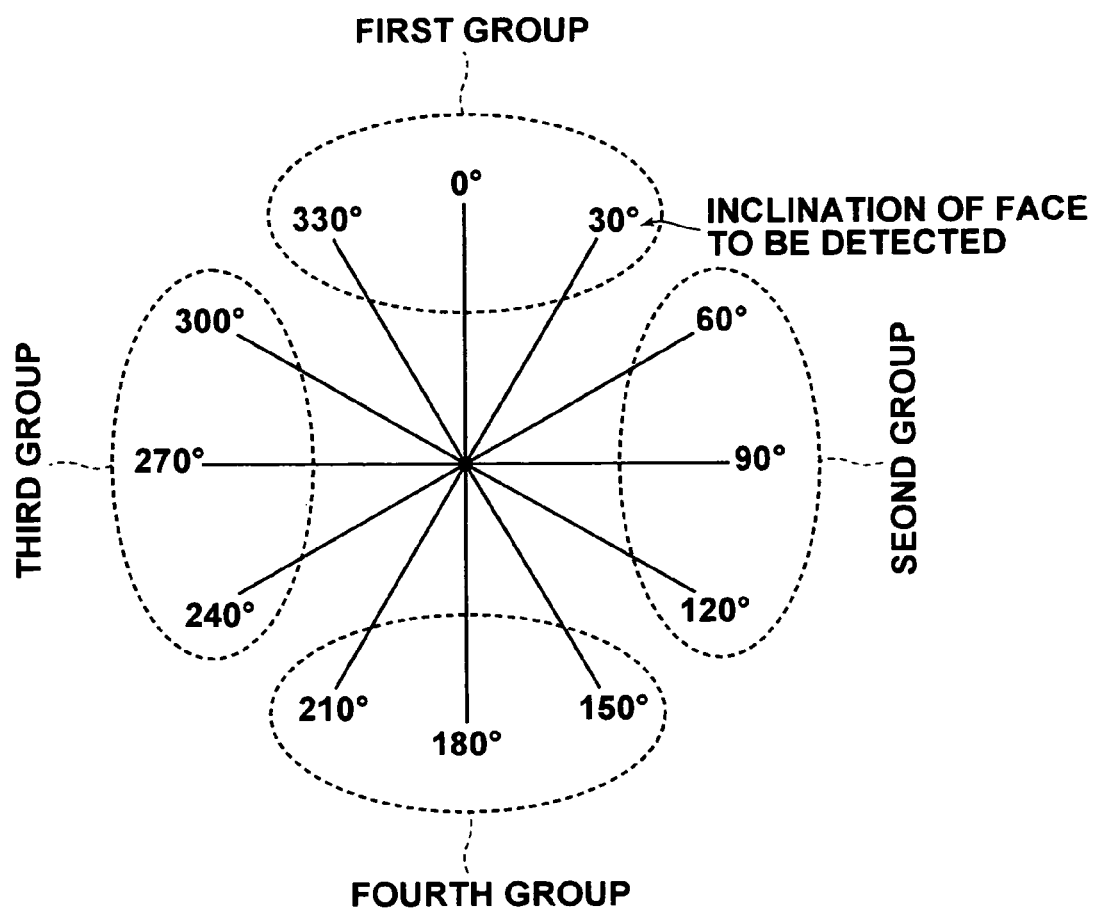
FIG. 17 is a view showing division of the determiner group into groups according to the inclination of the face to be detected.

Further, in this embodiment, the inclinations of the face to be detected are all divided into a plurality of groups each comprising a plurality of close inclinations and the calculation of the score to be described late and extraction of the face image are carried out by the groups. More specifically, as shown in FIG. 17, the inclination of the face to be detected is included in a twelve inclinations set by rotating a face by 30° about the vertical direction of the input image S0 in a plane of the input image S0, and the inclination of the face to be detected is switched in a predetermined order. For example, when expressed in the clockwise direction about the vertical direction of the input image S0, the predetermined order is 0°, 330°, 30° (0° group: three directions directed upward), 90°, 60°, 120° (90° group: three directions directed rightward), 270°, 240°, 300° (270° group: three directions directed leftward), 180°, 150°, 210° (180° group: three directions directed downward).

As shown in FIG. 18, the face detecting portion 130 comprises a resolution image selecting portion 131, a sub-window setting portion 132, a determiner group 133, and a face image deleting portion 134. The sub-window setting portion 132 and the determiner group 133 function as the index calculating means in the third face detecting system of the present invention, the determiner group 133 functions as the face image extracting means in the third face detecting system of the present invention, and the face image deleting portion 134 functions as the face image deleting means in the third face detecting system of the present invention.

The resolution image selecting portion 131 selects a resolution image to be employed in the face detection in the resolution image group S1' generated by the multiple resolution portion 110 in sequence in the order in which the size becomes smaller (or the resolution becomes rougher). Since the technic of this embodiment is a technic of detecting a face in the input image S0 by determining whether the fraction images W cut out from each resolution images in the same size are face images, the resolution image selecting portion 131 may be conceived to set the size of the face to be detected in the object image S0 while changing the same from the large to the small every time.

The sub-window setting portion 132 sets the sub-window for cutting out the fraction image W which is to be determined whether it is a face image in the resolution image selected by the resolution image selecting portion 131 while shifting its position.

For example, when a sub-window for cutting out fraction images W of a predetermined size, e.g., a 32×32 pixel size are set in sequence while moving the sub-window by a predetermined number of pixels, for instance, by two pixels, and the cut out fraction images W are input into the determiner group 133. Since each of the determiners forming the determiner group 133 determines a face image including a face having a predetermined inclination and a predetermined orientation of the face as described later, face images including a face in all the orientations and all the inclinations can be determined by doing so.

The determiner group 133 comprises a plurality of kinds of determiners which are different in the inclination and the orientation of the face to detect and each of the determiners calculate a score sc representing the probability that the fraction image W is a face image including a face inclined in the predetermined inclination and oriented in the predetermined orientation on the basis of the image pattern of the fraction image W and extracts the fraction image W the calculated score sc of which is not smaller than a first threshold value Th1 as the prospective face image Di including a face inclined in the predetermined inclination and oriented in the predetermined orientation.

Figure 20:
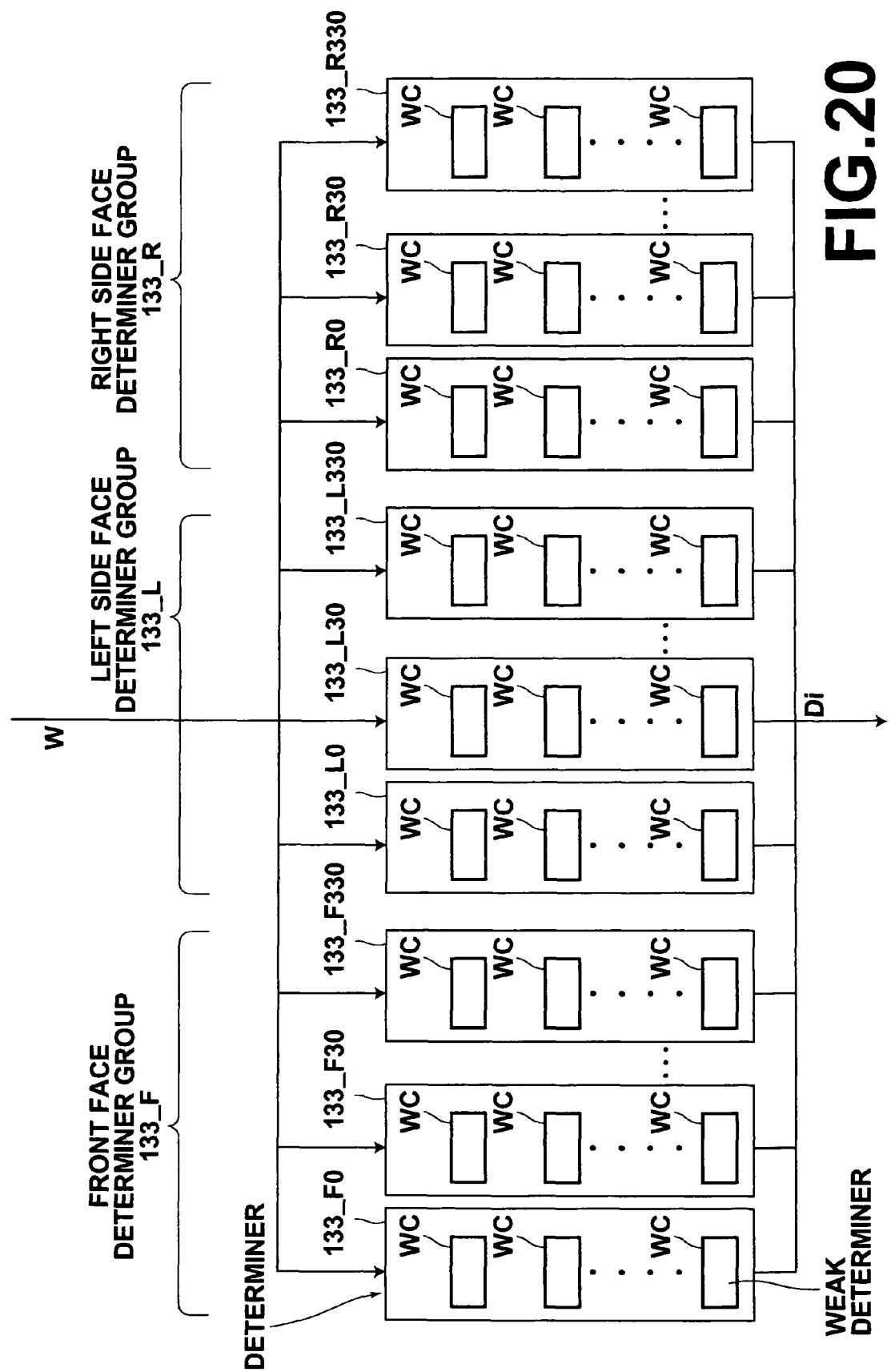
FIG. 20 is a block diagram showing the arrangement of the determiner group.

FIG. 20 is a view showing the arrangement of the determiner groups 133. As shown in FIG. 20, in the determiner group 133, a plurality of determiner groups which are different in faces to determine, that is, a full face determiner group 133_F for mainly detecting full face images, a left side face determiner group 133_L for mainly detecting left side face images, and a right side face determiner group 133_R for mainly detecting right side face images, are connected in parallel. Further, these three kinds of determiner groups 133_F, 133_L and 133_R respectively comprise determiners which correspond to a total twelve inclinations which are different from each other in inclinations of face to determine by 30° about the vertical direction of the fraction image. That is, the full face determiner group 133_F comprises a determiner 133_F0, 133_F30, . . . 133_F330, the left side face determiner group 133_L comprises a determiner 133_L0, 133_L30, . . . 133_L330 and the right side face determiner group 133_R comprises a determiner 133_R0, 133_R30, . . . 133_R330.

Since the sub-window setting portion 132 switches the inclinations of face to be determined in the predetermined order, the determiners into which the cutout fraction images W are input are selected in a suitable order so that the fraction image W is input in sequence into the selected determiner. That is, since the inclinations of face to be determined are switched for each position of the face in the order of 0°, 330°, 30° (first group), 90°, 60°, 120° (second group) . . . , the determiners 133_F0, 133_L0 and 133_R0 corresponding to when the face to be detected is inclined at inclination of 0° are first selected and the fraction image W is input thereinto, and then the determiners 133_F330, 133_L330 and 133_R330 corresponding to when the face to be detected is inclined at inclination of 330° are selected and the fraction image W is input thereinto. A fraction image W cut out from a resolution image is input in sequence into each of determiners in this manner which are selected in the predetermined order so that the score is calculated and the determination is carried out on all the positions and inclinations of the face to be detected. However, when the score sc calculated by any determiner on the way is not smaller than a second threshold value Th2 larger than the first threshold value Th1, the determiners into which fraction images W are input are limited to determiners whose inclination of the face to determine is the inclination when the score is calculated in order to limit the inclination of the face to detect to the inclination when the score is calculated in the subsequent score calculation and determination. This reason is that detection of inclinations of the face image which are different from that of the highly reliable image and are conceivable to be weak in probability that a face image is found and to be poor in necessity of detection is abbreviated on the basis of the rule of experience that it often happens that, when a highly reliable face image which can be considered not to be detected by mistake and to be a real face image is detected, faces in an image are substantially the same in the orientation thereof, thereby carrying out the face detection at high speed.

Though it is preferred that the highly reliable face image be detected as early as possible in order to increase the speed at which the face detection is carried out in the technic described above, it is preferred that the 180° group is detected last in that the probability that a face upside down of the object image S exists is weak according to the rule of experience. This is especially effective when the face image is detected changing the position of the face to be detected by the inclinations of the face to be detected.

In the determiner groups 133, the determinable orientation of the face is of the three kinds, the full face, the left side face and the right side face. However, determiners which determine an oblique right face or an oblique left face may be further provided in order to increase the accuracy of detecting a face directed obliquely.

The arrangement of each of the determiners forming the determiner group 133, the flow of processing in the determiner and the method of learning of the determiner will be described, hereinbelow.

The determiner comprises a plurality of weak determiners WC which have been selected to be effective to the determination from a number of weak determiners WC by a learning to be described later. Each weak determiner WC calculates the feature value from the fraction image W according to the algorithm natural to the weak determiner WC and obtains a score scw representing the probability that the fraction image W is a face image including a face oriented in a predetermined orientation and inclined at a predetermined inclination on the basis of the feature value and its histogram (to be described later) as the predetermined score table. The determiner sums up all the scores scw obtained by these weak determiners WC and calculates a final score SC to extract the fraction image W which is not smaller than a first threshold value Th1 in the final score SC is extracted as a face image Di including a face oriented in the predetermined orientation and inclined at the predetermined inclination.

Figure 21:
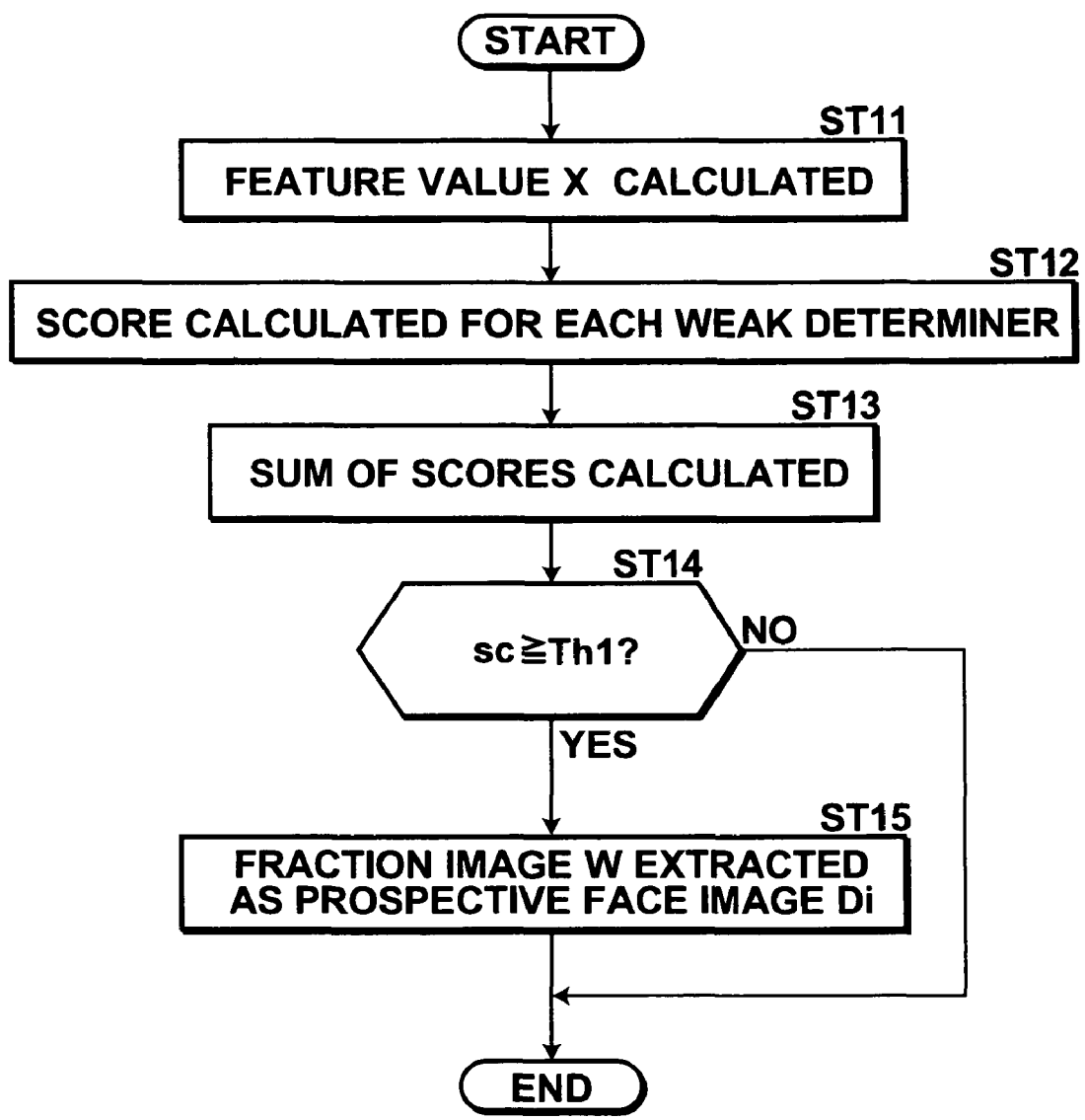
FIG. 21 is a view showing a flow of the processing in the determiner.
Figure 22:
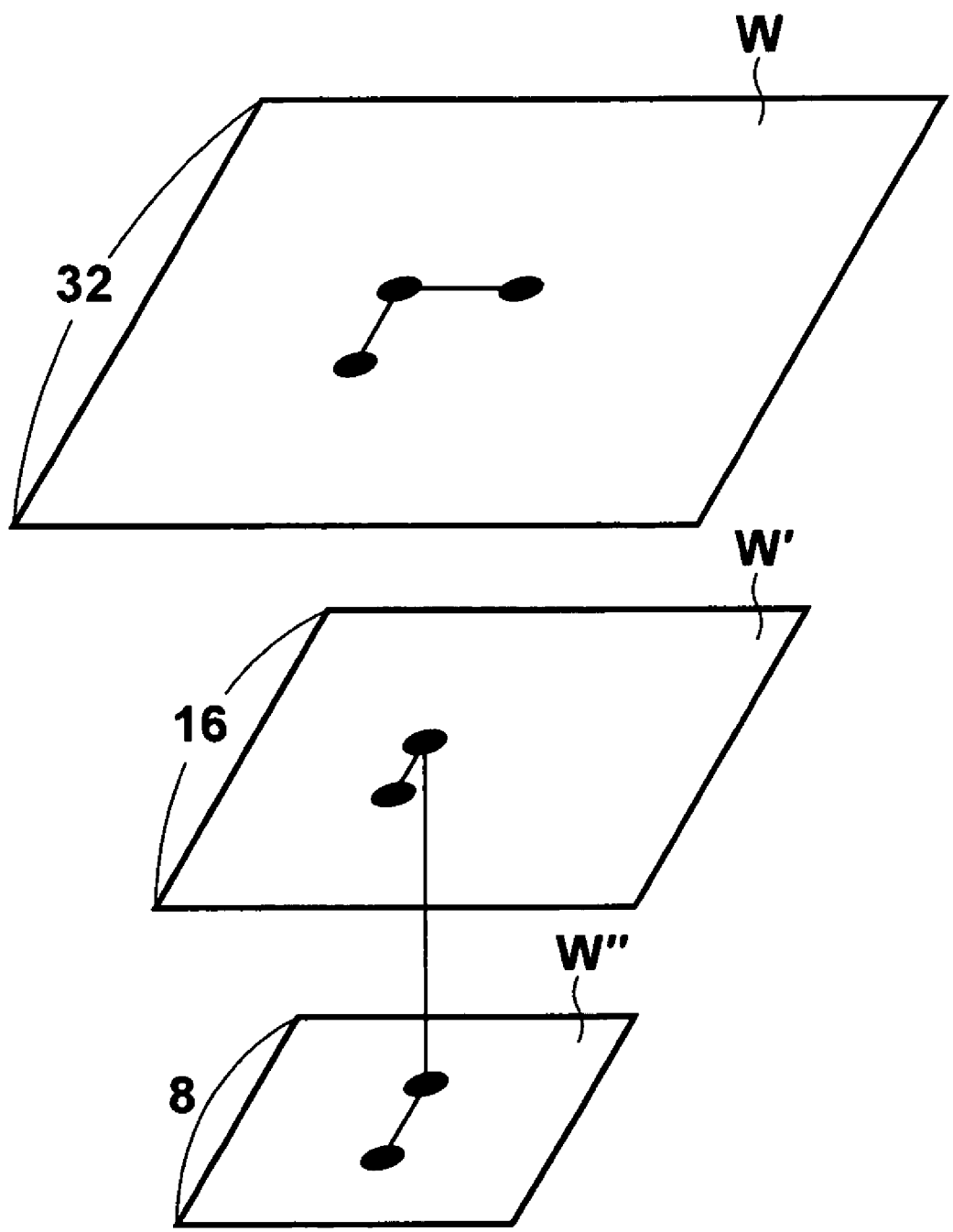
FIG. 22 is a view for illustrating calculation of the feature value in the weak determiner.

FIG. 21 is a flowchart showing the flow of the processing in one determiner. When the fraction image W is input into the determiner, the feature values x different in kind are calculated in a plurality of weak determiners WC. (step ST11) For example, by carrying out a four vicinity pixel averaging (the image is divided into a plurality of blocks by every pixel size of 2×2, and the average of the pixel values of the four pixels in each block is taken as the pixel value of the pixel corresponding to the bock) on the fraction image W of the predetermined size, e.g., 32×32 in pixel size, as shown in FIG. 22, an image W' 16×16 in pixel size and an image W" 8×8 in pixel size which are reduced in pixel size are obtained and predetermined two points set in the plane of three images, the two images plus the original image, are taken as one pair, and the difference in the pixel value (brightness) between the two points of each pair forming one pair group comprising a plurality of pairs is calculated and a combination of the differences is taken as the feature value. The predetermined two points of each pair are, for instance, vertically arranged two points or horizontally arranged two points so that a density feature of the face in the image is reflected. Then a value corresponding to the combination of the differences which is the feature value is calculated as x. Then a score scw of a probability that the fraction image W is a face image representing a face which is to detect (For example, in the case of the determiner 34_F30, an image of a face whose orientation is front and whose inclination is rotation at 30°) is obtained for each of the weak determiner from the predetermined score table (own histogram) according to the value of x. (step ST12) By summing up all the scores scw calculated by the individual weak determiners, the final score SC is obtained. (step ST13) Whether the final score SC is not larger than the first threshold value Th1 is determined (step ST14), and when it is determined in step ST14 that the final score SC is not larger than the first threshold value Th1, the fraction image W is extracted as a prospective face images Di (i=1, 2, ... ) including a face inclined in the predetermined inclination and oriented in the predetermined orientation which the determiner is to determine (step ST15).

The method of learning (generation) of the determiner is the same as that described in the preceding embodiments.

The face image deleting portion 134, when the highly reliable face image is detected and the inclination of the face to be detected is limited to a predetermined inclination, deletes as non-face images the face images including a face inclined by an inclination different from the limited inclination in all the prospective face images Di detected by the determiner group 133 before limiting inclination of the face to be detected and determines the other prospective face images as face images S2. With this arrangement, the face images which are weak in probability that they are real face images can be rejected in the face images which have been already detected as the prospective face images, whereby wrong detection of the face image can be suppressed.

The double detection determining portion 140 carries out processing to determine on the basis of the relative positions of the face images whether each of the face image S2 detected on each of the resolution images represents the same face on the object image S0 and has been detected double on a plurality of the resolution images which are adjacent to each other in resolution, integrates into one a plurality of face images to be recognized as doubled and outputs real face images S3 without the images to be detected double.

When the object image S0 is made to have a multiple resolutions to obtain a plurality of resolution images, the gap in resolution between adjacent resolutions cannot be so large in order to prevent escape of faces in detection. Whereas the determiner generally has a margin in the size of the detectable face. In such a case, the same face on the object image S0 can be sometimes detected double on a plurality of adjacent resolution images. The processing by the double detection determining portion 140 described above is carried out to remove such double detection and obtain the accurate result.

The flow of processing in the face detecting system 101 in accordance with the third embodiment will be described, hereinbelow.

Figure 23B:
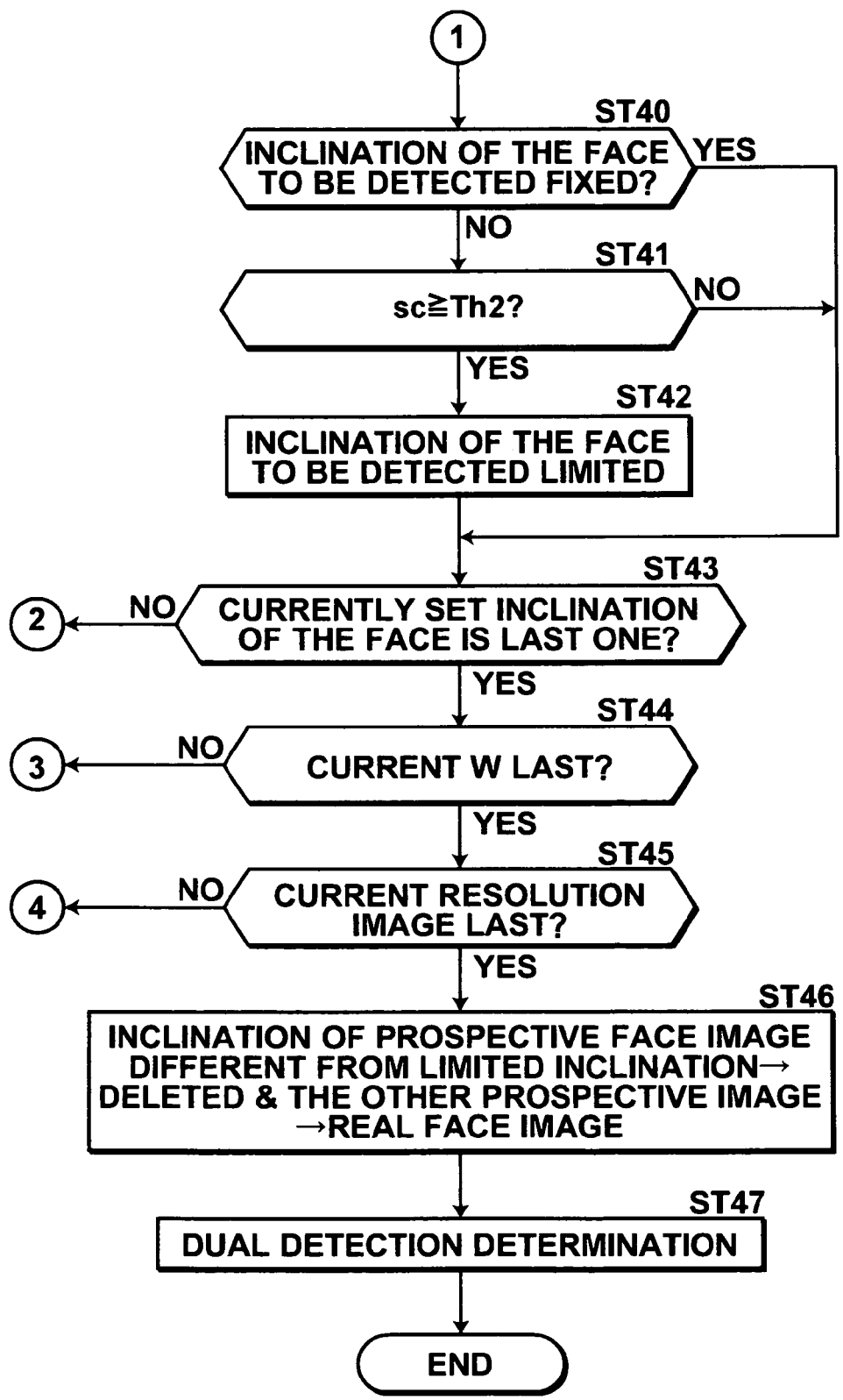
FIG. 23B is the other part of the flowchart showing the processing to be carried out by the face detecting system of the third embodiment.

FIGS. 23A and 23B show a flow of processing in the face detecting system 101. When an object image S0 to be detected for a face is input into the face detecting system 1 (step ST31), the multiple resolution portion 110 generates an image S0' by converting the image size of the object image S0 to a predetermined image size and a resolution image group S1 comprising a plurality of resolution images which are reduced in size (resolution) by $2^{-1/3}$-fold of the image S0' is generated (step ST32). Then in the normalizing portion 120, the whole normalization and the local normalization described above are carried out on the resolution images of the resolution image group S1 to obtain normalized resolution images S1' (step ST33).

Then the resolution image selecting portion 131 of the face detecting portion 130 selects a predetermined resolution image S1'_m from the resolution image group S1' in the order in which the size becomes smaller, that is, in the order of S1'_M, S1'_M-1, ... S1'_1 (step ST34). The sub-window setting portion 132 sets the sub-window on the resolution image S1'_m while moving at the predetermined pitches, e.g., the pitches of two pixels, and cuts out a predetermined size of a fraction image W in sequence (step ST35). The sub-window setting portion 132 subsequently sets an inclination of a face to be detected in the predetermined order (step ST36) that is, selects a predetermined determiner in which an inclination of the face to detect is the inclination and inputs the currently cut out fraction image W into the selected determiner (step ST37). The determiner input with the fraction image W calculates by the use of a plurality of weak determiners a score SC representing the probability that the input fraction image W is a face image including a face inclined at a predetermined inclination and oriented in a predetermined orientation corresponding to the determiner (step ST38) and extracts the fraction image W whose calculated score SC is not smaller than the first threshold value Th1 while the detection controlling portion 31 as a prospective face image Di (step ST39).

The sub-window setting portion 132 determines whether the inclination of a face to be detected is already limited when a prospective face image is extracted (step ST40). When it is determined in step ST40 that the inclination of a face to be detected is already limited, the processing shifts to step ST43. When it is determined in step ST40 that the inclination of a face to be detected is not yet limited, whether the calculated sc is not smaller than a second threshold value Th2 larger than the first threshold value Th1 (step ST41). When it is determined that the score sc is not smaller than the second threshold value Th2, inclinations of the face to be detected to be subsequently set are limited to the inclination to the specific face when the score sc is calculated (step ST42).

Then whether the currently set inclination of the face to be detected is the last one from the viewpoint of the order is determined. (step ST43) When it is determined that the currently set inclination of the face to be detected is not the last one, the processing returns to step ST36 to set a new inclination which is the next, that is, the determiner whose inclination of the face to detect is the set inclination is selected and the currently cut out fraction image W is input into the selected determiner. Whereas when it is determined that the currently set inclination of the face to be detected is the last one, the processing shifts to step ST44.

In step ST44, whether the current fraction image W is the last one on the current resolution image is determined. When it is determined that the current fraction image W is not the last one, the processing returns to step ST35, where a new fraction image W is cut out and the detection is continued. Whereas when it is determined that the current fraction image W is the last one, the processing shifts to step ST45.

In step ST45, the resolution image selecting portion 131 determines whether the current resolution image is the last one. When it is determined that the current resolution image is not the last one, the processing returns to step ST34, where a new resolution image is selected and the detection is continued. Whereas when it is determined that the current resolution image is the last one, the processing shifts to step ST46.

In step ST46, the face image deleting portion 134, when the inclination of the face to be detected is limited, deletes the prospective face image including a face which is different from the limited inclination in the inclination in the prospective face images which have been detected before the limitation of the inclination of the face to be detected in all the prospective face images Di and determines the other prospective face images as a face images S2.

The double detection determining portion 40 carries out processing to determine on the basis of the relative positions of the face images whether each of the face image detected on each of the resolution images represents the same face on the object image S0 and has been detected double on a plurality of the resolution images which are adjacent to each other in resolution, and to integrate into one a plurality of face images to be recognized as doubled, thereby obtaining face images S3 without the images to be detected double. (step ST47)

By repeating step ST34 to step ST45, the resolution images are selected in the order in which the size becomes smaller and the fraction images W are cut out in sequence on each resolution image S1'_m, whereby the face detection is performed.

Figure 24:
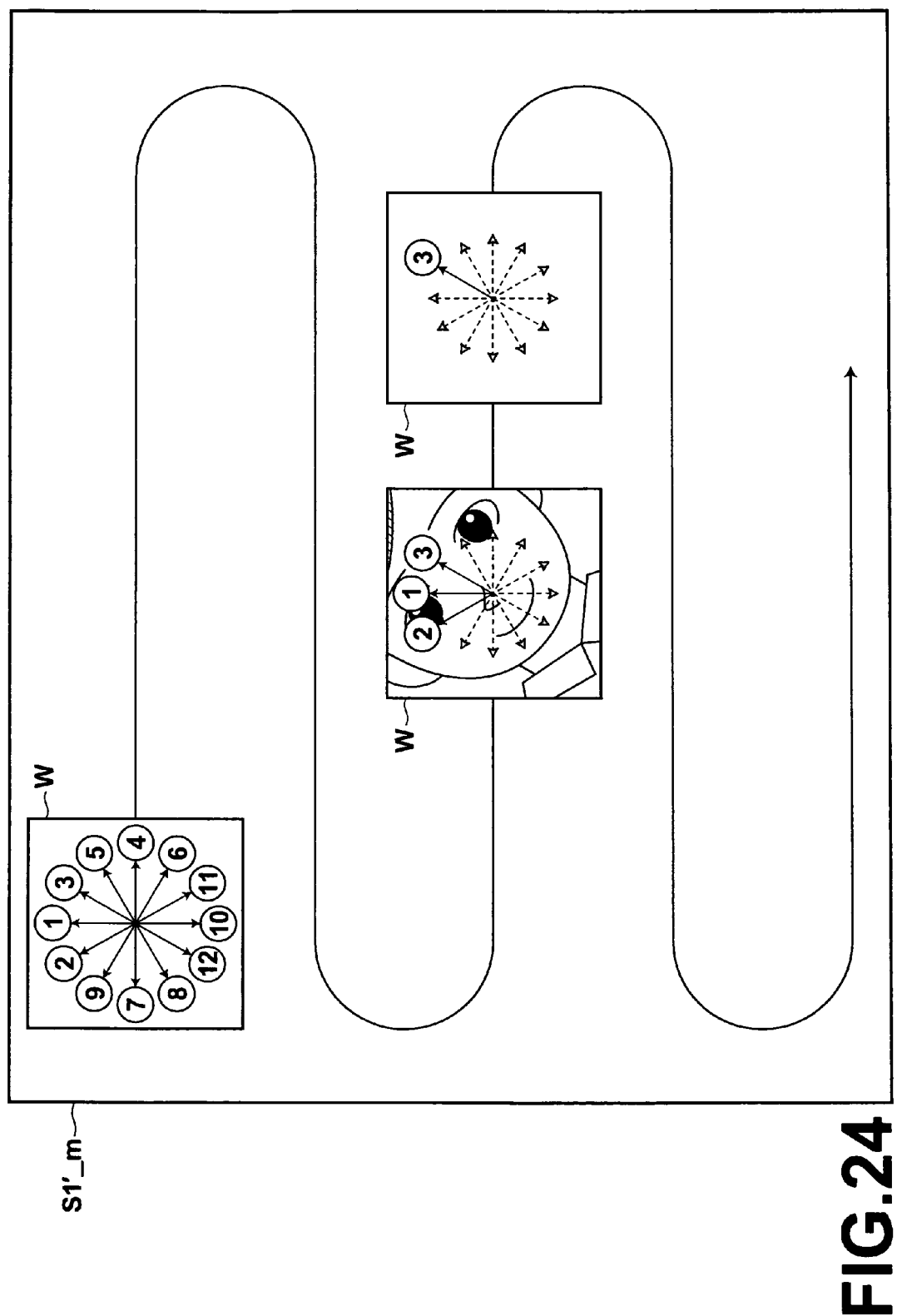
FIG. 24 is a view showing the detection of the face after the highly reliable face image is detected in the third embodiment.

FIG. 24 is a view showing an example of detection where, detection of a face image is carried out with the inclination of the face to be detected changed for each fraction image W on the resolution image S1'_m and when a highly reliable prospective face image Di which is not smaller than the second threshold value Th2 in score sc is detected on the way, the detection is continued with the inclination of the face to detect being limited to the inclination. In this example, the case where the inclination of the face to be detected is changed in the order of (1) 0°, (2) 330°, (3) 30°, ..., (10) 180°, (11) 150°, (12) 210° for each fraction image W, when the inclination of the face to be detected is (3) 30°, sc≧Th2 and a highly reliable prospective face image Di is detected on the way, and the inclination of the face to be detected is subsequently limited to (3) 30° is shown.

Since, in accordance with the face detecting system of the third embodiment described above, in the face detection where face images included in an input image are detected by, while changing the position and inclination of a face to be detected on the input image, calculating for each position and inclination of the face to be detected an index representing a probability that a fraction image in the position is a face image including a face in the inclination and inclination of the face to be detected and extracting a fraction image whose index is not smaller than the first threshold value as the face image, calculation of the index subsequent to when the calculated index is not smaller than the second threshold value larger than the first threshold value is carried out limiting the inclination of the face to be detected to the inclination when the score not smaller than the second threshold value is calculated, detection of inclinations of the face image which are different from that of the highly reliable image and are conceivable to be weak in probability that a face image is found and to be poor in necessity of detection is abbreviated on the basis of the rule of experience that it often happens that, when a highly reliable face image which can be considered not to be detected by mistake and to be a real face image is detected, faces in an image are substantially the same in the inclination thereof, thereby carrying out the face detection at high speed.

A face detecting system in accordance with a fourth embodiment of the present invention will be described, hereinbelow.

The face detecting system of this embodiment is basically the same as the third embodiment in the arrangement and the functions of the elements except that the processing of the sub-window setting portion 132 is slightly different from that of the third embodiment.

That is, in this embodiment, the sub-window setting portion 132 inputs a cut-out fraction image W into determiners in a predetermined order as in the third embodiment, and the calculation of the score and the determination are carried out for all the positions and the inclination of the face. On the way, when the score sc calculated by any determiner is not smaller than a second threshold value Th2 larger than the first threshold value Th1, the determiners into which fraction images W are input are limited to determiners whose inclination of the face to determine is the inclination of the group when the score is calculated in order to limit the inclination of the face to detect to the inclination of the group when the score is calculated in the subsequent score calculation and determination.

In this case, since the inclination of face to be detected which is limited after a prospective face image is detected at a score not smaller than the second threshold value Th2, that is, after a highly reliable face image is detected, is not only the inclination of the highly reliable face image but is broadened to inclinations approximating the inclination of the face, even if a plurality of faces which slightly differ in the inclination from each other due to difference in posture of the object exist on the input image, the probability that the plurality of faces are detected is increased.

Figure 25B:
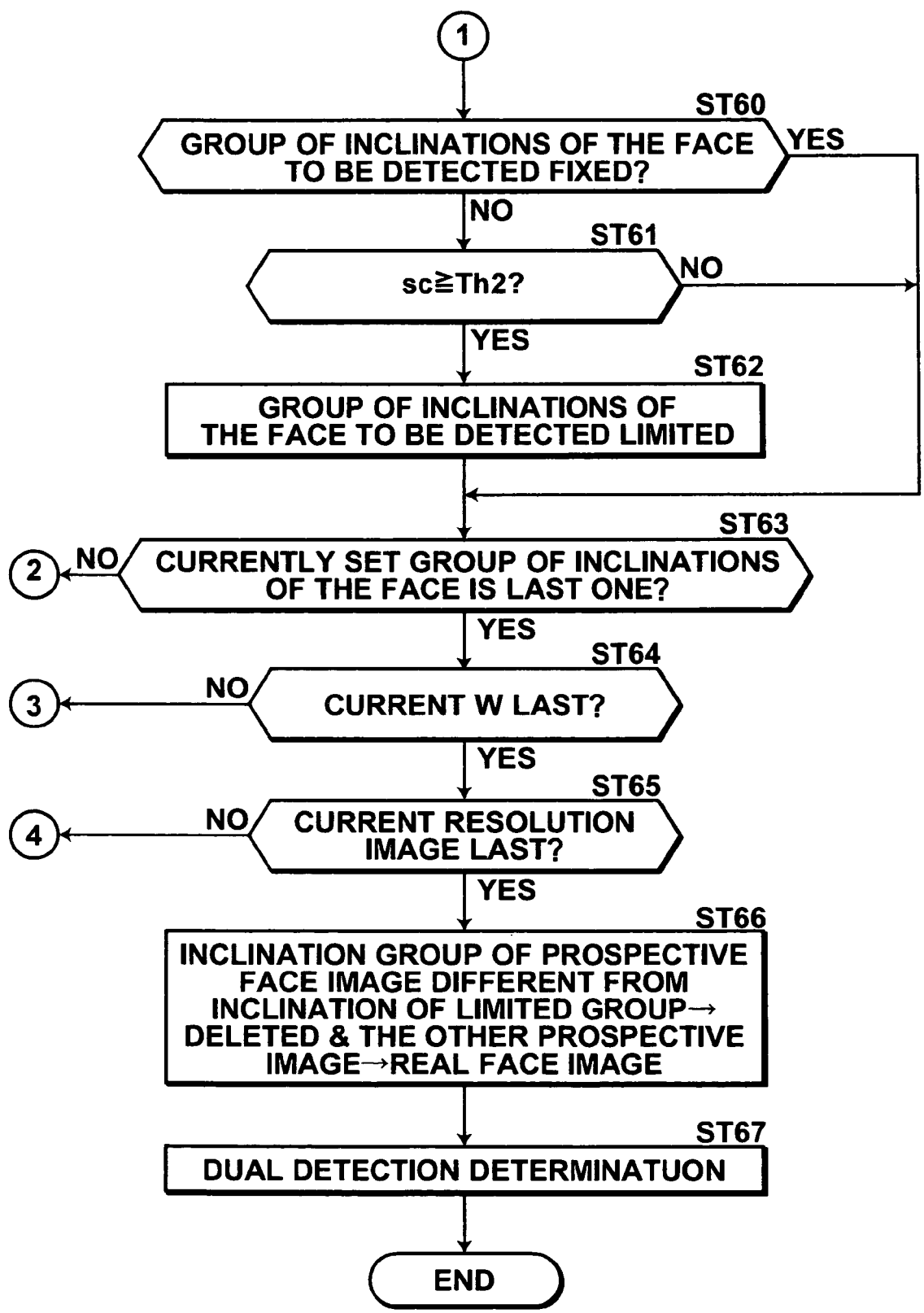
FIG. 25B is the other part of the flowchart showing the processing to be carried out by the face detecting system of the fourth embodiment.

FIGS. 25A and 25B show a flow of processing in the face detecting system 101 of the fourth embodiment. As shown in FIGS. 25A and 25B, when an object image S0 to be detected for a face is supplied to the system 101 (step ST51), the multiple resolution portion 110 obtains an image S0' by converting the image size of the object image S0 to a predetermined image size and a resolution image group S1 comprising a plurality of resolution images which are reduced in size (resolution) by $2^{-1/3}$-fold of the image S0' is generated (step ST52). Then in the normalizing portion 120, the whole normalization and the local normalization described above are carried out on the resolution images of the resolution image group S1 to obtain normalized resolution images S1' (step ST53).

In the face detecting portion 130, a predetermined resolution image S1'_m is selected from the resolution image group S1' in the order in which the size becomes smaller, that is, in the order of S1'_M, S1'_M-1, . . . S1'_1, by the resolution image selecting portion 131. (step ST54) The sub-window setting portion 133 sets the sub-window on the resolution image S1'_m while moving at the predetermined pitches, e.g., the pitches of two pixels, and cuts out a predetermined size of a fraction image W in sequence (step ST55) and sets an inclination of the face to be detected by the group (step ST56). That is, a predetermined determiner whose inclination of the face to detect belongs to the set group is selected and the current fraction image W is input into the selected determiner. (step ST57) The determiner into which the fraction image W is input calculates by the use of a plurality of weak determiners a score sc representing the probability that the input fraction image W is a face image including a face inclined at a predetermined inclination and oriented in a predetermined orientation (step ST58) and extracts the fraction image W whose calculated score SC is not smaller than the first threshold value Th1 as a prospective face image Di. (step ST59)

Then the sub-window setting portion 133 determines, when the prospective face image Di is extracted, whether the inclination of the face to be detected is already limited (step ST60), and when it is determined that the inclination of the face to be detected is already limited, the processing shifts to step ST63. Whereas, when it is determined that the inclination of the face to be detected is not limited yet, whether the calculated score sc is not smaller than a second threshold value Th2 is determined (step ST61). When it is determined that the calculated score sc is not smaller than the second threshold value Th2, the inclination of the face to be detected to be subsequently set is limited to that of the group currently set. (step ST62)

Then whether the current group of the inclination of the face to be detected is the last one is determined. (step ST63) When it is determined in step ST63 that the current group of the inclination of the face to be detected is not the last one, the processing returns to step ST56. In step ST56, another group to be selected next is set as a group of the inclination of the face to be detected and a predetermined determiner whose inclination of the face to detect belongs to the set group is selected, and the currently cut out fraction image W is input into the selected determiner. When it is determined in step S63 that the current fraction image W is the last one, the processing shifts to step ST64.

In step ST64, whether the current fraction image W is the last one on the current resolution image is determined. When it is determined in step ST64 that the current fraction image W is not the last one on the current resolution image, the processing returns to step ST55 to cut out a new fraction image W on the current resolution image and continues the detection. When it is determined in step S64 that the current fraction image W is the last one, the processing shifts to step ST65.

Instep S65, the resolution image selecting portion 131 determines whether the current resolution image is the last one is determined. When it is determined that the current resolution image is not the last one, the processing returns to step ST54 to select a new resolution image and continues the detection of a face image. Whereas, when it is determined that the current resolution image is the last one, the processing shifts to step S66.

In step S66, the face image deleting portion 134, when the inclination of the face to be detected is limited to one of the inclination group, deletes as non-face images the face images including a face inclined by an inclination different from the limited inclination in all the prospective face images Di detected by the determiner group 133 before limiting inclination of the face to be detected and determines the other prospective face images as face images S2.

Further, the double detection determining portion 40 carries out processing to determine on the basis of the relative positions of the face images whether each of the face image detected on each of the resolution images represents the same face on the object image S0 and has been detected double on a plurality of the resolution images which are adjacent to each other in resolution, and to integrate into one a plurality of face images to be recognized as doubled. (step ST67)

Figure 26:
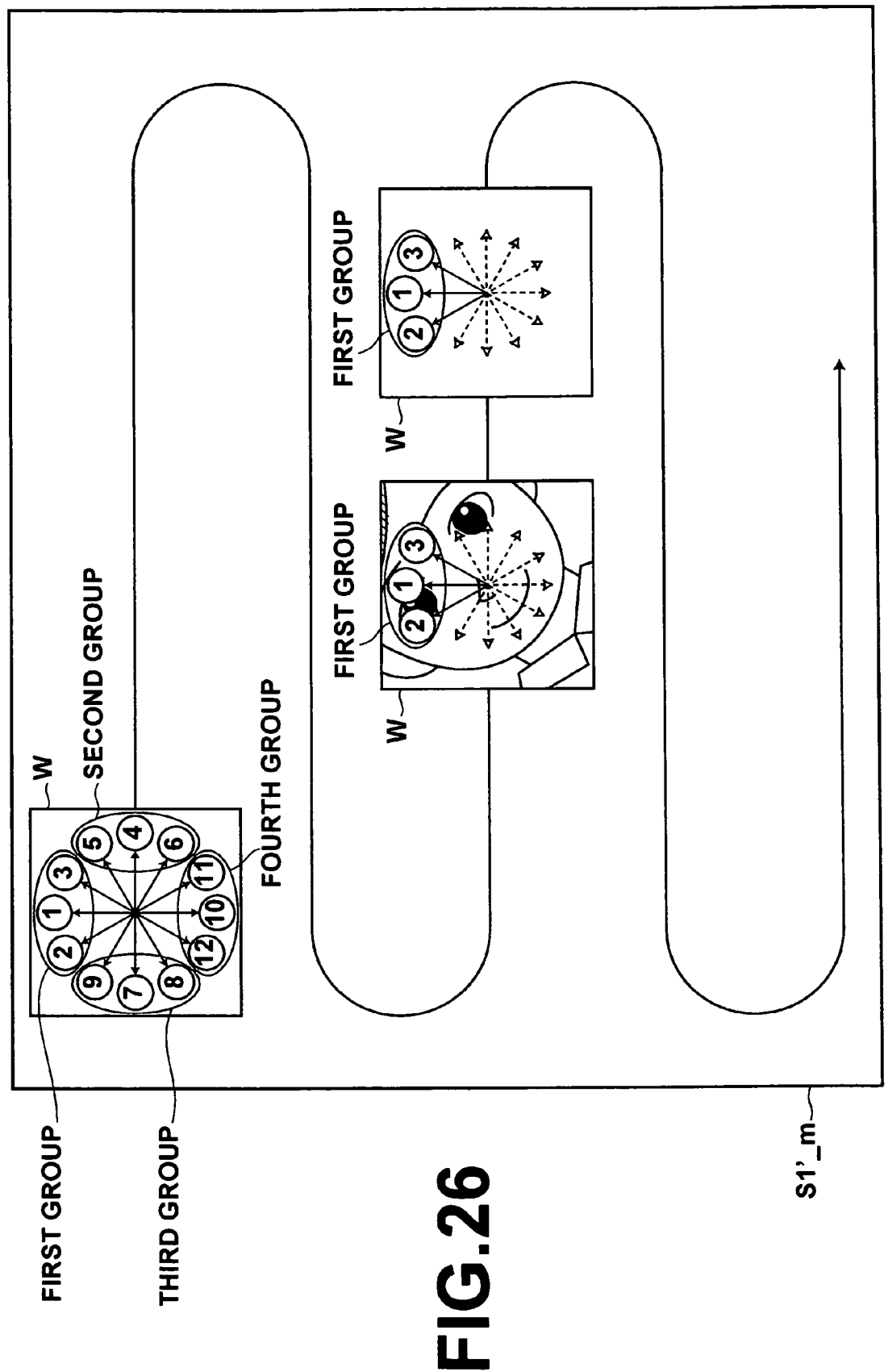
FIG. 26 is a view showing the detection of the face after the highly reliable face image is detected in the fourth embodiment.

FIG. 26 is a view showing an example of detection where, detection of a face image is carried out with the inclination of the face to be detected for each fraction image W on the resolution image S1'_m changed in group and when a highly reliable prospective face image Di which is not smaller than the second threshold value Th2 in score sc is detected on the way, the detection is continued with the inclination of the face to detect being limited to the group to which the inclination of the highly reliable prospective face image belongs. In this example, the case where the inclination of the face to be detected is changed in the order of the first group ((1) 0°, (2) 330°, (3) 30°), . . . , to the fourth group ((10) 180°, (11) 150°, (12) 210°) for each fraction image W, when the inclination of the face to be detected is (3) 30°, sc≧Th2 and a highly reliable prospective face image Di is detected on the way, and the inclination of the face to be detected is subsequently limited to the first group to which (3) 30° belongs is shown.

Since, in accordance with the face detecting system of the fourth embodiment described above, in the face detection where face images included in an input image are detected by, while changing the position and inclination of a face to be detected on the input image, calculating for each position and inclination of the face to be detected an index representing a probability that a fraction image in the position is a face image including a face in the inclination and inclination of the face to be detected and extracting a fraction image whose index is not smaller than the first threshold value as the face image, inclinations of all the faces to be detected are divided into a plurality of groups each comprising a plurality of different inclinations closed to each other while calculation of the index is carried out by the group, and calculation of the index subsequent to when the calculated index is not smaller than the second threshold value larger than the first threshold value is carried out limiting the inclination of the face to be detected to the inclination of the group to which the inclination when the index not smaller than the second threshold value is calculated, detection of inclinations of the face image belonging to a group which is different from that of the highly reliable image and is conceivable to be weak in probability that a face image is found and to be poor in necessity of detection is abbreviated on the basis of the rule of experience that it often happens that, when a highly reliable face image which can be considered not to be detected by mistake and to be a real face image is detected, faces in an image are substantially the same in the inclination thereof, thereby realizing carrying out the face detection at high speed.

A face detecting system in accordance with a fifth embodiment of the present invention will be described, hereinbelow. Though, in the third and fourth embodiments of the present invention, a face image is detected by changing the inclination of the face to be detected for each position of the face to be detected, a face image is detected by changing the position of the face to be detected for each inclination of the face to be detected.

The face detecting system in accordance with a fifth embodiment of the present invention comprises, as shown in FIG. 18, a multiple resolution portion 110, a normalizing portion 120, a face detecting portion 130 and a double detection determining portion 140, and the face detecting portion 130 comprises a resolution image selecting portion 131, a sub-window setting portion 132, a determiner group 133, and a face image deleting portion 134 as in the fourth embodiment. However, the face detecting system in accordance with the fifth embodiment of the present invention differs from the fourth embodiment in the processing in the face detecting portion 130.

In this embodiment, the determiner group 133 comprises thirty-six kinds of determiners which are divided into four groups by the inclination of the face to detect, that is, a first group (0°, 330°, 30°), a second group (90°, 60°, 120°), a third group (270°, 240°, 300°), and a fourth group (180°, 150°, 210°) and three groups by the orientation thereof (full face, left side face and right side face).

The sub-window setting portion 132 sets the inclination of the face to be detected in sequence in the group and inputs the fraction images S cut out from a resolution image into a determiner corresponding to the set inclination of the face to be detected, and the determiner into which the fraction image W is input determines whether the fraction image is a face image to detect a prospective face image Di.

At this time, when a determiner of one group calculates a score not smaller than a second threshold value Th2 which is a large score sufficient to put a reliability and detects a highly reliable face image, the sub-window setting portion 132 does not apply determiners of the groups which are to be applied to the fraction image W thereafter. That is, the inclination of the face to be detected is fixed to be substantially the same as that of the highly reliable face image. This is because on the basis of the rule of experience that it often happens that when a plurality of faces are included in an image, the face images are substantially the same in the inclinations thereof, inclinations (rotational position on the image) of the face corresponding to the groups which are to be applied to the fraction image W thereafter can be abbreviated to detect, whereby the face detection can be carried out at high speed. However, in order to deal with, for instance, a face in which the neck is inclined, a plurality of kinds of determiners whose faces to be detected are close to each other are integrated into a group and the determiners are used by a group to another so that fluctuation of about ±30° in the inclinations can be accommodated.

For instance, in the case where while the prospective face images are detected by the use of a determiner which belongs to the second group and is to determine the face inclined at 60° after detection of prospective face images by the use of the determiner corresponding to the first group, the score having a value not smaller than the second threshold value Th2 is calculated and the highly reliable face image is detected, the determiners of the third and fourth groups which are to be subsequently used are not subsequently employed.

Assuming that the average processing time is 1, it requires 1×4(directions)=4 times when the inclination of the face to be detected is not fixed, whereas when the inclination of the face to be detected is fixed, the calculation requires only 2.5(=1×¼+2×¼+3×¼+4×¼) assuming that the probabilities that a face is detected by the use of a determiner of the groups is uniform, that is, the probability that a face is detected by the use of a determiner of each groups is ¼. That is, when the inclination of the face to be detected is fixed, the processing time is shorter than when the inclination of the face to be detected is not fixed.

Further, when the highly reliable face image is detected, the prospective face images detected by determiners in the previous groups are considered to be detected wrong, and deleted. When the inclination of the face to be detected is fixed as described above, for instance, in the case where a highly reliable face image is detected and the face to be detected is fixed by the use of determiners corresponding to the second group, since the determiners in the third and fourth groups are not used and faces at a predetermined inclination are not detected, a wrong detection of these faces cannot occur. However, in the case of the first group, prospective face images which are relatively small in score can be detected. Since the probability that they are detected by a wrong detection is strong, suppression of wrong detection of the face image can be realized by considering the result of detection by the determiners in the first group to be due to wrong detection and deleting it.

A face detecting system in accordance with a sixth embodiment of the present invention will be described, hereinbelow.

The face detecting system of this embodiment is basically the same as the third embodiment in the arrangement and the functions of the elements except that the processing of the resolution image selecting portion 131 is slightly different from that of the third embodiment.

The flow of processing in the face detecting system 101 in accordance with the third embodiment will be described, hereinbelow.

Figure 27B:
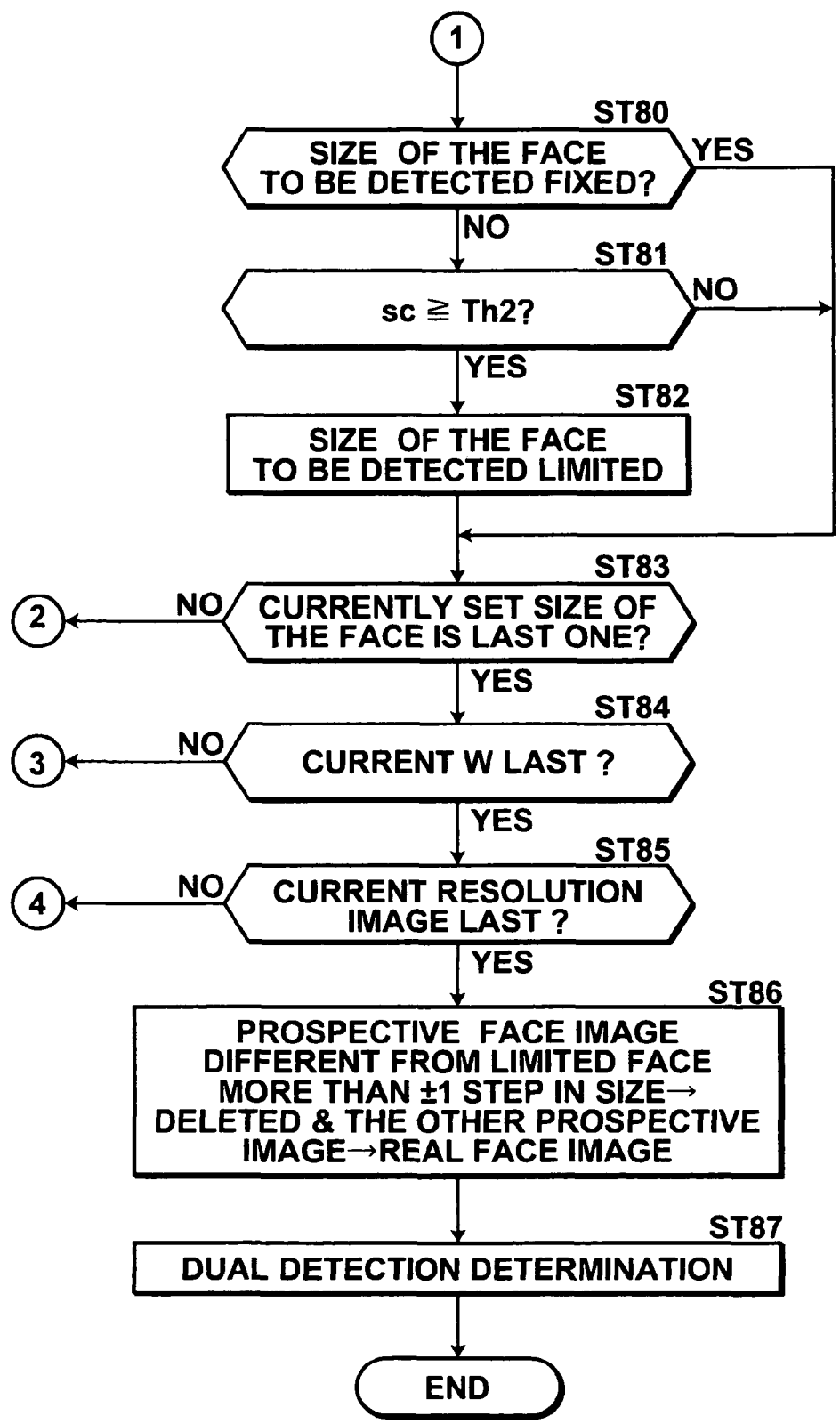
FIG. 27B is the other part of the flowchart showing the processing to be carried out by the face detecting system of the sixth embodiment.

FIGS. 27A and 27B show a flow of processing in the face detecting system 101 of the sixth embodiment. When an object image S0 to be detected for a face is input into the face detecting system 1 (step ST71), the multiple resolution portion 110 generates an image S0' by converting the image size of the object image S0 to a predetermined image size and a resolution image group S1 comprising a plurality of resolution images which are reduced in size (resolution) by $2^{-1/3}$-fold of the image S0' is generated (step ST72). Then in the normalizing portion 120, the whole normalization and the local normalization described above are carried out on the resolution images of the resolution image group S1 to obtain normalized resolution images S1' (step ST73).

Then the resolution image selecting portion 131 of the face detecting portion 130 selects the size of the face to be detected by selecting a predetermined resolution image S1'_m from the resolution image group S1' in the order in which the size becomes smaller, that is, in the order of S1'_M, S1'_M-1, . . . S1'_1 (step ST74). The sub-window setting portion 132 sets the sub-window on the resolution image S1'_m while moving at the predetermined pitches, e.g., the pitches of two pixels, and cuts out a predetermined size of a fraction image W in sequence (step ST75). The sub-window setting portion 132 subsequently sets an inclination of a face to be detected in the predetermined order (step ST76) that is, selects a predetermined determiner in which an inclination of the face to detect is the inclination and inputs the currently cut out fraction image W into the selected determiner (step ST77). The determiner input with the fraction image W calculates by the use of a plurality of weak determiners a score SC representing the probability that the input fraction image W is a face image including a face inclined at a predetermined inclination and oriented in a predetermined orientation corresponding to the determiner(step ST78) and extracts the fraction image W whose calculated score SC is not smaller than the first threshold value Th1 while the detection controlling portion 31 as a prospective face image Di (step ST79).

The sub-window setting portion 132 determines whether the size of a face to be detected is already limited when a prospective face image Di is extracted (step ST80). When it is determined in step ST80 that the size of a face to be detected is already limited, the processing shifts to step ST83. When it is determined in step ST80 that the size of a face to be detected is not yet limited, whether the calculated sc is not smaller than a second threshold value Th2 larger than the first threshold value Th1 (step ST81). When it is determined that the score sc is not smaller than the second threshold value Th2, sizes of the face to be detected to be subsequently set are limited to the size equal to or one step larger than the specific face when the score sc is calculated (step ST82).

Then whether the currently set inclination of the face to be detected is the last one from the viewpoint of the order is determined. (step ST83) When it is determined that the currently set inclination of the face to be detected is not the last one, the processing returns to step ST76 to set a new inclination which is the next, that is, the determiner whose inclination of the face to detect is the set inclination is selected and the currently cut out fraction image W is input into the selected determiner. Whereas when it is determined that the currently set inclination of the face to be detected is the last one, the processing shifts to step ST84.

In step ST84, whether the current fraction image W is the last one on the current resolution image is determined. When it is determined that the current fraction image W is not the last one, the processing returns to step ST75, where a new fraction image W is cut out and the detection is continued. Whereas when it is determined that the current fraction image W is the last one, the processing shifts to step ST85.

In step ST85, the resolution image selecting portion 131 determines whether the current resolution image is the last one. When it is determined that the current resolution image is not the last one, the processing returns to step ST74, where a new resolution image is selected and the detection is continued. Whereas when it is determined that the current resolution image is the last one, the processing shifts to step ST86.

In step ST86, the face image deleting portion 134, when the size of the face to be detected is limited, deletes the prospective face image Di including a face which is different from the limited size by ±one step in the prospective face images which have been detected before the limitation of the size of the face to be detected and determines the other prospective face images as a face images S2.

The double detection determining portion 140 carries out processing to determine on the basis of the relative positions of the detected face images S2 whether each of the detected face images S2 detected on each of the resolution images represents the same face on the object image S0 and has been detected double on a plurality of the resolution images which are adjacent to each other in resolution, and to integrate into one a plurality of detected face images to be recognized as doubled, thereby obtaining face images S3 without the images to be detected double. (step ST87)

Since, in accordance with the face detecting system of the sixth embodiment described above, in the face detection where face images included in an input image are detected by, while changing the position and size of a face to be detected on the input image, calculating for each position and size of the face to be detected an index representing a probability that a fraction image in the position is a face image including a face of the size to be detected and extracting a fraction image whose index is not smaller than the first threshold value as the face image, calculation of the index subsequent to when the calculated index is not smaller than the second threshold value larger than the first threshold value is carried out limiting the size of the face to be detected to the size when the index not smaller than the second threshold value is calculated, detection of sizes of the face image which are different from that of the highly reliable image and are conceivable to be weak in probability that a face image is found and to be poor in necessity of detection is abbreviated on the basis of the rule of experience that it often happens that, when a highly reliable face image which can be considered not to be detected by mistake and to be a real face image is detected, faces in an image are substantially the same in the size thereof, thereby realizing carrying out the face detection at high speed.

What is claimed is:

1. A face detecting method for detecting a face image in an input image, comprising the steps of:
    cutting out a fraction image at each of different positions on the input image;
    for each of the cut out fraction images, calculating an index representing the probability that the fraction image is a face image including a face inclined by a predetermined inclination on the basis of a feature value on an image of the fraction image with the predetermined inclination changed to a plurality of inclinations;
    extracting from the fraction images each fraction image having a calculated index that is not smaller than a first threshold value as a prospective face image including a face inclined by a predetermined inclination when the index is calculated;
    determining as a highly reliable face image an extracted prospective face image having a calculated index that is not smaller than a second threshold value which is larger than the first threshold value;
    increasing the calculated index of each extracted prospective face image not determined as the highly reliable face image and having an inclination that is substantially the same as the inclination of the face of the highly reliable face image; and
    detecting as a face image each prospective face image having an increased index value that is not smaller than a third threshold value which is between the first and second threshold value.

2. A face detecting method for detecting a face image in an input image, comprising the steps of:
    cutting out a fraction image at each of different positions on the input image;
    for each of the cut out fraction images, calculating an index representing the probability that the fraction image is a face image including a face inclined by a predetermined inclination on the basis of a feature value on an image of the fraction image with the predetermined inclination changed to a plurality of inclinations;
    extracting from the plurality of fraction images each fraction image having a calculated index that is not smaller than a first threshold value as a prospective face image including a face inclined by a predetermined inclination when the index is calculated;

determining as a highly reliable face image a prospective face image having a calculated index that is not smaller than a second threshold value which is larger than the first threshold value; and detecting as a face image only an extracted prospective face image having substantially the same inclination as the face of the highly reliable face image.

3. A face detecting method in which, while changing an inclination and a position of a face to be detected, calculating an index representing the probability that a fraction image in each position is a face image including a face inclined by the inclination for each of the positions and inclinations of the face to be detected, and detecting a face image included in an input image by extracting as a face image the fraction image whose index is not smaller than a first threshold value, wherein each said fraction image being obtained from said input image, the improvement comprises the step of:

when the calculated index for an extracted fraction image is not smaller than a second threshold value larger than the first threshold value, carrying out subsequent calculation of the index for each remaining fraction image by limiting inclination of the face to be detected to the inclination upon calculation of the index that is not smaller than the second threshold value.

4. A face detecting method as defined in claim 3 in which the inclinations of all the faces to be detected are divided into a plurality of groups, each said group comprising a plurality of close different inclinations, and the calculation of the index is carried out for the groups.

5. A face detecting method as defined in claim 3, wherein any face images detected before limiting inclination of the face to be detected and including a face inclined by an inclination different from the limited inclination is deleted as a non-face image.

6. A face detecting method as defined in claim 4, in which the plurality of groups comprise four groups respectively containing four inclinations of 0°, 90°, 180°, 270° when the vertical direction of the input image is taken as a reference.

7. A face detecting method as defined in claim 6 in which, before limiting inclination of the face to be detected, the inclination of the face to be detected is changed in a predetermined order with the group including the inclination of 180° positioned last.

8. A face detecting method in which, while changing an inclination and a position of a face to be detected in an input image, for each of the positions and inclinations of the face to be detected, calculating an index representing the probability that a fraction image in the position is a face image including a face inclined by the inclination, each said fraction image being obtained from the input image, and detecting a face image included in the input image by extracting as a face image the fraction image whose index is not smaller than a first threshold value, wherein the improvement comprises the steps of:

dividing inclinations of all the faces to be detected into a plurality of groups, each said group comprising a plurality of close different inclinations;

carrying out the calculation of the index for the groups; and when the calculated index for an extracted fraction image is not smaller than a second threshold value larger than the first threshold value, carrying out subsequent calculation of the index for each remaining fraction image by limiting inclination of the face to be detected to the inclination of the group to which the inclination belongs upon calculation of the index that is not smaller than the second threshold value.

9. A face detecting method as defined in claim 8, wherein any face images detected before limiting inclination of the face to be detected and including a face inclined by an inclination different from the limited inclination is deleted as a non-face image.

10. A face detecting method as defined in claim 8 in which the plurality of groups comprise four groups respectively containing four inclinations of 0°, 90°, 180°, 270° when the vertical direction of the input image is taken as a reference.

11. A face detecting method as defined in claim 10 in which, before limiting inclination of the face to be detected, the inclination of the face to be detected is changed in a predetermined order with the group including the inclination of 180° positioned last.

12. A face detecting method in which, while changing a position and a size of a face to be detected, calculating an index representing the probability that a fraction image in the position is a face image including a face of the size for each of the positions and sizes of the face to be detected, and detecting a face image included in an input image by extracting as a face image the fraction image whose index is not smaller than a first threshold value, each said fraction image being obtained from the input image, wherein the improvement comprises the step of:

when the calculated index for an extracted fraction image is not smaller than a second threshold value larger than the first threshold value, carrying out subsequent calculation of the index for each remaining fraction image by limiting size of the face to be detected to the size upon calculation of the index that is not smaller than the second threshold value.

13. A face detecting system for detecting a face image in an input image, comprising:

a fraction image cutting out means which cuts out a fraction image at each of different positions on the input image;

an index calculating means which calculates, for each cut out fraction image, an index representing the probability that the fraction image is a face image including a face inclined by a predetermined inclination on the basis of a feature value on an image of the fraction image with the predetermined inclination changed to a plurality of inclinations;

a prospective face image extracting means which extracts from the plurality of fraction images each fraction image having a calculated index that is not smaller than a first threshold value as a prospective face image including a face inclined by a predetermined inclination when the index is calculated;

a highly reliable face image determining means which determines as a highly reliable face image an extracted prospective image having a calculated index that is not smaller than a second threshold value which is larger than the first threshold value; and a face image detecting means which detects as a face image only an extracted prospective face image having substantially the same in the inclination as the face of the highly reliable face image.

14. A face detecting system for detecting a face image included in an input image comprising an index calculating means which calculates, while changing an inclination and a position of a face to be detected, an index representing the probability that a fraction image in the position is a face image including a face inclined by the inclination for each of the positions and inclinations of the face to be detected, each said fraction image being obtained from the input image, and a face image extracting means which extracts as a face image the fraction image whose index is not smaller than a first threshold value, wherein the improvement comprises that when the calculated index for an extracted fraction image is not smaller than a second threshold value larger than the first threshold value, the index calculating means carries out subsequent calculation of the index for each remaining fraction image by limiting inclination of the face to be detected to the inclination upon calculation of the index that is not smaller than the second threshold value.

15. A face detecting system as defined in claim 14 in which the index calculating means divides inclinations of all the faces to be detected into a plurality of groups each comprising a plurality of close different inclinations, and carries out the calculation of the index for the groups.

16. A face detecting system as defined in claim 14 further comprising a face image delete means which deletes as a non-face image any face image including a face inclined by an inclination different from the limited inclination in the face image detected before limiting inclination of the face to be detected.

17. A face detecting system as defined in claim 15 in which the plurality of groups comprise four groups respectively containing four inclinations of 0°, 90°, 180°, 270° when the vertical direction of the input image is taken as a reference.

18. A face detecting system as defined in claim 17 in which the index calculating means changes, before limiting inclination of the face to be detected, the inclination of the face to be detected in a predetermined order with the group including the inclination of 180° positioned last.

19. A face detecting system for detecting a face image included in an input image comprising an index calculating means which calculates, while changing a position and a size of a face to be detected, an index representing the probability that a fraction image in the position is a face image including a face of the size for each of the positions and sizes of the face to be detected, each said fraction image being obtained from the input image, and a face image extracting means which extracts as a face image the fraction image whose index is not smaller than a first threshold value, wherein the improvement comprises that when the index calculating means calculates index for an extracted fraction image that is not smaller than a second threshold value larger than the first threshold value, the index calculating means carries out subsequent calculation of the index for each remaining fraction image by limiting size of the face to be detected to the size upon calculation of the index that is not smaller than the second threshold value.

20. A non-transitory computer readable recording medium in which is recorded a computer program for causing a computer to function as a face detecting system for detecting a face image in an input image, comprising:

a fraction image cutting out means which cuts out a fraction image at each of different positions on the input image;

an index calculating means which calculates, for each cut out fraction image, an index representing the probability that the fraction image is a face image including a face inclined by a predetermined inclination on the basis of a feature value on an image of the fraction image with the predetermined inclination changed to a plurality of inclinations;

a prospective face image extracting means which extracts from the plurality of fraction images each fraction image having a calculated index that is not smaller than a first threshold value as a prospective face image including a face inclined by a predetermined inclination when the index is calculated;

a highly reliable face image determining means which determines as a highly reliable face image an extracted prospective image having a calculated index that is not smaller than a second threshold value which is larger than the first threshold value; and a face image detecting means which detects as a face image only an extracted prospective face image having substantially the same in the inclination as the face of the highly reliable face image.

21. A non-transitory computer readable recording medium in which is recorded a computer program for causing a computer to function as a face detecting system for detecting a face image included in an input image comprising an index calculating means which calculates, while changing a position and a size of a face to be detected, an index representing the probability that a fraction image in the position is a face image including a face of the size for each of the positions and sizes of the face to be detected, each said fraction image being obtained from the input image, and a face image extracting means which extracts as a face image the fraction image whose index is not smaller than a first threshold value, wherein the improvement comprises that when the index calculating means calculates an index for an extracted fraction image that is not smaller than a second threshold value larger than the first threshold value, the index calculating means carries out subsequent calculation of the index for each remaining fraction image by limiting size of the face to be detected to the size upon calculation of the index that is not smaller than the second threshold value.

* * * * *